US011368564B2

(12) United States Patent
Dutta

(10) Patent No.: US 11,368,564 B2
(45) Date of Patent: Jun. 21, 2022

(54) PACKET FRAGMENTATION AND REASSEMBLY

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

(*) Notice: Subject to any disclaimer, the term of this patent is extended or adjusted under 35 U.S.C. 154(b) by 50 days.

(21) Appl. No.: 16/580,656

(22) Filed: Sep. 24, 2019

(65) Prior Publication Data

US 2021/0092208 A1 Mar. 25, 2021

(51) Int. Cl.
*H04L 69/326* (2022.01)
*H04L 45/50* (2022.01)
*H04L 47/36* (2022.01)

(52) U.S. Cl.
CPC ............ *H04L 69/326* (2013.01); *H04L 45/50* (2013.01); *H04L 47/36* (2013.01)

(58) Field of Classification Search
CPC ........ H04L 69/326; H04L 47/36; H04L 45/50
See application file for complete search history.

(56) References Cited

U.S. PATENT DOCUMENTS

2003/0108066 A1* 6/2003 Trippe ................... H04L 47/34 370/474
2017/0324849 A1* 11/2017 Pfister ................. H04L 61/2592
2018/0294993 A1* 10/2018 Poulin .................. H04L 47/825

FOREIGN PATENT DOCUMENTS

WO WO-2018161672 A1 * 9/2018 ............. H04L 45/50

OTHER PUBLICATIONS

Kumar, et al., "MPLS Inband Network Telemetry", draft-kumar-mpls-mint-00, Internet-Draft, Internet Engineering Task Force, Mar. 11, 2019, https://datatracker.ietf.org/doc/html/draft-kumar-mpls-mint-00 (Year: 2019).*
Kumar, et al., "MPLS Inband Network Telemetry", draft-kumar-mpls-mint-00, Internet-Draft, Internet Engineering Task Force, Mar. 11, 2019, https://datatracker.ietf.org/doc/html/draft-kumar-mpls-mint-00 (line-numbered) (Year: 2019).*
English translation of WO-2018161672-A1 (Year: 2019).*

(Continued)

*Primary Examiner* — Anh Ngoc M Nguyen
(74) *Attorney, Agent, or Firm* — Tong, Rea, Bentley & Kim, LLC

(57) ABSTRACT

Various example embodiments for supporting fragmentation and reassembly of packets in communication networks are presented. Various example embodiments for supporting fragmentation and reassembly of packets in communication networks may be configured to support fragmentation and reassembly of labeled packets, such as Multiprotocol Label Switching (MPLS) packets or other types of labeled packets, in communication networks. Various example embodiments for supporting fragmentation and reassembly of labeled packets may be configured to support fragmentation and reassembly of labeled packets at various contexts of the labeled packets where the contexts of the labeled packets may be indicated within the labeled packets using sets of context labels for the contexts of the labeled packets.

14 Claims, 39 Drawing Sheets

(56) References Cited

OTHER PUBLICATIONS

Rosen, E., et al., "MPLS Label Stack Encoding," Network Working Group, RFC 3032, Jan. 2001, 23 pages.
Rekhter, Y., et al., "Carrying Label Information in BGP-4," Network Working Group, RFC 3107, May 2001, 8 pages.
Awduche, D., et al., "RSVP-TE Extensions to RSVP for LSP Tunnels," Network Working Group, RFC 3209, Dec. 2001, 61 pages.
Rekhter, Y., et al., "A Border Gateway Protocol 4 (BGP-4)," Network Working Group, RFC 4271, Jan. 2006, 104 pages.
Malis, A., et al., "Pseudowire Emulation Edge-to-Edge (PWE3) Fragmentation and Reassembly," Network Working Group, RFC 4623, Aug. 2006, 17 pages.
Farrel, A., et al., "Encoding of Attributes for MPLS LSP Establishment Using Resource reservation Protocol traffic Engineering (RSVP-TE)," Network Working Group, RFC 5420, Feb. 2009, 22 pages.
Andersson, A., et al., "LDP Specification," Network Working Group, RFC 5036, Oct. 2007, 135 pages.
Nokia, "Nokia modernizes the Smart Grid to bring power distribution networks into the IoT era," printed on Sep. 24, 2019, 7 pages.
Nokia, "Field area network for power utilities," printed on Sep. 24, 2019, 6 pages.

* cited by examiner

FIG. 18

PSEUDOCODE 1800

```
MPLS_Send_Whole_Packet_Or_Fragment (Packet, NextHop)
{
   //If packet size less than next-hop MTU then send the whole packet.
   if ((Packet->End - Packet) < NextHop->MTU)
   {
      Send_Packet (Packet, NextHop);

return;
   }

// Look for MFH in the label stack
   MFH_In_Packet = NULL;

for (index = 0; index < Num_Elements(Packet->Label[]); index = index + 1)
   {
      if (Packet->Label[index] is MFHI)
      {
         // MFH is after 4-octets of MFHI
         MFH_In_Packet = Packet=>Label[Index] + 4;
      }
   }

// If no MFH found then silently drop the packet.
   if (MFH_In_Packet is NULL)
   {
      Drop_Packet (Packet);
      return;
   }

// If DF bit is set in MFH then generate MFC Packet and drop the original packet.
   if (MFH_In_Packet->Flags->DF is 1)
   {
      Send_MFC_Packet_Cant_Fragment (Packet, MFH_In_Packet, NextHop);
      Drop_Packet(Packet);
      return;
   }

// Fragment the Packet and send each fragment to NextHop. See section 6.3.1 for
   // the implementation.
   Send_Fragmented_Packet(Packet, MFH_In_Packet, NextHop, MTU);

return;
}
```

FIG. 20A

PSEUDOCODE 2000 

```
Send_Fragmented_Packet(Packet, MFH_In_Packet, NextHop, MTU)
{
  // This is the minimum size of MFH.
  MFH_Size = 4;

// If MFH includes reporting address then account for the address into size of MFH.
  if (MFH_In_Packet->R-bit)
  {
    // If IPv6 address.
    If (MFH_In_Packet->A-bit)
    {
      MFH_Size = MFH_Size + 16;
    }
    else
    {
      MFH_Size = MFH_Size + 4;
    }
  }

// Size of the payload atop MFH
  Payload_Size_To_Fragment   = (Packet->End - MFH_In_Packet) - MFH_Size;
  // Header size till and including MFH
  Header_Size_On_Fragment    = (MFH_In_Packet - Packet) + MFH_Size;
  // Initialize offset of next fragment bytes in the payload.
  Next_Offset_In_Payload     = 0;

// MTU for the payload needs to discount the headers till and including MFH
  MTU = MTU - Header_Size_On_Fragment;

while (Payload_Size_To_Fragment > 0)
  {
    Global_Sequence_Number = Global_Sequence_Number + 1;

if (Global_Sequence_Number is 0)
    {
      Global_Sequence_Number = 1;
    }
```

FIG. 20B

PSEUDOCODE 2000

```
// Copy the fields from the MFH in the big packet and then update fields wherever
// necessary.
MFH_For_Fragment                  = Copy of MFH_In_Packet;
MFH_For_Fragment->Sequence_Number = Global_Sequence_Number;

if (Payload_Size_To_Fragment >= MTU)
{
    MFH_For_Fragment->Length = MTU;
    MFH_For_Fragment->Type   = Intermediate_Fragment;
}
else
{
    MFH_For_Fragment->Length = Payload_Size_To_Fragment;
    MFH_For_Fragment->Type   = Last_Fragment;
} if (Next-Offset_In_Payload is 0)
{
    MFH_For_Fragment->Type   = First_Fragment;
}

// Build the packet fragment.
Packet_Fragment = {Copy all headers from Packet till MFHI} + MFH_For_Fragment +
                  {Copy Payload bytes in Packet from Next_Offset_In_Payload till
                   (Next_Offset_In_Payload + MFH_For_Fragment->Length)}

// Send the packet fragment to next-hop.
Send_Packet(Packet_Fragment, NextHop);

// Update the offset in Payload to fill the next fragment.
Next_Offset_In_Payload = Next_Offset_In_Payload + Fragment_Size;
// Update remaining bytes in payload to fragment.
Payload_Size_To_Fragment = Payload_Size_To_Fragment - Fragment_Size;
    }
}
```

FIG. 22A

PSEUDOCODE 2200 

```
Send_MFC_Packet_Cant_Fragment(Packet, MFH_In_Packet, NextHop)
{
    // Minimum size of MFH in Packet
    MFH_Size_In_Packet = 4;

// Build the MFH for the MFC Packet
    MFH_For_MFC->Type = Control;
    MFH_For_MFC->Flags.DF-bit = 1;
    MFH_For_MFC->Flags.CF-bit = 1;
    MFH_For_MFC->Sequence_Number = 0;
    MFH_For_MFC->Length = 0;
    MFH_For_MFC->CopyLength = 0;

// If MFH includes the reporting address then use that, else see if any reporting server
    // address is configured locally.
    if (MFH_In_Packet->R-bit)
    {
        MFH_For_MFC->R-bit = 1;
        MFH_For_MFC->A-bit = MFH_In_Packet;
        MFH_For_MFC->ReportingAddress = MFH_In_Packet->Reporting_Address;

If (MFH_In_Packet->A-bit)
        {
            MFH_Size_In_Packet = MFH_Size_In_Packet + 16;
        }
        else
        {
            MFH_Size_In_Packet = MFH_Size_In_Packet + 4;
        }
    }
    else
    {
```

FIG. 22B

PSEUDOCODE
2200

```
{
  // Check for locally configured address.
  Server_Address = Get_Reporting_Server_Address_If_Any();

// If no reporting address found then can't generate MFC packet.
  if (Server_Address is NULL)
  {
    return;
  }

MFH_For_MFC.R-bit = 1;
  MFH_For_MFC.A-bit = Server_Address->Is_Ipv6;
  MFH_For_MFC.ReportingAddress = Server_Address->Address;
}

// Build MFC Packet.
MFC_Packet = {All Headers in Packet till MFH} + MFH_For_MFC +
             Copy MFH_In_Packet->CopyLength bytes from MFH_In_Packet +
             MFH_Size_In_Packet // Send MFC Packet to next-hop.
Send_Packet (MFC_Packet, NextHop);
}
```

FIG. 24

PSEUDOCODE 2400

```
Process_MPLS_Packet (Packet)
{
    // Processing is permitted till end of label stack.
    while (true)
    {
        // Preserve the current label as it is getting popped from packet.
        Current_Label = Packet->Label[0];

Pop_Label(Packet->Label[0]);

// Lookup ILM Table for the forwarding context of the label.
        ILM_Entry = ILM_Table[Current_Label];

if (ILM_Entry says this is transit LSR for the label)
        {
            Process and forward the Packet as per forwarding state(s) associated with the
            of ILM_Entry return;
        }

// Here means - ILM_Entry says this is egress LER for the label

// If this is the last label in the stack then process the label.
        if (Current_Label->Sbit is 1)
        {
            Process the Packet as per the context associated with the ILM_Entry.

// No more labels to process
            return;
        }

// If the next label is MFHI then process the MFH packet for the label.
        if (Packet->Label[0] is MFHI)
        {
            // Remove MFHI
            Pop_Label(Packet->Label[0]);
            Process_Packet_With_MFH_For_Context(Packet, Context in ILM_Entry,
                                                Current_Label->Sbit == 0);

return;
        }
        Process the Packet as per the context associated with the ILM_Entry.
    }
}
```

FIG. 26

PSEUDOCODE
2600

```
Process_Packet_With_MFH_For_Context (Packet, Context, Has_More_Labels)
{
    MFH_In_Packet = Packet->Begin;

// If received a unfragmented packet then remove MFH and do regular processing as per
    // the Context
    if (MFH_In_Packet->Type is Unfragmented Packet)
    {
        Remove_MFH(Packet->Begin);

Process the Packet as per the context associated with the ILM_Entry.

return;
    }

// If received an MFC packet then process.
    if (MFH_In_Packet->Type is Control and MFH_In_Packet->Flags.CFbit is set)
    {
        Process_MFC_Packet(Packet);

return;
    }

// We are here means this is fragment. Insert the fragment into the context's fragment
    // queue in the order of sequence number.
    Context->Fragment_Queue->Enqueue(Packet, Has_More_Labels);

// Check if this is the last fragment in a sequence and if so, reassemble the packet from
    // fragments and process the packet.
    Reassemble_MFH_Fragments_and_Process_Packet(Context);

return;
}
```

*FIG. 28*

PSEUDOCODE
2800

```
Reassemble_MFH_Fragments_and_Process_Packet(Context)
{
   Fragment = Context->Fragment_Queue->First;
   MFH_In_Fragment = Fragment->Begin;
   Next_expected_sequence_number = MFH_In_Fragment->Sequence_Number + 1;
   Fragment = Fragment->Next;

while (Fragment is not NULL)
   {
      MFH_In_Fragment = Fragment->Begin;

if (MFH_In_Fragment->Sequence_Number != Next_Expected_Sequence_Number)
      {
         // There is a hole in the sequence, still expecting more fragments. Can't
         // reassemble
         return;
      } if (MFH_In_Fragment->Type is Last Fragment)
      {
         Packet = Reassemble_MFH_Fragments(Context, MFH_In_Fragment->Sequence_Number);

Process the Packet as per the Context.
         return;
      }

Next_Expected_Sequence_Number = Next_Expected_Sequence_Number + 1;
   }
}
```

*FIG. 30*

PSEUDOCODE
3000

```
Reassemble_MFH_Fragments (Context, Till_Sequence_Number)
{
    Packet = Create a packet with empty payload.

// Sliding pointer in the Packet to the location where to copy next fragment.
    Next_Offset_In_Packet = 0;
    Fragment              = Context->Fragment_Queue->First;

while (Fragment is not NULL)
    {
        MFH_In_Fragment = Fragment->Begin;

Packet + Next_Offset_In_Packet = Copy MFH_In_Fragment->Length sized
                                payload of the Fragment.
        Next_Offset_In_Packet = Next_Offset_In_Packet + MFH_In_Fragment->Length;
        // If this is the last fragment then we have the full packet.
        if (MFH_In_Fragment->Sequence_Number == Till_Sequence_Number)
        {
            return Packet;
        }

Fragment = Fragment->Next;
    }
}
```

*FIG. 32*

PSEUDOCODE
3200

```
Process_MFC_Packet(Packet)
{
   MFH_In_Packet = Packet->Begin;

// If reporting address is not included then silently drop the packet.
   if (MFH_In_Packet->Flags->Rbit is 0)
   {
      Drop_Packet(Packet);

return;
   }

ICMP_Packet = Create an ICMP message with MTU_exceeded error code

// Copy the payload of the received packet as the payload to ICMP packet
   ICMP_Packet = ICMP_Packet + Payload MFH in the Packet // Send the ICMP packet to the reporting address.
   Send_Packet(ICMP_Packet, MFH_In_Packet->Reporing_Address);

return;
}
```

*FIG. 34*

MFHC TLV 3400

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|U|F|        Type 0x0207          |          Length (0)         |
+-+-+-+-+-+-+-+-+-+-+-+-+-+-+-+-+-+-+-+-+-+-+-+-+-+-+-+-+-+-+-+-+
```

PACKET FRAGMENTATION AND REASSEMBLY

TECHNICAL FIELD

Various example embodiments relate generally to communication systems and, more particularly but not exclusively, to packet fragmentation and reassembly in communication systems.

BACKGROUND

In many communication networks, various communications technologies may be used to support communications.

SUMMARY

In at least some example embodiments, an apparatus includes at least one processor and at least one memory including program code, wherein the at least one memory and the program code are configured to, with the at least one processor, cause the apparatus to at least handle a labeled packet including a packet header and a packet payload, wherein the packet header includes a first set of context labels for a first context of the labeled packet and a second set of context labels for a second context of the labeled packet, wherein the packet header includes a fragmentation header of the first context, wherein the fragmentation header is configured to support fragmentation at the first context by a device operating at the second context. In at least some example embodiments, the fragmentation header is configured to support fragmentation at the first context by a device operating at the first context. In at least some example embodiments, the fragmentation header is configured to support reassembly at the first context by a device operating at the first context. In at least some example embodiments, the fragmentation header includes fragmentability information indicative as to whether the labeled packet can be fragmented. In at least some example embodiments, the labeled packet is a fragment of an original packet, wherein the fragmentation header includes fragmentation information indicative of fragmentation of the original packet to form the labeled packet. In at least some example embodiments, the labeled packet is a control packet formed based on failure by the device operating at the second context to fragment an original packet at the first context, wherein the fragmentation header includes reporting information configured to support reporting of the failure by the device operating at the second context to fragment the original packet at the first context. In at least some example embodiments, the fragmentation header is configured to support fragmentation of a fragmentation payload that includes the packet payload. In at least some example embodiments, the packet header includes a second fragmentation header of the second context, wherein the second fragmentation header is configured to support fragmentation at the second context. In at least some example embodiments, the second fragmentation header is configured to support fragmentation of a fragmentation payload that includes the packet payload, the fragmentation header, and the first set of context labels. In at least some example embodiments, the fragmentation header includes a sequence number field, a length field, a field indicative as to whether fragmentation of the labeled packet is permitted, a field indicative as to whether fragmentation of the labeled packet is possible, a type field indicative as to a packet type of the labeled packet, a copy length field, and a reporting address field. In at least some example embodiments, to handle the labeled packet, the at least one memory and the program code are configured to, with the at least one processor, cause the apparatus to at least determine, based on a determination that fragmentation of the labeled packet is needed and based on the fragmentation header, whether to fragment the labeled packet, fragment, based on a determination to fragment the labeled packet, the labeled packet to form a set of packet fragments, and send the set of packet fragments toward a next-hop node. In at least some example embodiments, to handle the labeled packet, the at least one memory and the program code are configured to, with the at least one processor, cause the apparatus to at least determine, based on a determination that fragmentation of the labeled packet is needed and based on the fragmentation header, whether to fragment the labeled packet, determine, based on a determination not to fragment the labeled packet, whether a reporting address for reporting a failure to fragment the labeled packet is available, and handle the labeled packet based on whether the reporting address for reporting the failure to fragment the labeled packet is available. In at least some example embodiments, the determination not to fragment the labeled packet is based on a determination, based on the fragmentation header, that fragmentation of the labeled packet is not permitted or not possible. In at least some example embodiments, the at least one memory and the program code are configured to, with the at least one processor, cause the apparatus to at least drop the labeled packet based on a determination that a reporting address for reporting a failure to fragment the labeled packet is unavailable. In at least some example embodiments, the at least one memory and the program code are configured to, with the at least one processor, cause the apparatus to at least create, from the labeled packet based on a determination that a reporting address for reporting a failure to fragment the labeled packet is available, a fragmentation control packet including the reporting address as a destination address and send the fragmentation control packet toward a next-hop node. In at least some example embodiments, to create the fragmentation control packet, the at least one memory and the program code are configured to, with the at least one processor, cause the apparatus to at least copy a portion of the labeled packet to form a new packet, push the fragmentation header onto the new packet, update the fragmentation header of the new packet to include an indication of the failure to fragment the labeled packet and an indication that the new packet cannot be fragmented and to change a packet type of the new packet to indicate that the new packet is a control packet, and push any subsequent headers from the labeled packet into the new packet. In at least some example embodiments, the reporting address is determined from at least one of the fragmentation header or local configuration information. In at least some example embodiments, to handle the labeled packet, the at least one memory and the program code are configured to, with the at least one processor, cause the apparatus to at least identify the labeled packet as being a fragmentation control packet, wherein the fragmentation header includes a reporting address for reporting a failure to fragment an original packet from which the fragmentation control packet was generated, create, based on the fragmentation control packet, a reporting message indicative of the failure to fragment the original packet from which the fragmentation control packet was generated, and send the reporting message. In at least some example embodiments, the reporting address includes an address of a destination router or an address of a server. In at least some example embodiments, the reporting message includes an Internet Control Message Protocol (ICMP) message including an MTU EXCEEDED code. In at least some example embodiments, to handle the labeled packet, the at least one memory and the program code are configured to, with the at least one processor, cause the apparatus to at least identify the labeled packet as being a packet fragment formed based on fragmentation of an original packet and reassemble, based on the packet fragment and at least one additional packet fragment, the original packet. In at least some example embodiments, the labeled packet is a Multiprotocol Label Switching (MPLS) packet.

In at least some example embodiments, a non-transitory computer-readable medium includes instructions configured to cause an apparatus to at least handle a labeled packet including a packet header and a packet payload, wherein the packet header includes a first set of context labels for a first context of the labeled packet and a second set of context labels for a second context of the labeled packet, wherein the packet header includes a fragmentation header of the first context, wherein the fragmentation header is configured to support fragmentation at the first context by a device operating at the second context. In at least some example embodiments, the fragmentation header is configured to support fragmentation at the first context by a device operating at the first context. In at least some example embodiments, the fragmentation header is configured to support reassembly at the first context by a device operating at the first context. In at least some example embodiments, the fragmentation header includes fragmentability information indicative as to whether the labeled packet can be fragmented. In at least some example embodiments, the labeled packet is a fragment of an original packet, wherein the fragmentation header includes fragmentation information indicative of fragmentation of the original packet to form the labeled packet. In at least some example embodiments, the labeled packet is a control packet formed based on failure by the device operating at the second context to fragment an original packet at the first context, wherein the fragmentation header includes reporting information configured to support reporting of the failure by the device operating at the second context to fragment the original packet at the first context. In at least some example embodiments, the fragmentation header is configured to support fragmentation of a fragmentation payload that includes the packet payload. In at least some example embodiments, the packet header includes a second fragmentation header of the second context, wherein the second fragmentation header is configured to support fragmentation at the second context. In at least some example embodiments, the second fragmentation header is configured to support fragmentation of a fragmentation payload that includes the packet payload, the fragmentation header, and the first set of context labels. In at least some example embodiments, the fragmentation header includes a sequence number field, a length field, a field indicative as to whether fragmentation of the labeled packet is permitted, a field indicative as to whether fragmentation of the labeled packet is possible, a type field indicative as to a packet type of the labeled packet, a copy length field, and a reporting address field. In at least some example embodiments, to handle the labeled packet, the non-transitory computer-readable medium includes instructions configured to cause the apparatus to at least determine, based on a determination that fragmentation of the labeled packet is needed and based on the fragmentation header, whether to fragment the labeled packet, fragment, based on a determination to fragment the labeled packet, the labeled packet to form a set of packet fragments, and send the set of packet fragments toward a next-hop node. In at least some example embodiments, to handle the labeled packet, the non-transitory computer-readable medium includes instructions configured to cause the apparatus to at least determine, based on a determination that fragmentation of the labeled packet is needed and based on the fragmentation header, whether to fragment the labeled packet, determine, based on a determination not to fragment the labeled packet, whether a reporting address for reporting a failure to fragment the labeled packet is available, and handle the labeled packet based on whether the reporting address for reporting the failure to fragment the labeled packet is available. In at least some example embodiments, the determination not to fragment the labeled packet is based on a determination, based on the fragmentation header, that fragmentation of the labeled packet is not permitted or not possible. In at least some example embodiments, the non-transitory computer-readable medium includes instructions configured to cause the apparatus to at least drop the labeled packet based on a determination that a reporting address for reporting a failure to fragment the labeled packet is unavailable. In at least some example embodiments, the non-transitory computer-readable medium includes instructions configured to cause the apparatus to at least create, from the labeled packet based on a determination that a reporting address for reporting a failure to fragment the labeled packet is available, a fragmentation control packet including the reporting address as a destination address and send the fragmentation control packet toward a next-hop node. In at least some example embodiments, to create the fragmentation control packet, the non-transitory computer-readable medium includes instructions configured to cause the apparatus to at least copy a portion of the labeled packet to form a new packet, push the fragmentation header onto the new packet, update the fragmentation header of the new packet to include an indication of the failure to fragment the labeled packet and an indication that the new packet cannot be fragmented and to change a packet type of the new packet to indicate that the new packet is a control packet, and push any subsequent headers from the labeled packet into the new packet. In at least some example embodiments, the reporting address is determined from at least one of the fragmentation header or local configuration information. In at least some example embodiments, to handle the labeled packet, the non-transitory computer-readable medium includes instructions configured to cause the apparatus to at least identify the labeled packet as being a fragmentation control packet, wherein the fragmentation header includes a reporting address for reporting a failure to fragment an original packet from which the fragmentation control packet was generated, create, based on the fragmentation control packet, a reporting message indicative of the failure to fragment the original packet from which the fragmentation control packet was generated, and send the reporting message. In at least some example embodiments, the reporting address includes an address of a destination router or an address of a server. In at least some example embodiments, the reporting message includes an Internet Control Message Protocol (ICMP) message including an MTU EXCEEDED code. In at least some example embodiments, to handle the labeled packet, the non-transitory computer-readable medium includes instructions configured to cause the apparatus to at least identify the labeled packet as being a packet fragment formed based on fragmentation of an original packet and reassemble, based on the packet fragment and at least one additional packet fragment, the original packet. In at least some example embodiments, the labeled packet is a Multiprotocol Label Switching (MPLS) packet.

In at least some example embodiments, a method includes handling a labeled packet including a packet header and a packet payload, wherein the packet header includes a first set of context labels for a first context of the labeled packet and a second set of context labels for a second context of the labeled packet, wherein the packet header includes a fragmentation header of the first context, wherein the fragmentation header is configured to support fragmentation at the first context by a device operating at the second context. In at least some example embodiments, the fragmentation header is configured to support fragmentation at the first context by a device operating at the first context. In at least some example embodiments, the fragmentation header is configured to support reassembly at the first context by a device operating at the first context. In at least some example embodiments, the fragmentation header includes fragmentability information indicative as to whether the labeled packet can be fragmented. In at least some example embodiments, the labeled packet is a fragment of an original packet, wherein the fragmentation header includes fragmentation information indicative of fragmentation of the original packet to form the labeled packet. In at least some example embodiments, the labeled packet is a control packet formed based on failure by the device operating at the second context to fragment an original packet at the first context, wherein the fragmentation header includes reporting information configured to support reporting of the failure by the device operating at the second context to fragment the original packet at the first context. In at least some example embodiments, the fragmentation header is configured to support fragmentation of a fragmentation payload that includes the packet payload. In at least some example embodiments, the packet header includes a second fragmentation header of the second context, wherein the second fragmentation header is configured to support fragmentation at the second context. In at least some example embodiments, the second fragmentation header is configured to support fragmentation of a fragmentation payload that includes the packet payload, the fragmentation header, and the first set of context labels. In at least some example embodiments, the fragmentation header includes a sequence number field, a length field, a field indicative as to whether fragmentation of the labeled packet is permitted, a field indicative as to whether fragmentation of the labeled packet is possible, a type field indicative as to a packet type of the labeled packet, a copy length field, and a reporting address field. In at least some example embodiments, handling the labeled packet includes determining, based on a determination that fragmentation of the labeled packet is needed and based on the fragmentation header, whether to fragment the labeled packet, fragmenting, based on a determination to fragment the labeled packet, the labeled packet to form a set of packet fragments, and sending the set of packet fragments toward a next-hop node. In at least some example embodiments, handling the labeled packet includes determining, based on a determination that fragmentation of the labeled packet is needed and based on the fragmentation header, whether to fragment the labeled packet, determining, based on a determination not to fragment the labeled packet, whether a reporting address for reporting a failure to fragment the labeled packet is available, and handling the labeled packet based on whether the reporting address for reporting the failure to fragment the labeled packet is available. In at least some example embodiments, the determination not to fragment the labeled packet is based on a determination, based on the fragmentation header, that fragmentation of the labeled packet is not permitted or not possible. In at least some example embodiments, the method includes dropping the labeled packet based on a determination that a reporting address for reporting a failure to fragment the labeled packet is unavailable. In at least some example embodiments, the method includes creating, from the labeled packet based on a determination that a reporting address for reporting a failure to fragment the labeled packet is available, a fragmentation control packet including the reporting address as a destination address and sending the fragmentation control packet toward a next-hop node. In at least some example embodiments, creating the fragmentation control packet includes copying a portion of the labeled packet to form a new packet, pushing the fragmentation header onto the new packet, updating the fragmentation header of the new packet to include an indication of the failure to fragment the labeled packet and an indication that the new packet cannot be fragmented and to change a packet type of the new packet to indicate that the new packet is a control packet, and pushing any subsequent headers from the labeled packet into the new packet. In at least some example embodiments, the reporting address is determined from at least one of the fragmentation header or local configuration information. In at least some example embodiments, handling the labeled packet includes identifying the labeled packet as being a fragmentation control packet, wherein the fragmentation header includes a reporting address for reporting a failure to fragment an original packet from which the fragmentation control packet was generated, creating, based on the fragmentation control packet, a reporting message indicative of the failure to fragment the original packet from which the fragmentation control packet was generated, and sending the reporting message. In at least some example embodiments, the reporting address includes an address of a destination router or an address of a server. In at least some example embodiments, the reporting message includes an Internet Control Message Protocol (ICMP) message including an MTU EXCEEDED code. In at least some example embodiments, handling the labeled packet includes identifying the labeled packet as being a packet fragment formed based on fragmentation of an original packet and reassembling, based on the packet fragment and at least one additional packet fragment, the original packet. In at least some example embodiments, the labeled packet is a Multiprotocol Label Switching (MPLS) packet.

In at least some example embodiments, an apparatus includes means for handling a labeled packet including a packet header and a packet payload, wherein the packet header includes a first set of context labels for a first context of the labeled packet and a second set of context labels for a second context of the labeled packet, wherein the packet header includes a fragmentation header of the first context, wherein the fragmentation header is configured to support fragmentation at the first context by a device operating at the second context. In at least some example embodiments, the fragmentation header is configured to support fragmentation at the first context by a device operating at the first context. In at least some example embodiments, the fragmentation header is configured to support reassembly at the first context by a device operating at the first context. In at least some example embodiments, the fragmentation header includes fragmentability information indicative as to whether the labeled packet can be fragmented. In at least some example embodiments, the labeled packet is a fragment of an original packet, wherein the fragmentation header includes fragmentation information indicative of fragmentation of the original packet to form the labeled packet. In at least some example embodiments, the labeled packet is a control packet formed based on failure by the device operating at the second context to fragment an original packet at the first context, wherein the fragmentation header includes reporting information configured to support reporting of the failure by the device operating at the second context to fragment the original packet at the first context. In at least some example embodiments, the fragmentation header is configured to support fragmentation of a fragmentation payload that includes the packet payload. In at least some example embodiments, the packet header includes a second fragmentation header of the second context, wherein the second fragmentation header is configured to support fragmentation at the second context. In at least some example embodiments, the second fragmentation header is configured to support fragmentation of a fragmentation payload that includes the packet payload, the fragmentation header, and the first set of context labels. In at least some example embodiments, the fragmentation header includes a sequence number field, a length field, a field indicative as to whether fragmentation of the labeled packet is permitted, a field indicative as to whether fragmentation of the labeled packet is possible, a type field indicative as to a packet type of the labeled packet, a copy length field, and a reporting address field. In at least some example embodiments, the means for handling the labeled packet includes means for determining, based on a determination that fragmentation of the labeled packet is needed and based on the fragmentation header, whether to fragment the labeled packet, means for fragmenting, based on a determination to fragment the labeled packet, the labeled packet to form a set of packet fragments, and means for sending the set of packet fragments toward a next-hop node. In at least some example embodiments, the means for handling the labeled packet includes means for determining, based on a determination that fragmentation of the labeled packet is needed and based on the fragmentation header, whether to fragment the labeled packet, means for determining, based on a determination not to fragment the labeled packet, whether a reporting address for reporting a failure to fragment the labeled packet is available, and means for handling the labeled packet based on whether the reporting address for reporting the failure to fragment the labeled packet is available. In at least some example embodiments, the determination not to fragment the labeled packet is based on a determination, based on the fragmentation header, that fragmentation of the labeled packet is not permitted or not possible. In at least some example embodiments, the apparatus includes means for dropping the labeled packet based on a determination that a reporting address for reporting a failure to fragment the labeled packet is unavailable. In at least some example embodiments, the apparatus includes means for creating, from the labeled packet based on a determination that a reporting address for reporting a failure to fragment the labeled packet is available, a fragmentation control packet including the reporting address as a destination address and means for sending the fragmentation control packet toward a next-hop node. In at least some example embodiments, the means for creating the fragmentation control packet includes means for copying a portion of the labeled packet to form a new packet, means for pushing the fragmentation header onto the new packet, means for updating the fragmentation header of the new packet to include an indication of the failure to fragment the labeled packet and an indication that the new packet cannot be fragmented and to change a packet type of the new packet to indicate that the new packet is a control packet, and means for pushing any subsequent headers from the labeled packet into the new packet. In at least some example embodiments, the reporting address is determined from at least one of the fragmentation header or local configuration information. In at least some example embodiments, the means for handling the labeled packet includes means for identifying the labeled packet as being a fragmentation control packet, wherein the fragmentation header includes a reporting address for reporting a failure to fragment an original packet from which the fragmentation control packet was generated, means for creating, based on the fragmentation control packet, a reporting message indicative of the failure to fragment the original packet from which the fragmentation control packet was generated, and means for sending the reporting message. In at least some example embodiments, the reporting address includes an address of a destination router or an address of a server. In at least some example embodiments, the reporting message includes an Internet Control Message Protocol (ICMP) message including an MTU EXCEEDED code. In at least some example embodiments, the means for handling the labeled packet includes means for identifying the labeled packet as being a packet fragment formed based on fragmentation of an original packet and means for reassembling, based on the packet fragment and at least one additional packet fragment, the original packet. In at least some example embodiments, the labeled packet is a Multiprotocol Label Switching (MPLS) packet.

In at least some example embodiments, an apparatus includes at least one processor and at least one memory including program code, wherein the at least one memory and the program code are configured to, with the at least one processor, cause the apparatus to at least handle a labeled packet including a packet header and a packet payload, wherein the packet header includes a set of context labels for a context of the labeled packet, wherein the packet header includes a fragmentation header of the context, wherein the fragmentation header includes a field indicative as to whether fragmentation of the labeled packet is permitted, a field indicative as to whether fragmentation of the labeled packet is possible, and a type field indicative as to a packet type of the labeled packet. In at least some example embodiments, a non-transitory computer-readable medium includes instructions configured to cause an apparatus to at least handle a labeled packet including a packet header and a packet payload, wherein the packet header includes a set of context labels for a context of the labeled packet, wherein the packet header includes a fragmentation header of the context, wherein the fragmentation header includes a field indicative as to whether fragmentation of the labeled packet is permitted, a field indicative as to whether fragmentation of the labeled packet is possible, and a type field indicative as to a packet type of the labeled packet. In at least some example embodiments, a method includes handling a labeled packet including a packet header and a packet payload, wherein the packet header includes a set of context labels for a context of the labeled packet, wherein the packet header includes a fragmentation header of the context, wherein the fragmentation header includes a field indicative as to whether fragmentation of the labeled packet is permitted, a field indicative as to whether fragmentation of the labeled packet is possible, and a type field indicative as to a packet type of the labeled packet. In at least some example embodiments, an apparatus includes means for handling a labeled packet including a packet header and a packet payload, wherein the packet header includes a set of context labels for a context of the labeled packet, wherein the packet header includes a fragmentation header of the context, wherein the fragmentation header includes a field indicative as to whether fragmentation of the labeled packet is permitted, a field indicative as to whether fragmentation of the labeled packet is possible, and a type field indicative as to a packet type of the labeled packet.

BRIEF DESCRIPTION OF THE DRAWINGS

The teachings herein can be readily understood by considering the following detailed description in conjunction with the accompanying drawings, in which:

FIG. 18 depicts an example embodiment of pseudocode configured to support dispatching of an MPLS packet;

FIGS. 20A and 20B depict an example embodiment of pseudocode configured to support fragmentation of an MPLS packet;

FIGS. 22A and 22B depict an example embodiment of pseudocode configured to support sending of a control packet when an MPLS packet cannot be fragmented;

FIG. 24 depicts an example embodiment of pseudocode configured to support processing of an MPLS packet;

FIG. 26 depicts an example embodiment of pseudocode configured to support processing of an MPLS packet based on context;

FIG. 28 depicts an example embodiment of pseudocode configured to support reassembly of an MPLS packet from fragments;

FIG. 30 depicts an example embodiment of pseudocode configured to support reassembly of an MPLS packet from fragments of the MPLS packet;

FIG. 32 depicts an example embodiment of pseudocode configured to support processing of an MPLS fragmentation control packet;

FIG. 34 depicts an example embodiment of a data structure configured to support signaling of information indicative of a capability of a router to support reassembly of an MPLS packet for a particular context;

To facilitate understanding, identical reference numerals have been used, where possible, to designate identical elements that are common to the figures.

DETAILED DESCRIPTION

Figure 1:
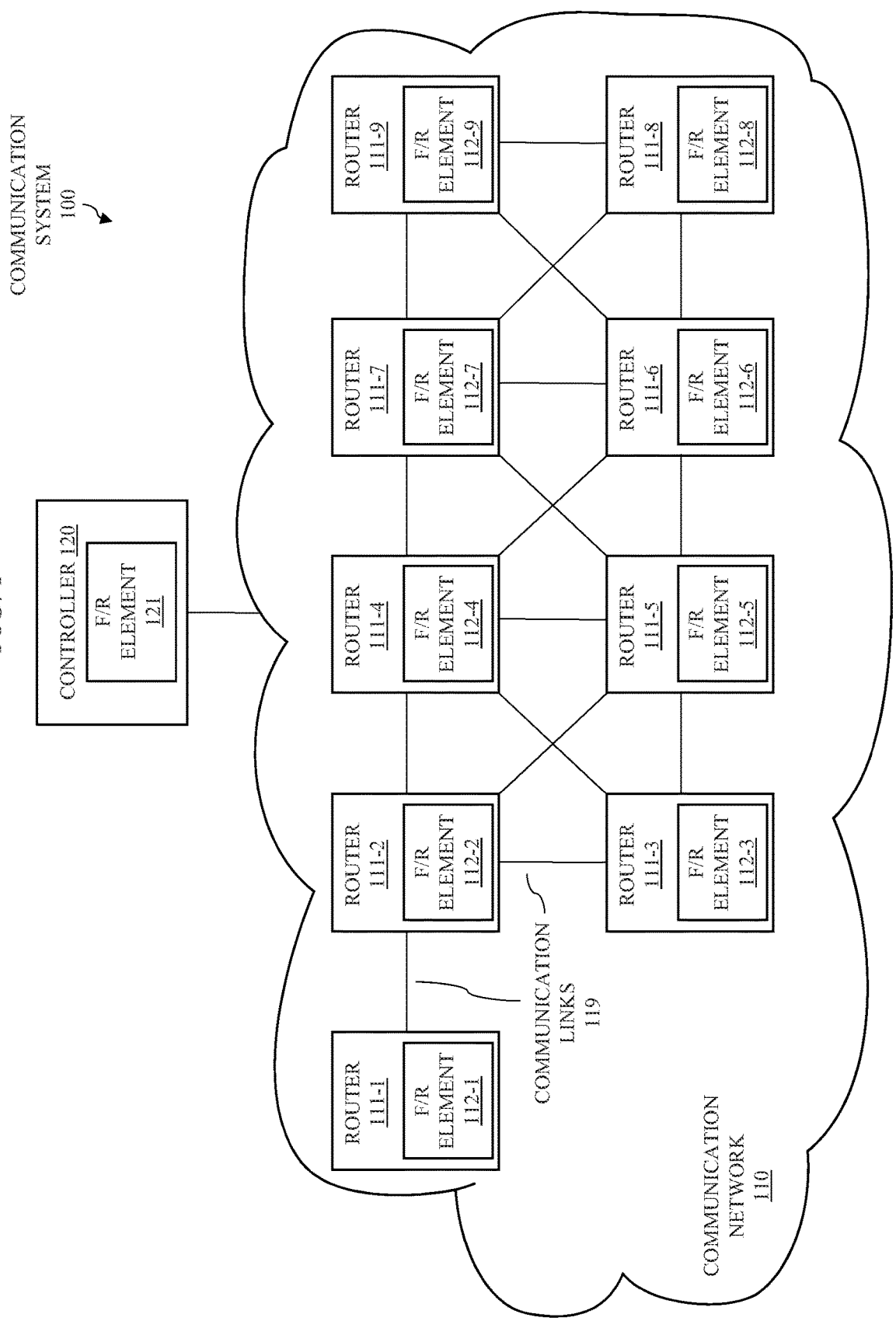
FIG. 1 depicts an example embodiment of a communication system configured to support fragmentation and reassembly of MPLS packets.

Various example embodiments for supporting fragmentation and reassembly of packets in communication networks are presented. Various example embodiments for supporting fragmentation and reassembly of packets in communication networks may be configured to support fragmentation and reassembly of labeled packets, such as Multiprotocol Label Switching (MPLS) packets or other types of labeled packets, in communication networks.

Various example embodiments for supporting fragmentation and reassembly of labeled packets may be configured to support fragmentation and reassembly of labeled packets at various contexts of the labeled packets where the contexts of the labeled packets may be indicated within the labeled packets using sets of context labels for the contexts of the labeled packets. Various example embodiments for supporting fragmentation and reassembly of labeled packets, for a labeled packet having a set of one or more contexts indicated within the labeled packet, may be configured to support fragmentation a given context of the labeled packet by a device operating at any of the one or more contexts of the labeled packet and may be configured to support reassembly at the given context of the labeled packet by a device operating at the given context of the labeled packet irrespective of the one or more contexts at which the device that fragmented the labeled packet was operating. Various example embodiments for supporting fragmentation and reassembly of labeled packets may be configured to support fragmentation and reassembly of labeled packets, at the payloads of various contexts of the labeled packets, based on use of a fragmentation header configured to support various aspects of fragmentation and reassembly of labeled packets (e.g., supporting providing of indications of fragmentability of labeled packets, supporting fragmentation and reassembly of labeled packets including indications providing fragmentation information indicative as to the manner in which fragmentation was performed and the manner in which reassembly may be performed, supporting reporting functions related to fragmentation and reassembly of labeled packets such as reporting failure to fragment labeled packets, or the like, as well as various combinations thereof). Various example embodiments for supporting fragmentation and reassembly of labeled packets may be configured to support fragmentation and reassembly of labeled packets based on support for handling of a labeled packet (e.g., by various devices along the path traversed by the labeled packet, such as by ingress, transit, and egress devices which may operate at various contexts of the labeled packet) where the labeled packet includes a header and a payload and where the header includes a stack of context labels for a context of the labeled packet and also includes a fragmentation header that is associated with the context and that includes fragmentation related information for the context (e.g., fragmentability information where the labeled packet is an unfragmented packet (e.g., information indicative as to whether or not the labeled packet may be fragmented, information which may be used to support fragmentation of the labeled packet, and so forth), fragmentation information where the labeled packet is a fragmented packet (e.g., information indicative as to the manner in which an associated original packet was fragmented to form the fragmented packet, information which may be used to reassemble an original packet from which the fragmented packet was formed, and so forth), fragmentation reporting information where the labeled packet is a fragmentation control packet (e.g., for use in reporting failure to fragment the labeled packet), or the like, as well as various combinations thereof). It will be appreciated that, although primarily presented herein with respect to various example embodiments supporting fragmentation and reassembly of a particular type of labeled packets (namely, MPLS packets), various example embodiments may be configured to support fragmentation and reassembly of various other types of labeled packets. It will be appreciated that these and various other example embodiments and advantages or potential advantages of supporting fragmentation and reassembly of labeled packets, including MPLS packets or other types of labeled packets, may be further understood by way of reference to the various figures, which are discussed further below.

FIG. 1 depicts an example embodiment of a communication system configured to support fragmentation and reassembly of MPLS packets.

The communication system 100 includes a communication network 110 and a controller 120. The communication network 110 is a packet-switched network including a set of routers 111-1-111-9 (collectively, routers 111, which are also referred to herein using the notation Rx) and a set of communication links 119 via which the routers 111 are communicatively connected. The communication network 110 is configured to support various data plane and control plane functions for supporting communication of traffic including communication of labeled packets such as MPLS packets. The communication network 110 is configured to support fragmentation and reassembly of labeled packets such as MPLS packets. The routers 111 are configured to support fragmentation and reassembly of labeled packets such as MPLS packets. The routers 111-1-111-9 include fragmentation/reassembly (F/R) elements 112-1-112-9 (collectively, F/R elements 112), respectively, which are configured to support fragmentation and reassembly of labeled packets such as MPLS packets. The controller 120 is configured to provide control functions for the communication network 110 (e.g., computing and installing routes within communication network 110, supporting label management for communication network 110, or the like, as well as various combinations thereof) including control functions configured to support fragmentation and reassembly of labeled packets, such as MPLS packets, by routers 111 of communication network 110. The controller 120 includes an F/R element 121 configured to support fragmentation and reassembly of labeled packets, such as MPLS packets, by routers 111 of communication network 110. The communication system 100 is configured to support various embodiments for supporting fragmentation and reassembly of packets, including labeled packets such as MPLS packets, within the communication network 110. Various embodiments for supporting fragmentation and reassembly of MPLS packets within the communication network 110 may be further understood by first considering various aspects of fragmentation and reassembly of various types of packets in various types of communication networks.

In general, fragmentation of packets in the network layer of packet switched network architectures is typically caused by the Maximum Transmission Unit (MTU) size imposed by a link traversed by the network layer packet. MTU is the maximum size of the largest network layer protocol data unit that can be communicated over a link. The MTU of a link varies depending on the physical media or data link layer protocols in use, such as Ethernet, WLAN (802.11), 4G/LTE, 5G, and so forth. When the size of a network layer packet exceeds the MTU of the data link, then fragmentation is a process that breaks the network layer packet into smaller pieces, referred to as fragments, so that the packet can pass through the link. The fragments continue along the network path as autonomous packets and the addressed destination host reassembles the fragments back into the original network layer packet. For example, IP packets, MPLS packets, and other types of packets may be fragmented and reassembled.

For example, IP packets may be fragmented in various ways. For example, the default MTU of an Ethernet link is 1500 bytes and assume that the network layer is IPv4. In a TCP/IP frame over Ethernet, the Ethernet MTU is built from the payload (1460 bytes), TCP header (20 bytes), and the IPv4 header (20 bytes). As the total values of the TCP and IPv4 headers is 40 bytes, 1460 bytes remain for the data. The MTU excludes the Ethernet Header which is normally 14 bytes and a 4-byte Frame Check Sequence (FCS). So, if the size of the payload exceeds 1460 bytes, then the IPv4 layer would fragment the {TCP, Payload} in such a way that the size in each IPv4 fragment is less than or equal to the MTU. Each IPv4 fragment is sent as an autonomous IPv4 packet (where is it noted that each IPv4 fragment carries the common {ETH, IP} headers). The destination of the IPv4 packet reassembles the IPv4 fragments to form the original packet.

The IPv4 fragmentation may be performed as source fragmentation or forward fragmentation. The IPv4 fragmentation, as indicated above, may be performed as source fragmentation. Source fragmentation occurs when the IPv4 layer at the source of a packet discovers that the packet size exceeds the MTU of the network interface of the source and, thus, fragments the packet.

The IPv4 fragmentation, as indicated above, may be performed as forward fragmentation. IPv4 is designed as an "inter-network" protocol, allowing an IPv4 packet to undertake an end-to-end journey from source to destination across a number of different networks. For example, consider a host connected to an FDDI network, which in turn is connected to an Ethernet network via a packet switch. The FDDI-connected host may elect to send a 4,478-octet packet, which will fit into an FDDI network, but the packet switch that is attempting to pass the packet into the Ethernet network with a standard MTU of 1500 bytes will be unable to do so, because it is too large. Similarly, the MTU size of wireless links such as in 4G/LTE and 5G won't exceed 512 bytes. When a packet switch is attempting to pass a packet of 1400 bytes from Ethernet network to a wireless network will be unable to do so, because it is too large. So, a solution adopted by IPV4 was the use of forward fragmentation. The basic approach is that any router that is unable to forward an IPv4 packet into the next network because the packet is too large for this network may split the packet into a set of smaller fragments and forward each of these fragments. An advantage of this approach is that, as long as it is permissible to fragment the network layer packet, all packet flows are "forward". By this, it is meant that the sending host is unaware that packet fragmentation is occurring, and all the fragmented packets continue to head towards the original destination where they are reassembled. Another advantage of this approach is that, while the router performing the fragmentation has to expend resources to generate the packet fragments, the ensuing routers on the path to the destination have no additional processing overhead, assuming that they do not need to further fragment these fragments. Fragments can be delivered in any order, so the fragments may be passed along parallel paths to the destination. This approach allows transport protocols (e.g., TCP, UDP, or the like) to operate without consideration of the exact nature of the underlying transmission networks and to avoid additional protocol overhead in negotiating an optimal packet size for each transaction. Large UDP packets could be transmitted and fragmented on the fly as required, without requiring any form of optimal packet size discovery.

For example, MPLS packets may be fragmented in various ways. Just as it is possible to originate or receive an IP packet which is too large to be transmitted on its output link, it is possible to originate or receive an MPLS packet which is too large to be transmitted on its output link. It is also possible that a received packet (labeled or unlabeled) which was originally small enough to be transmitted on that link becomes too large by virtue of having one or more additional labels pushed onto its label stack. In label switching, a packet may grow if additional labels get pushed on. For example, if one receives a labeled packet with a 1500-byte frame payload, and pushes on an additional label, one needs to forward it as frame with a 1504-byte payload. It is noted that various types of payloads of MPLS Label Switched Paths (LSPs) may be fragmented (e.g., IP packets, pseudowire (PW) packets, Layer-3 VPN packets, and so forth).

As indicated above, MPLS packets transporting IP packets in their payloads may be fragmented. Section 3 in RFC 3032 describes the recommendations when an IP packet is sent over an MPLS label and the labelled packet needs fragmentation at the ingress Label Edge Router (LER) or transit Label Switched Router (LSR), if the MTU of the next-hop link is smaller than the size of the labelled packet. Basically, RFC 3032 recommends using IP fragmentation procedures to fragment the underlying IP datagram of a labelled packet and then send each IP fragment over the label. An example fragmentation procedure based on RFC 3032 is presented with respect to FIG. 2.

Figure 2:
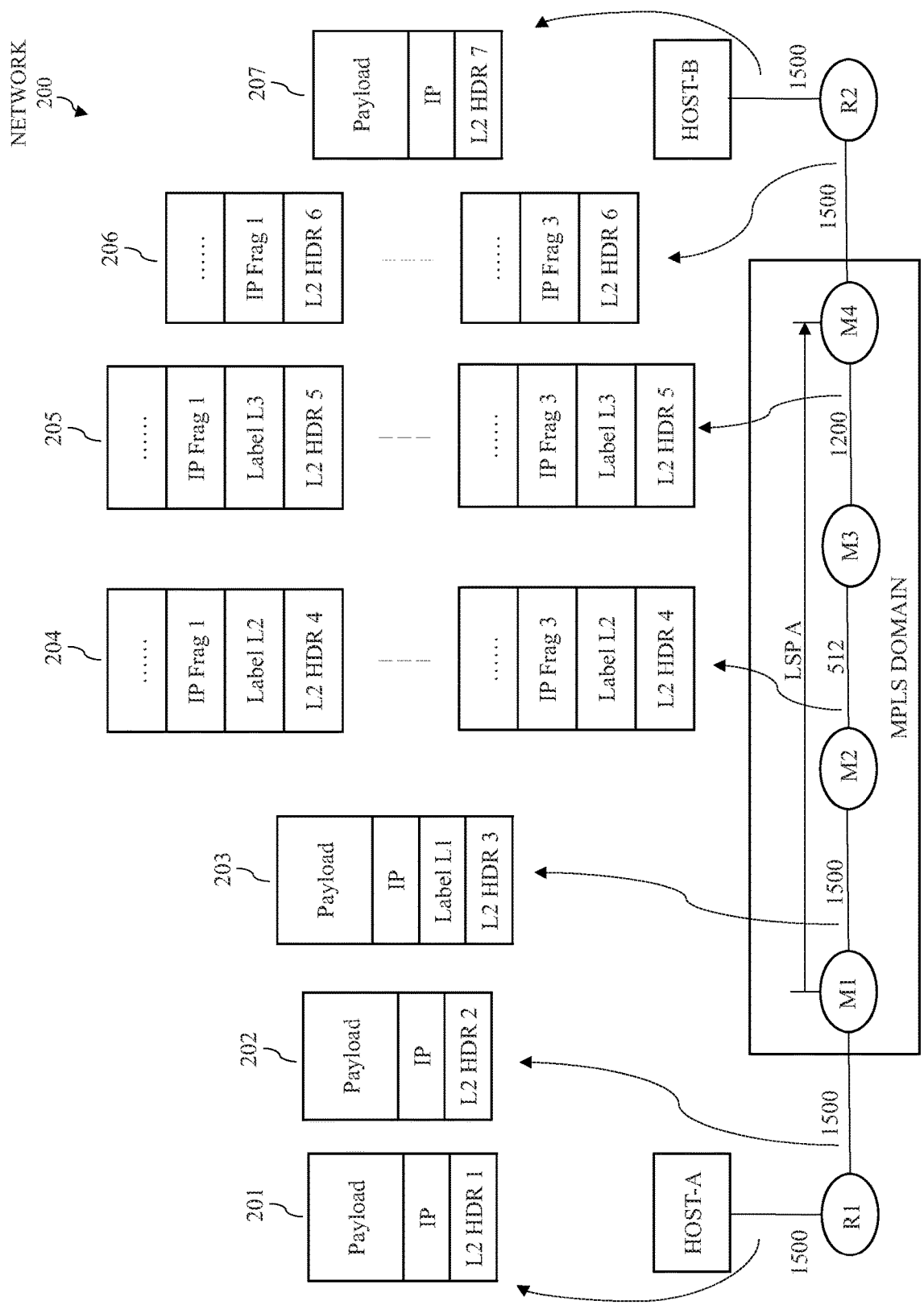
FIG. 2 depicts an example embodiment of a network including a label switched path for illustrating potential fragmentation of MPLS packets.

FIG. 2 depicts an example embodiment of a network including an LSP for illustrating potential fragmentation of MPLS packets. The network 200 includes a pair of hosts (Host-A and Host-B), a pair of routers (denoted as R1 and R2) to which the hosts are connected (illustratively, Host-A connected to R1 and Host-B connected to R2), and an MPLS domain including four routers (denoted as M1-M4, with M1 being an LER connected to R1, M2 and M3 being transit LSRs, and M4 being an LER connected to R2). The links of network 200 have MTU sizes associated therewith (illustratively, 1500 on the link between Host-A and R1, 1500 on the link between R1 and M1, and so forth). The LSP, denoted as LSP-A, traverses the path M1->M2->M3->M4. LSP-A is designated to transport IP packets only, such that the transit routers M2 and M3 also are aware that the payload of MPLS packets switched for LSP-A include IP packets. An IP packet on that LSP is sent by ingress LER M1 with label L1, which gets switched to labels L2 and L3 in M2 and M3, respectively. When egress LER M4 receives the packet with label L3, it pops the label (as it is the end of LSP-A) and forwards the packet further based on the IP header. In this example, Host-A is sending an IP packet 201, of size 1200 bytes, to Host-B across the MPLS domain. The MTUs configured on each of the links along its path is shown in FIG. 2. Host-A sends the packet 201 to its gateway router R1. R1 removes the Layer-2 header (denoted as L2 HDR 1) from packet 201 and pushes the layer-2 header (L2 HDR 2) for the link R1->M1 onto the packet 201 to form packet 202. R1 then routes packet 202 to ingress LER M1 of the MPLS domain. The transition of layer-2 headers happens at every subsequent hop. M1 sends the packet 203 over LSP-A by pushing label L1 onto the IP packet and forwards the packet to M2. M2 swaps the label L1 with L2 to forward the packet to M3. However, M2 notices that the outgoing MTU of 512 bytes is not big enough for this packet. So M3 strips off the label stack (i.e., single label L2 here), fragments the IP packet, pushes back the label stack (i.e., label L2) onto each of the resulting fragments 204 and forwards the fragments 204 to M3. The fragments are independently forwarded until egress LER M4 (namely, the fragments 204 are received by M3, which swaps labels of the fragments 204 to form fragments 205 and sends the fragments 205 to M4). M4 pops the label from each of the fragments 205 to form IP fragments 206 and routes the IP fragments 206 to R2 based on their IP headers. R2 further routes the IP fragments 206 to Host-B, which reassembles the IP fragments to generate the original packet (denoted as packet 207, rather than packet 201, due to the MPLS label).

It is noted that, if the IP header has the Don't Fragment (DF) bit set, the LSR does not fragment the IP packet, but, rather, drops the packet and returns an ICMP error message "Fragmentation needed and do not fragment bit set" (ICMP type 3, code 4) to the originator of the IP packet. As with the ICMP message "time exceeded" (type 11, code 0), which is sent when the TTL of a labeled packet expires, the "Fragmentation needed and do not fragment bit set" ICMP message is sent, using a label stack that is the outgoing label stack for the packet that caused the ICMP message to be created. This means that the ICMP message travels further down the LSP until it reaches the egress LER of that LSP. Then, it is returned to the originator of the packet with the DF bit set.

It is noted that, while fragmentation and reassembly of MPLS packets transporting IP packets as payload may be performed as discussed above, there also may be scenarios in which the payload of a transport packet is not an IP packet and fragmentation and reassembly may be based on use of various embodiments for using fragmentation headers to support various aspects of fragmentation and reassembly of MPLS packets. For example, in FIG. 2, M2 fragmented the packet because payload of the transport LSP is "assumed" to be an IP packet; however, the payload of a transport LSP is not necessarily an IP packet (e.g., the payload on the LSP could carry labels for a different context, such as a PW or L3-VPN labelled packet). In this example, if M2 had received further labels underneath the LSP label, then it would have no context of such labels and, thus, without the ability to infer the structure of the payload of the bottom-most label beneath the LSP label, M2 would drop the packet if the MTU on M2->M3 is less than the size of the packet. This may be further understood with respect to an example in which M2 receives an MPLS packet arranged as follows: {L1, LA, LB, Payload} wherein L1 is the label for the transport LSP. Here, the payload of all of the labels except the bottommost label can be figured out by M2. In this example, M2 swaps L1 with L2 and then needs to fragment the packet. At this point, M2 can figure out that LA and LB are labels based on the BoS (Bottom Of the Stack) bit in L1 and LA, respectively. Additionally, M2 can also determine that LB is the last label, based on the BOS@LB being set to 1. In this example, the limitations on fragmenting the packet at M2 would be as follows: (1) M2 can only do fragmentation of an IP payload carried in the packet and, in this case, M2 does not know if there is an IP packet underneath LB (although, for this example, assume that LB indeed carries an IP packet underneath, but M2 is not aware of that) and (2) the payload of LB may not be an IP packet (but, rather, may be something else), which case M2 cannot fragment the packet. In at least some example embodiments, these or other limitations or potential limitations may be addressed by insertion of a protocol-independent fragmentation header at one or more contexts of the packet, such that M2 is able to fragment the packet based on the fragmentation header without having to worry about (and, thus, without having to determine or infer) the payload of LB. Accordingly, it is noted that various example embodiments for using fragmentation headers configured to support various aspects of fragmentation and reassembly of MPLS packets may be used for supporting fragmentation and reassembly of MPLS packets having various contexts (including transporting IP packets as the payload of the context of an MPLS LSP with or without knowledge of which type(s) of packet(s) is/are transported in the payload of the MPLS packet).

As indicated above, MPLS packets transporting PW packets in their payloads may be fragmented. Layer 2 services (such as Frame Relay (FR), Asynchronous Transfer Mode (ATM), Ethernet, or the like) can be "emulated" over an MPLS backbone by encapsulating the layer-2 protocol data units (PDUs) and transmitting them over PWs. In general, a PW is an MPLS overlay atop an IP or MPLS transport network. The case of PW over an MPLS network, with Ethernet as the Layer-2 service, is presented in FIG. 3.

Figure 3:
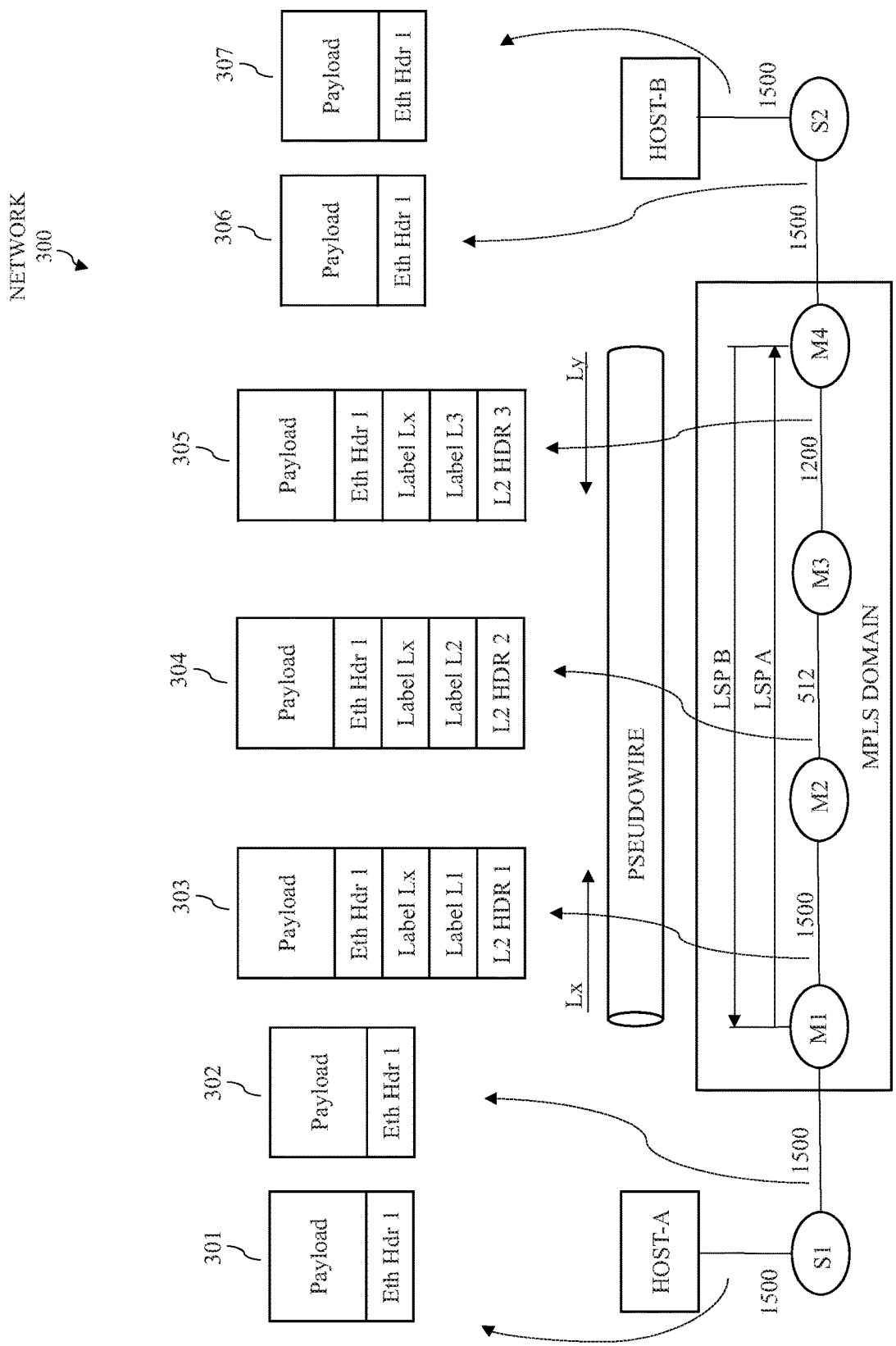
FIG. 3 depicts an example embodiment of a network for illustrating a pseudowire over an MPLS domain with Ethernet as the Layer-2 service and transmission of a pseudowire packet via the pseudowire.

FIG. 3 depicts an example embodiment of a network for illustrating a PW over an MPLS domain with Ethernet as the Layer-2 service and transmission of a PW packet via the PW.

In FIG. 3, the network 300 includes a pair of hosts (Host-A and Host-B), a pair of switches (denoted as S1 and S2) to which the hosts are connected (illustratively, Host-A connected to S1 and Host-B connected to S2), and an MPLS domain including four routers (denoted as M1-M4, with M1 being an LER connected to S1, M2 and M3 being transit LSRs, and M4 being an LER connected to S2). The links of network 300 have MTU sizes associated therewith (illustratively, 1500 on the link between Host-A and S1, 1500 on the link between S1 and M1, and so forth).

In FIG. 3, the PW provides point-to-point layer-2 VPN connectivity between Host-A and Host-B at the Ethernet/Layer-2 level. This means that the hosts see each other as if connected by a single Ethernet link, even though they span across a layer-3/MPLS packet switched network. The PW consists of two single-hop LSPs (one in each direction) between M1 and M4. M1 and M4 are termed as PE (Provider Edge) routers which are access points to the PW. Ethernet packets can be sent on the PW from M1 to M4 using label Lx and, vice versa, using label Ly. Since M1 and M4 are not directly connected, so the PW packets need to be "tunneled over" an MPLS LSP (one for each direction) between M1 and M4 or by using IP-based tunneling methods (e.g., GRE/IP, VXLAN, MPLSoUDP, or the like). For example, PW packets sent from M1 to M4 are tunneled over LSP-A and, vice-versa, over LSP-B. Multiple PWs between two remote-ends can be multiplexed over a single MPLS LSP connecting the remote-ends.

In FIG. 3, a packet is transmitted from Host-A to Host-B. Host-A generates the Ethernet packet 301 to send to Host-B. It is noted that the payload of the packet can be a TCP/IP packet or something else, such as ARP or the like. A PW is agnostic of the payload type of the Ethernet Header, so the payload type is shown as opaque. Host-A sends the packet 301 to Ethernet switch S1 which forwards the packet to M1 (denoted as packet 302 on the link from S1 to M1). M1 associates the packet 302 with the PW (e.g., the S1<->M1 link is mapped to the PW). M1 pushes the PW label Lx to send to M4. M1 further pushes the label L1 for the LSP-A to transport the PW label Lx to M4. M1 sends the resulting packet 303 to M2 by adding the layer-2 header towards M2. M2 receives the packet 303, swaps the label L1 with label L2 to form packet 304, and sends the packet 304 to M3. M3 receives the packet 304, swaps the label L2 with label L3 to form packet 305, and sends the packet 305 to M4. When M4 receives the packet 305 with label L3, it pops the label since this is the end of LSP-A. Since L3 indicates more labels below it (i.e., bottom-of-the-stack (BOS) bit in L3 is 0), M4 looks up the next label Lx. M4 pops Lx, since the label Lx indicates end of the PW. At M4, the PW is mapped to link M4<->S2, so M4 sends the resulting packet 306 to S2. S2 receives the packet 306 and sends the packet 306 to Host-B (denoted as packet 307 when sent by S2 and received by Host-B).

Figure 5:
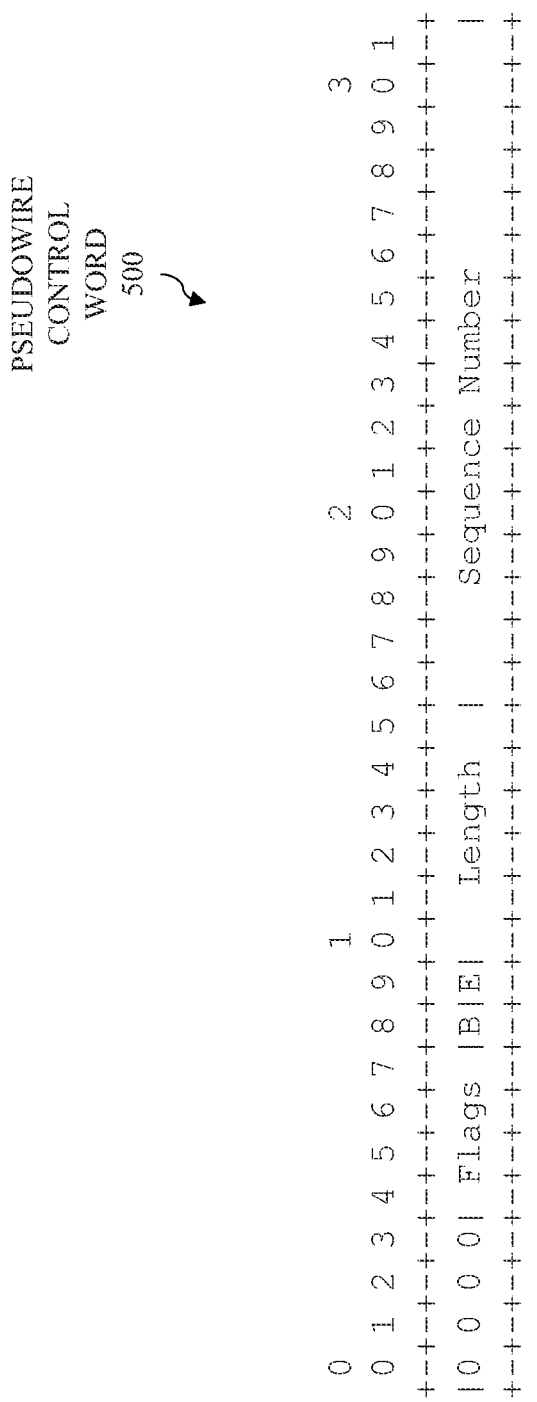
FIG. 5 depicts an example embodiment of a pseudowire control word configured to support fragmentation and reassembly of a pseudowire packet.
Figure 6:
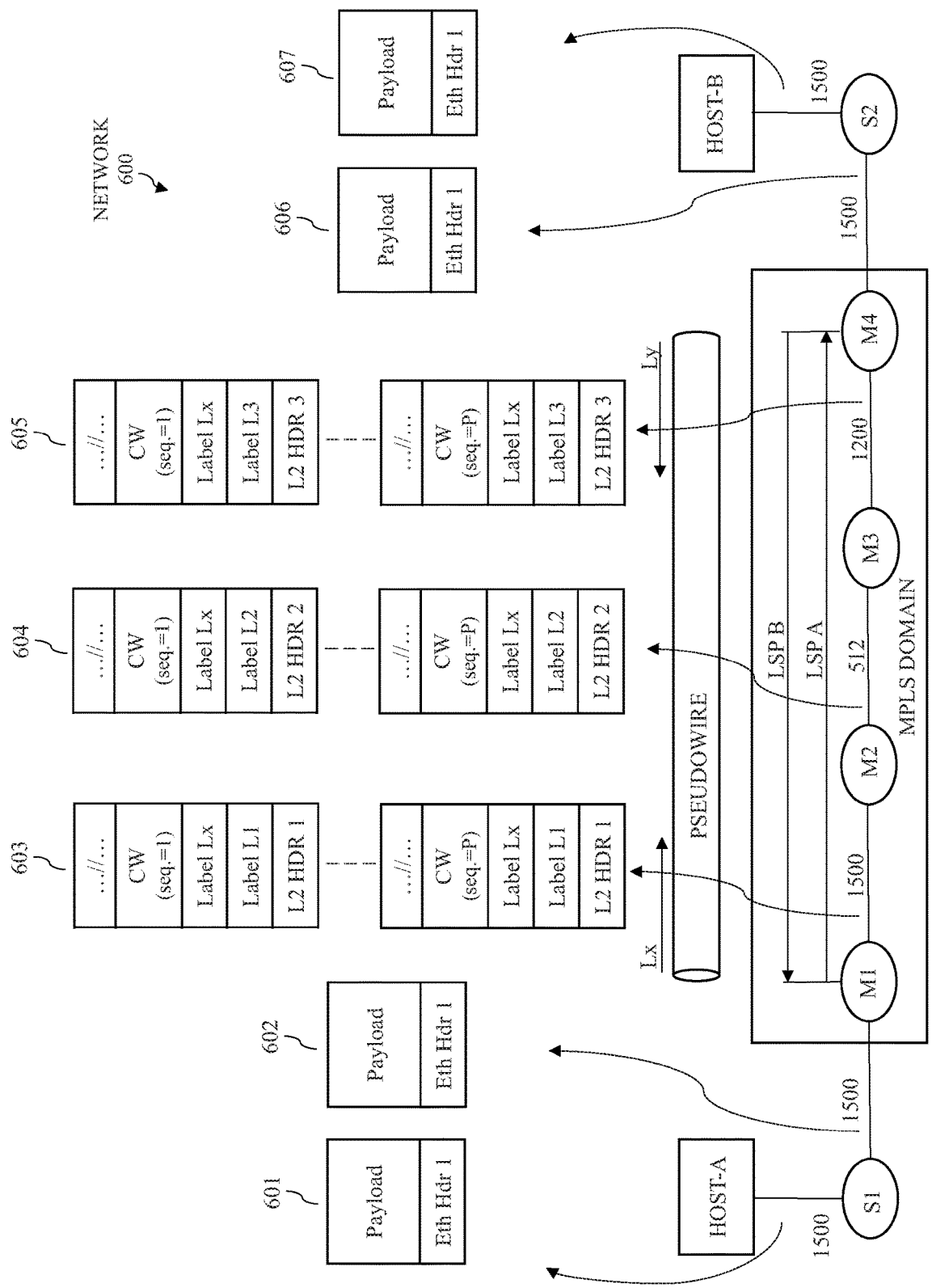
FIG. 6 depicts an example embodiment of a network for illustrating transmission of a pseudowire packet via a pseudowire using a pseudowire control word for performing fragmentation and reassembly of the pseudowire packet.

It is noted that RFC 4623 added explicit support for fragmentation of PW packets, since a PW does not carry an IP packet as payload, but, rather, carries a layer 2 packet (such as FR, ATM, Ethernet, or the like) as payload. The layer-2 payload may in turn carry an IP packet underneath, but the PW is agnostic to underlying constructs of the layer-2 payload. An example of a fragmentation procedure based on RFC 4623 is illustrated in FIGS. 4-6, where it is noted that FIGS. 4 and 6 have the same network as in FIG. 3.

Figure 4:
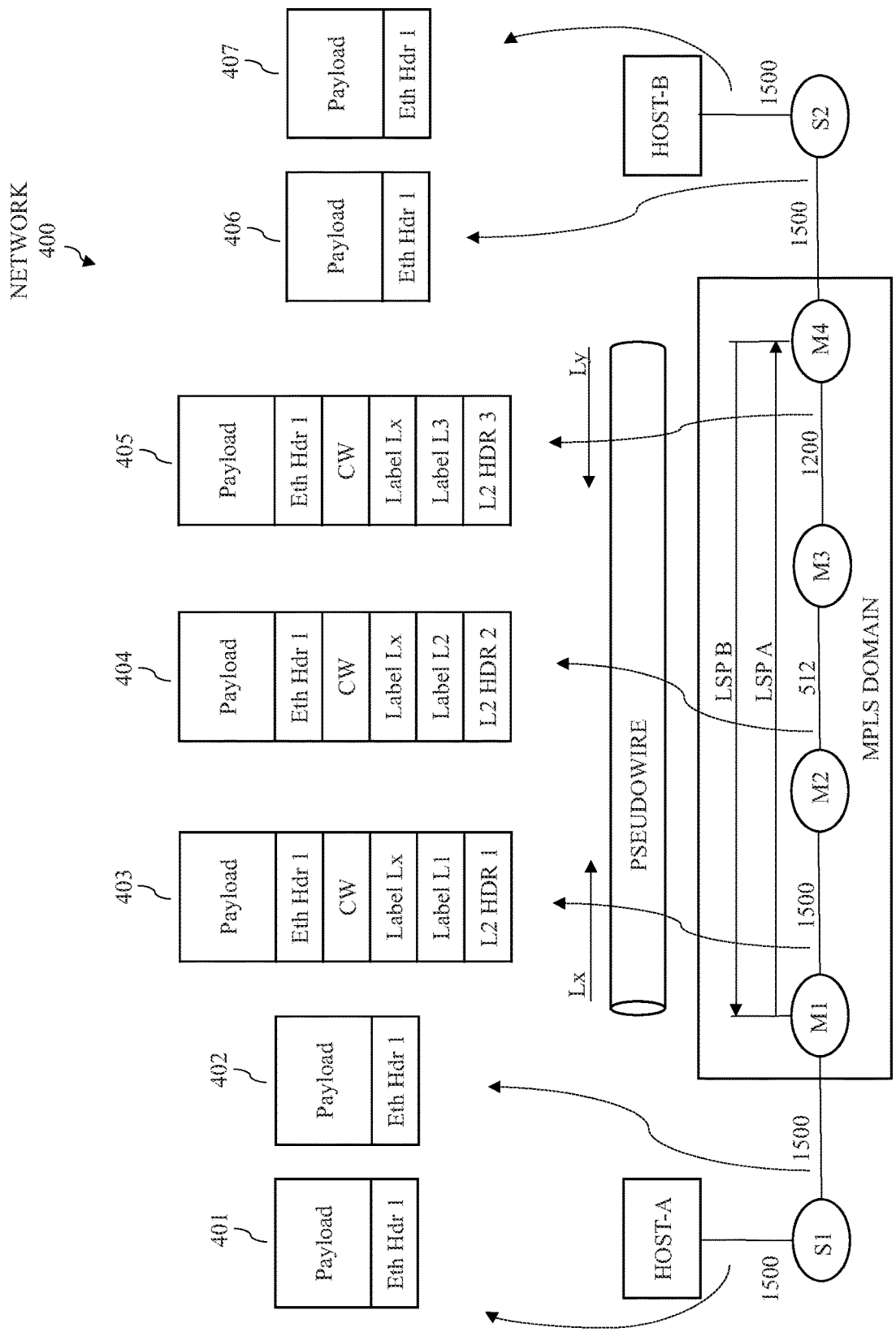
FIG. 4 depicts an example embodiment of a network for illustrating transmission of a pseudowire packet via a pseudowire using a pseudowire control word configured to support fragmentation and reassembly of the pseudowire packet.

FIG. 4 depicts an example embodiment of a network for illustrating transmission of a PW packet via a PW using a PW control word configured to support fragmentation and reassembly of the PW packet. The network 400 of FIG. 4 is the same as the network 300 of FIG. 3.

In FIG. 4, a PW packet is transmitted from Host-A to Host-B via a PW between two PE routers denoted as M1 and M4, which are the PW endpoints.

In FIG. 4, Host-A generates an Ethernet packet (packet 401) to send to Host-B. Host-A sends the packet 401 to S1. S1 receives the packet 401, processes packet 401 based on the Ethernet Header, and sends the packet 401 to M1 as packet 402. M1 puts the packet 402 into the PW to M4. M1 pushes the label Lx to send the packet to M4. M1 further pushes the label L1 for the LSP-A to transport the label Lx to M4. M1 adds the layer-2 header (L2 HDR 1) to send the packet toward M2. This results in packet 403, which M1 sends toward M2. M2 receives the packet 403 from M1, swaps the label L1 with the label L2 and the layer-2 header (from L2 HDR 1 to L2 HDR 2) to form the packet 404, and sends the packet 404 toward M3. M3 receives the packet 404 from M2, swaps the label L2 with the label L3 and the layer-2 header (from L2 HDR 2 to L2 HDR 3) to form the packet 405, and sends the packet 405 toward M4. M4 receives the packet 405 from M3 and removes the packet 405 from the PW (popping the layer-2 header HDR 3, the label L3, and the label Lx) to recover the packet 406. M4 sends the packet 406 to S2. S2 receives the packet 406 from M4, processes the packet based on the Ethernet Header, and sends the packet 407 to Host-B.

The PW endpoints M1 and M4 are configured to support fragmentation and reassembly of the PW packet. In that case, PE routers M1 and M4 would additionally add the PW control word (CW) 500, depicted in FIG. 5, before pushing the PW label (Label Lx in FIG. 4). The PW CW 500 allows the payload underneath (the Ethernet packet in FIGS. 4 and 6) to be fragmented by the sender PE (e.g., M1 in FIG. 4), if the overall packet size exceeds the MTU of the first link (e.g., M1->M2 in FIG. 4). Thus, the fragmentation is performed by the ingress PE router of the PW. Whether the payload underneath the PW CW is fragmented or not is indicated by the B and E bits (BE), which may be encoded as follows: (1) 00—indicates the packet is unfragmented and Flags, Length, Sequence Number fields are set to 0s by the sender and ignored by the receiver, (2) 01—indicates the packet is carrying the first fragment, (3) 10—indicates the packet is carrying the last fragment, and (4) 11—indicates a packet carrying an intermediate fragment. It is noted that the BE bits may be encoded in other ways. When the value of BE is not 0, the Length field carries the length of the fragment. The first fragment starts with Sequence Number value 1. The Sequence Number is incremented for subsequent fragments. In FIG. 4, the unfragmented packets 403-405 carry the PW CW beneath the PW Label Lx. In FIG. 6, which is a continuation of the example of FIG. 4, the packet 403 is fragmented by M1.

FIG. 6 depicts an example embodiment of a network for illustrating transmission of a PW packet via a PW using a PW control word for performing fragmentation and reassembly of the PW packet. The network 600 of FIG. 6 is the same as the network 400 of FIG. 4.

In FIG. 6, a PW packet is transmitted from Host-A to Host-B via a PW between two PE routers denoted as M1 and M4, which are the PW endpoints.

In FIG. 6, Host-A generates an Ethernet packet (packet 601) to send to Host-B. Host-A sends the packet 601 to S1. S1 receives the packet 601, processes the packet 601 based on the Ethernet Header, and sends the packet 601 to M1 (as packet 602). M1 puts the packet 602 into the PW to M4. The Ethernet payload of packet 602 is fragmented by M1 (e.g., if the MTU of the link M1->M2 is less than the size of packet 602) into P fragments 603 using PW fragmentation procedures, such that each fragment 603 is large enough to meet the MTU of M1->M2. Then, M1 pushes the {Label Lx, Label L1, L2 HDR 1} header onto each fragment 603 and sends it to M2. M2 receives each fragment 603 and forwards each fragment 603 independently by swapping label L1 with label L2 and swapping the layer-2 header (from L2 HDR 1 to L2 HDR 2) to form fragments 604 and forwarding the fragments 604 to M3. M3 receives each fragment 604 and forwards each fragment 604 independently by swapping label L2 with label L3 and swapping the layer-2 header (from L2 HDR 2 to L2 HDR 3) to form fragments 605 and forwarding the fragments 605 to M4. M4 receives each fragment 605, strips the headers until the PW Label and preserves the fragments with the PW CW until all P fragments are received and, when all P fragments are received by M4, reassembles the fragments based on the Length and Sequence Number fields in the PW CW to generate the original Ethernet packet 606. M4 sends the original Ethernet packet 606 to S2. S2 processes the packet based on the Ethernet Header and sends the original Ethernet packet 606 to Host-B as original Ethernet packet 607.

It is noted that, while fragmentation and reassembly of MPLS packets transporting PW packets as payload may be performed as discussed above, there also may be scenarios in which the node that would otherwise perform fragmentation may not have certain forwarding context information and fragmentation and reassembly may be based on use of various embodiments for using fragmentation headers configured to support various aspects of fragmentation and reassembly of MPLS packets. For example, in FIG. 4, M2 may have the forwarding context of the label L2 of LSP-A, but may not have the context of the PW label Lx. In this example, without the ability to infer the payloads of other labels beneath the LSP label, M2 would drop the packet if the MTU on M2->M3 is less than the size of the packet. It is noted that various embodiments for using fragmentation headers configured to support various aspects of fragmentation and reassembly of MPLS packets may be used for supporting fragmentation and reassembly of MPLS packets having various contexts and transporting PW packets as payload.

As indicated above, MPLS packets transporting L3-VPN packets in their payloads may be fragmented. The fragmentation of L3-VPN packets is similar to fragmentation of PW packets, with some exceptions as follows: (1) instead of a PW Label, a VPN label is exchanged between a pair PE routers where the VPN label identifies the L3-VPN and acts as the demultiplexer between packets belonging to different VPNs, (2) there can be multiple PE routers (VPN sites), (3) instead of a Layer-2 payload, a VPN label carries a layer-3 packet (IP packet) underneath, and (4) each PE router hosts a routing table per VPN (denoted as a VPN Route Forwarder (VRF)) and an incoming packet from the VPN host is looked up in the corresponding VRF to forward to the appropriate PE router (site). An example fragmentation procedure for fragmenting an L3-VPN packet is presented with respect to FIG. 7.

Figure 7:
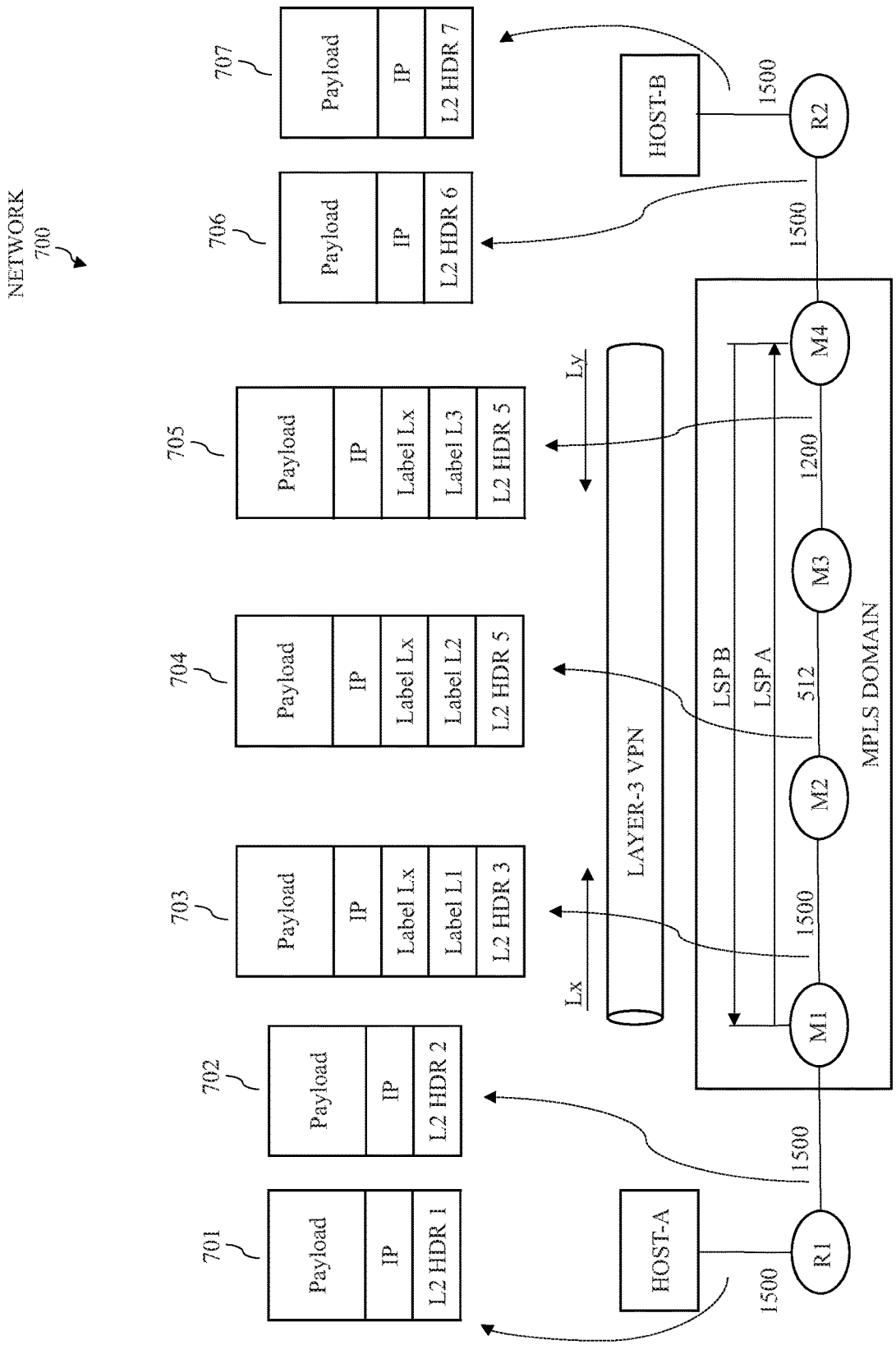
FIG. 7 depicts an example embodiment of a network for illustrating fragmentation of a Layer 3-Virtual Private Network packet.

FIG. 7 depicts an example embodiment of a network for illustrating fragmentation of a Layer 3-Virtual Private Network packet.

In FIG. 7, the network 700 includes a pair of hosts (Host-A and Host-B), a pair of routers (denoted as R1 and R2) to which the hosts are connected (illustratively, Host-A connected to R1 and Host-B connected to R2), and an MPLS domain including four routers (denoted as M1-M4, with M1 being an LER connected to R1, M2 and M3 being transit LSRs, and M4 being an LER connected to R2). The links of network 700 have MTU sizes associated therewith (illustratively, 1500 on the link between Host-A and R1, 1500 on the link between S1 and M1, and so forth).

In FIG. 7, a packet is transmitted from Host-A to Host-B. It is noted that the layer-2 header (L2 HDR) on the packet changes at each hop since it is routed by each hop. It is further noted that Host-A, router R1, router R2, and Host-B are located in the private network of the L3-VPN. Host-A generates the IP packet 701 to send to Host-B. Host-A generates the IP packet 701. Host-A sends the IP packet 701 to its gateway router R1. R1 receives the IP packet 701 from Host-A, looks up the destination IP address (in the IP header), and routes the IP packet 701 to M1 (illustrated as packet 702). M1 receives the IP packet 702 from R1. M1 associates the IP packet 702 with the VPN (e.g., the R1<->M1 link is mapped to the VPN). M1 looks up the destination IP address (in the IP header) in corresponding VRF, which indicates M4 as the next-hop of the VPN. M1 pushes the VPN label Lx to send the packet to M4. M1 further pushes the label L1 for the LSP-A to transport the VPN label Lx to M4. M1 adds the layer-2 header to send the packet toward M2. This results in packet 703, which M1 sends toward M2. M2 receives the packet 703 from M1, swaps the label L1 with the label L2 to form the packet 704, and sends the packet 704 toward M3. M3 receives the packet 704 from M2, swaps the label L2 with the label L3 to form the packet 705, and sends the packet 705 toward M4. When M4 receives the packet 705 with label L3, M4 pops the label (since this is end of LSP-A) and further pops label Lx (since the label indicates its local VPN), looks up the destination IP address of the packet 705 in corresponding VRF (which indicates R2 as the next-hop), and sends the resulting packet 706 to R2. R2 receives the packet 706, looks up the destination IP address (in the IP header), and sends the packet 706 to Host-B (denoted as packet 707 when sent by R2 and received by Host-B). It is noted that, since the packet is an IP packet, the ingress PE router (e.g., M1) performs IP fragmentation of the IP payload in packet 703, if the MTU of the link M1->M2 is less than size of packet 703. An example process for fragmentation in the L3-VPN is presented with respect to FIG. 8, which is the same network as FIG. 7.

Figure 8:
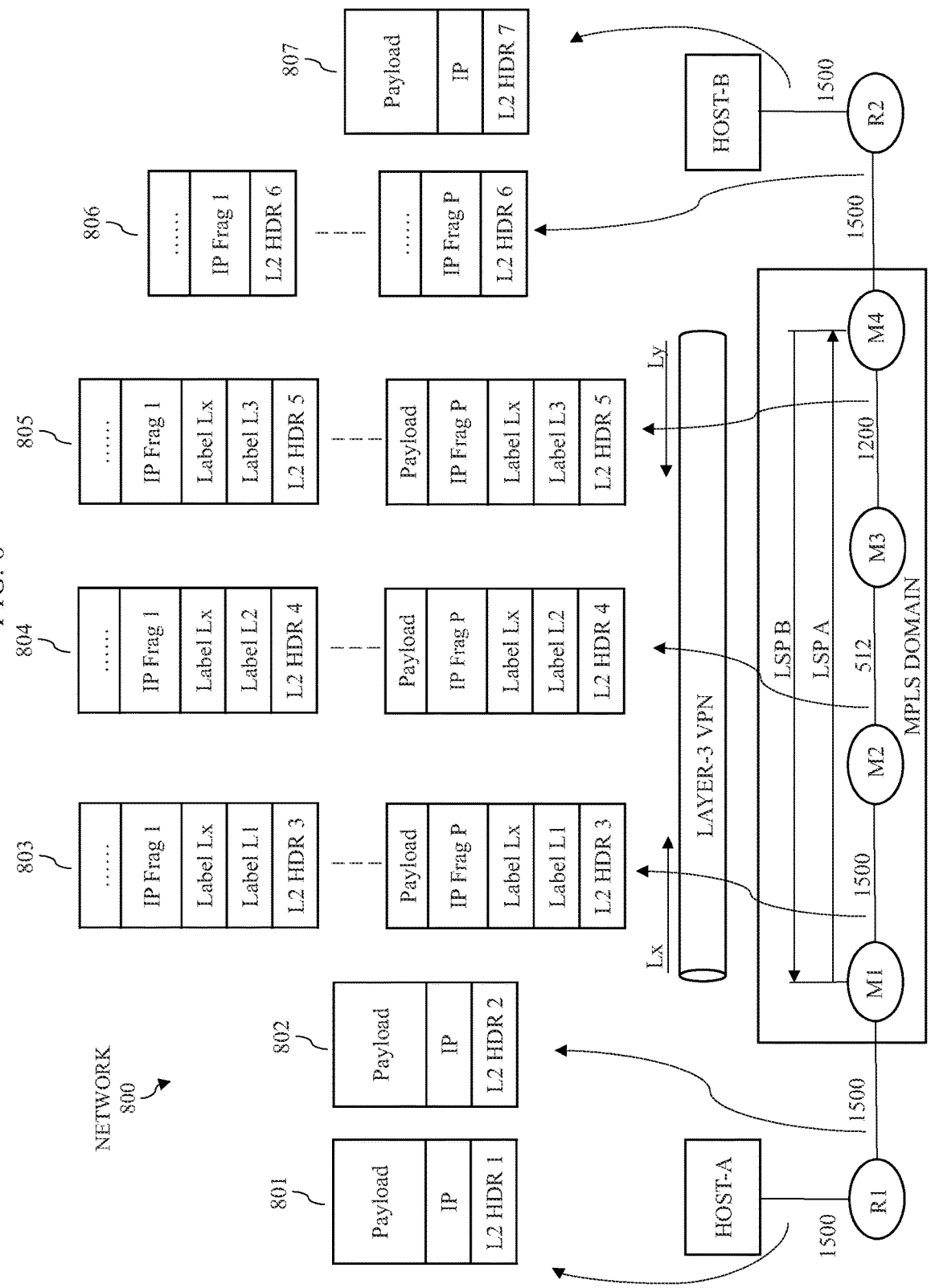
FIG. 8 depicts an example embodiment of a network for illustrating fragmentation of a Layer 3-Virtual Private Network packet in the Layer 3-Virtual Private Network.

FIG. 8 depicts an example embodiment of a network for illustrating fragmentation of a Layer 3-Virtual Private Network packet in the Layer 3-Virtual Private Network. The network 800 of FIG. 8 is the same as the network 700 of FIG. 7.

In FIG. 8, Host-A sends packet 801 to R1 and R1 sends packet 802 to M1. M1 receives the packet 802 and, before pushing the {Label Lx, Label L1, L2 HDR 3} header, fragments the IP packet into P number of fragments 803 using IP fragmentation procedures as discussed herein, such that each fragment is large enough to meet the MTU of M1->M2. Then, M1 pushes the {Label Lx, Label L1, L2 HDR 3} header onto each fragment 803 and sends it to M2. M2 receives each fragment 803 and forwards each fragment 803 independently by swapping label L1 with label L2 to form fragments 804 and forwarding the fragments 804 to M3. M3 receives each fragment 804 and forwards each fragment 804 independently by swapping label L2 with label L3 to form fragments 805 and forwarding the fragments 805 to M4. M4 receives each fragment 805 and forwards each fragment 804 independently by popping the label L3 to form fragments 806 and routing the fragments 806 to R2. R2 further routes the fragments 806 to Host-B. Host-B performs reassembly of the fragments 806 to generate the original packet 807.

It is noted that, while fragmentation and reassembly of MPLS packets transporting L3-VPN packets as payload may be performed as discussed above, there also may be scenarios in which the node that would otherwise perform fragmentation may not have certain forwarding context information and fragmentation and reassembly may be based on use of various embodiments for using fragmentation headers to support various aspects of fragmentation and reassembly of MPLS packets. For example, in FIG. 8, M2 may have the forwarding context of the label L2 of LSP-A, but may not have the context of the L3-VPN label Lx. In this example, without the ability to infer the payloads of other labels beneath the LSP label, M2 would drop the packet if the MTU on M2->M3 is less than the size of the packet. It is noted that various embodiments for using fragmentation headers configured to support various aspects of fragmentation and reassembly of MPLS packets may be used for supporting fragmentation and reassembly of MPLS packets having various contexts and transporting L3-VPN packets as payload.

It is further noted that, while fragmentation and reassembly of MPLS packets transporting various types of packets as payload may be performed, there also may be scenarios in which the node that would otherwise perform fragmentation may not have certain forwarding context information and fragmentation and reassembly may be based on use of various embodiments for using fragmentation headers configured to support various aspects of fragmentation and reassembly of MPLS packets. For example, in Segment Routing (SR), which is a form of source routing, the ingress LER encodes a stack of labels on the packet where the label stack represents an explicit path to be traversed by the packet and, thus, the LSP is represented by a label stack where each label represents a segment of the network. A transit LSR forwards based on the top label and may not have any context for the labels underneath, even if there is an IP payload beneath the label stack. It is noted that various embodiments for using fragmentation headers configured to support various aspects of fragmentation and reassembly of MPLS packets may be used for supporting fragmentation and reassembly of MPLS packets having various contexts and transporting SR packets as payload.

It will be appreciated that, although primarily presented hereinabove within the context of various generic MPLS domains in which fragmentation and reassembly of MPLS packets may be performed, fragmentation and reassembly of MPLS packets may be performed in various other MPLS domains, one of which is described further below.

Figure 9:
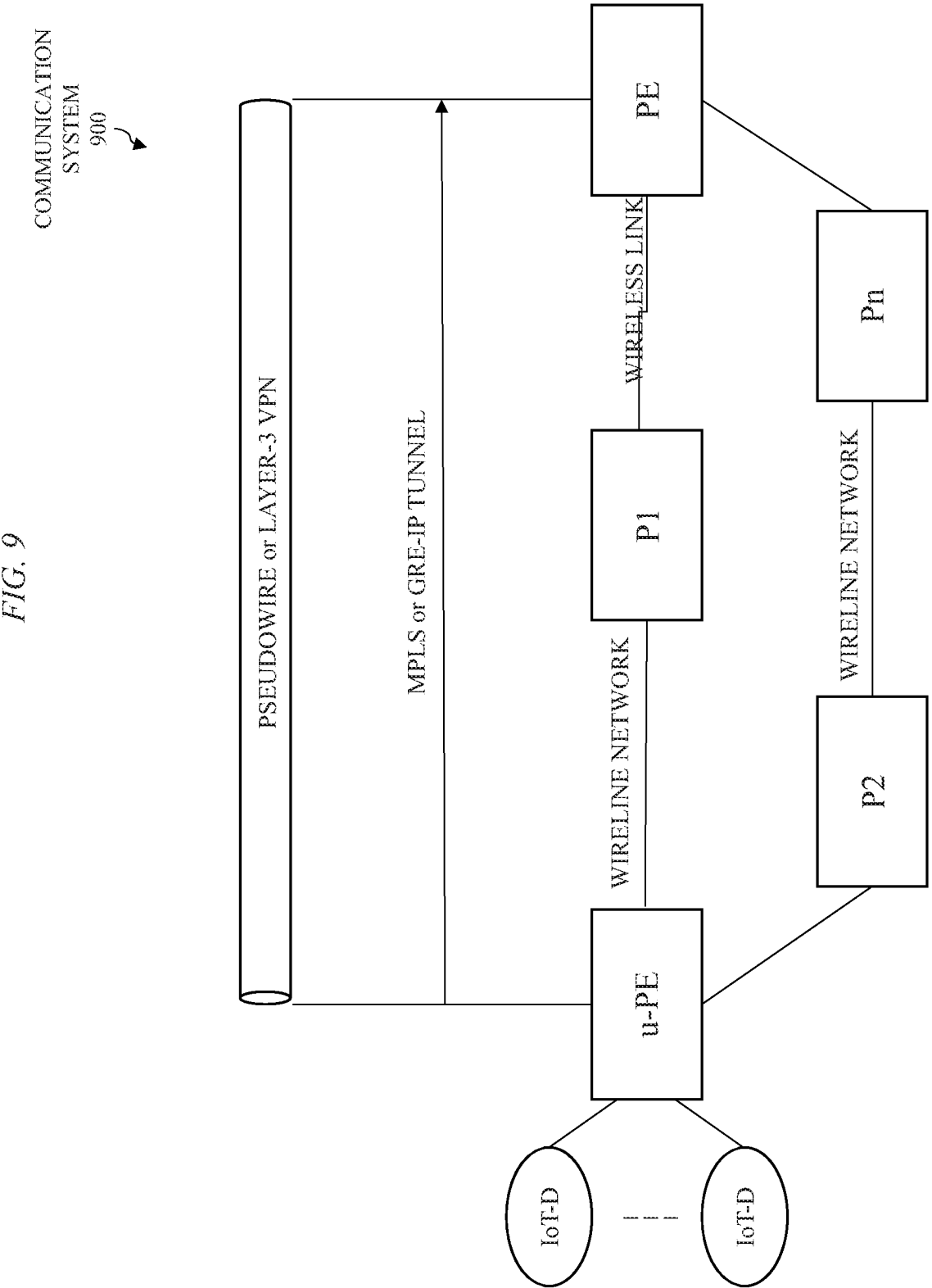
FIG. 9 depicts an example embodiment of a typical access network scenario in an Internet-of-Things deployment.

As an example, an MPLS domain may be a heterogeneous network of various wireless links (e.g., 4G, LTE, and 5G) and wireline links. For example, such networks may be used in support of the Internet of Things (IoT), fixed wireless residential subscribers, and so forth. In such a domain, given that the MTU of a wireless link is generally relatively small, fragmentation of MPLS packets is likely. An example of a typical access network scenario in IoT deployment is presented in FIG. 9. FIG. 9 depicts a communication system 900 illustrating an example of an access network scenario in an IoT deployment. In FIG. 9, multiple IoT devices are aggregated by an access router (u-PE). The u-PE is collocated with the pool of IoT devices. Multiple such u-PEs are connected to a collocated aggregation router P1 via wireline link. For example, IoT devices, u-PEs, and P1 may be located in the same building complex. P1 is connected to a remote PE via a cellular interface (e.g., 4G/LTE, 5G, or the like). The pool of IoT devices is mapped to a VPN (e.g., PW, L3-VPN, or the like) at u-PE. The remote site of the VPN is PE. Thus, packets from IoT devices are encapsulated in a VPN label (e.g., PW, L3-VPN, or the like) assigned by PE. The VPN label is transported over an MPLS or GRE-IP tunnel that traverses u-PE->P1->PE. The MTU of the wireless link between P1 and PE is fairly small, which requires transit router P1 of the tunnel to fragment the tunneled packets. Various example embodiments are configured to support fragmentation of MPLS packets where an MPLS tunnel is used on the path u-PE->P1->PE. It will be appreciated that various embodiments configured to support fragmentation of MPLS packets may be provided in various other contexts (e.g., other types of communication networks, for other types of applications, or the like, as well as various combinations thereof).

Various example embodiments for supporting fragmentation and reassembly of packets in communication networks may be configured to support fragmentation and reassembly of a labeled packet, irrespective of the context of the label or payload type. Various example embodiments for supporting fragmentation and reassembly of a labeled packet, irrespective of the context of the label or payload type, may be configured to support fragmentation and reassembly of an MPLS packet. Various example embodiments for supporting fragmentation and reassembly of a labeled packet, irrespective of the context of the label or payload type, may be configured to support fragmentation and reassembly of an MPLS packet based on configuration of the fragmentation and reassembly mechanism into the MPLS layer, thereby enabling application of the capability for MPLS packets of various applications.

Figure 10:
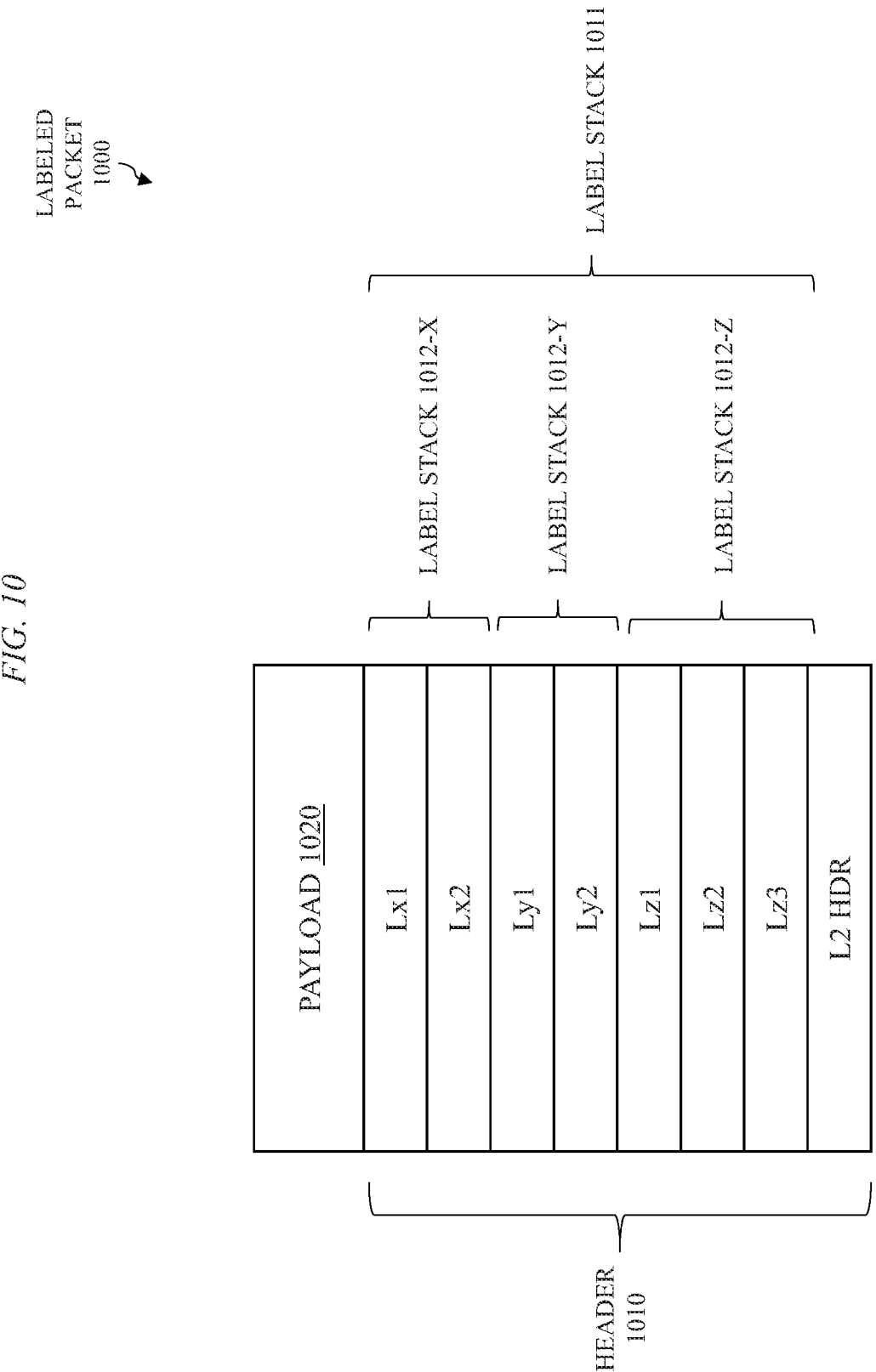
FIG. 10 depicts an example embodiment of a labeled packet that includes a label stack that includes multiple label stacks for multiple contexts.

Various example embodiments for supporting fragmentation and reassembly of a labeled packet, irrespective of the context of the label or payload type, may be configured to support fragmentation and reassembly of the labeled packet based on encoding, within the labeled packet, of one or more contexts of the labeled packet. In general, a labeled packet may have one or more labels having one or more contexts associated therewith (e.g., a label can have one or more contexts associated therewith, a context can have one or more labels associated therewith, or the like, as well as various combinations thereof). In general, the context associated with a label or labels of a labeled packet refers to the MPLS service associated with the label or labels of a labeled packet. The labeled packet may include a label for a context. For example, a context for a labeled packet may be an LSP tunnel, a PW, an L3-VPN, or the like. The labeled packet may include multiple labels for multiple contexts when multiple contexts are overlaid on each other in a hierarchical fashion. For example, multiple overlaid contexts may include a PW over an LSP tunnel, an L3-VPN over an LSP tunnel, or the like. The labeled packet may include multiple labels associated with a context. For example, an SR LSP tunnel can have multiple labels. So, in general, a labeled packet can be generalized to be carrying a label stack wherein the label stack includes one or more label stacks (e.g., of one or more labels each) of one or more contexts. An example of a labeled packet that includes a label stack that includes multiple label stacks for multiple contexts is presented in FIG. 10. In FIG. 10, the labeled packet 1000 includes a header 1010 and a payload 1020, where the header 1010 includes a label stack 1011 that includes three label stacks 1012-X, 1012-Y, and 1012-Z for three contexts X, Y, and Z, respectively. The label stack 1012-X for context X is {Lx2, Lx1}, the label stack 1012-Y for context Y is {Ly2, Ly1}, and the label stack 1012-Z for context Z is {Lz3, Lz2, Lz1}. It will be appreciated that fewer or more contexts and associated label stacks for such contexts may be encoded within a labeled packet, each of the label stacks for each of the contexts of a labeled packet may include fewer or more labels, or the like, as well as various combinations thereof.

Various example embodiments for supporting fragmentation and reassembly of a labeled packet may be configured to support a generic and payload agnostic approach for fragmentation and reassembly of MPLS-based labeled packets. Various example embodiments for supporting fragmentation and reassembly of a labeled packet may be configured to support fragmentation and reassembly of MPLS-based labeled packets by adding the fragmentation and reassembly capabilities into the MPLS layer itself.

Various example embodiments for supporting fragmentation and reassembly of a labeled packet may be configured to support handling of a labeled packet including a header and a payload, wherein the header includes a stack of context labels for a context of the labeled packet, wherein the header includes a fragmentation header associated with the context and including fragmentation related information for the context. In general, a context means a group of packets that are forwarded over the same path and with the same forwarding treatment. A context is encoded into a packet as one or more labels, which are referred to as context labels. For example, packets destined to a specific IP address can be defined as an MPLS LSP where packets transported by the LSP are encoded with the label(s) identifying the LSP. In this example, MPLS LSP is a context associated with the labeled packet and the label(s) identifying the LSP are the context labels. As discussed hereinabove, a labeled packet can carry a single context (e.g., as presented within respect to FIG. 2) or can carry multiple contexts (e.g., as presented with respect to FIG. 3, in which case the packets are transported over a hierarchical MPLS domain). For example, in FIG. 3, an Ethernet PW is overlaid atop an MPLS LSP. Since the LERs of the PW (illustratively, M1 and M4) are not directly connected, the packets transmitted on the PW need to be further transported over a MPLS LSP that connects the LERs of the PW, thereby forming a two level hierarchy in MPLS. In this example, when M1 receives Ethernet packet 302 from S1, it pushes the PW label Lx and then pushes the MPLS LSP label L1 onto the packet, such that the resultant MPLS packet 303 thus carries two contexts (namely, a PW context and an MPLS LSP context, where Lx is the context label for the PW context and L1 is the context label for the MPLS LSP context). The context label for the MPLS LSP is switched at each transit LSR of the LSP (M2, M3). The transit LSRs of the LSP are agnostic of the semantics of the context label Lx of the PW. It will be appreciated that, although FIG. 2 and FIG. 3 only include a single context label for each context, there could be multiple context labels to represent a context within a packet (e.g., a set of context labels for a context of a packet may be considered to include one or more context labels).

Various example embodiments for supporting fragmentation and reassembly of a packet may be configured to support handling of a labeled packet where the handling of the labeled packet, which may include fragmentation, transport, or reassembly, may be performed at various nodes, such as at the ingress LER of any context in the label stack of the labeled packet (e.g., fragmentation), any transit router of any context in the label stack (e.g., fragmentation or transport), the egress LER of any context in the label stack of the labeled packet where fragmentation was performed (e.g., reassembly), or the like.

In at least some example embodiments, for example, an ingress LER or a transit LSR of a transport LSP can fragment the payload of the label of the transport LSP and such fragments may be reassembled at the egress LER of the transport LSP to reconstruct the payload. The ingress LER or transit LSR of the transport LSP can fragment the payload of the label of the transport LSP irrespective of its payload type. The payload of the LSP also may include a label stack of various MPLS overlays (e.g., PW, L3-VPN, or the like). If the fragmentation is done by ingress PE router of a PW or a L3-VPN on its respective payload, then reassembly of the fragments would be performed by the destination PE router of the PW or L3-VPN, respectively.

In at least some example embodiments, for example, the transit LSR of a context may fragment the packet at the payload of an upper level context. In FIG. 10, for example, a transit LSR of context Z may fragment the payload of label Lx1 and yet remain agnostic of the contexts associated with the payload of context Z, i.e., labels {Ly2, Ly1, Lx2, Lx1}. In that case, each fragment is autonomously forwarded with the label stack {Lz3, Lz2, Lz1, Ly2, Ly1, Lx2, Lx1}. The reassembly would still take place in the egress LER of the fragmentation context, i.e., context X. For example, a transit router of an LSP tunnel carrying a PW payload can fragment the payload of the PW label and yet still be agnostic about the context of PW label or nature of its payload and fragments would be reassembled by the egress PE router of the PW.

In at least some example embodiments, as discussed herein, one or more of the contexts encoded within the header of an MPLS packet may have an MPLS Fragmentation Header (MFH) associated therewith, respectively.

In at least some example embodiments, the MFH is configured to carry fragmentation related information which may vary depending on the type of packet in which the MFH is included. For example, the fragmentation related information of the MFH may include fragmentability information for unfragmented MPLS packets (e.g., information indicative as to whether or not the packet may be fragmented, information which may be used to support fragmentation of the packet, and so forth), fragmentation information for fragmented MPLS packets (e.g., information indicative as to the manner in which an associated original packet was fragmented to form the fragmented MPLS packet, information which may be used to reassemble an original packet from which the fragmented MPLS packet was formed, and so forth), fragmentation reporting information for fragmentation control packets (e.g., for MPLS Fragmentation Control (MFC) packets as discussed further herein), or the like, as well as various combinations thereof. The MFH may include the following fields arranged as follows: (1) sequence_number, length, donot_fragment (DF), cannot fragment (CF), type (where the supported types may include {non-fragment, first_fragment, intermediate_fragment, last_fragment, or control}), copy_length, and reporting IP address.

In at least some example embodiments, for unfragmented packets, the MFH for a context encoded within the unfragmented packet may be configured as follows. The fragment_type field is set to non_fragment, and the sequence_number and length fields are set to 0. The DF field may be set to "1" to indicate that fragmentation of the unfragmented packet is not permitted or may be set to "0" to indicate that fragmentation of the unfragmented packet is permitted.

In at least some example embodiments, for fragmented packets, the MFH for a context encoded within the fragmented packet may be configured as follows. The fragment_type field is set to one of the fragment type values (namely, first_fragment, intermediate fragment, or last_fragment) depending on whether the fragmented packet is the first fragment, an intermediate fragment, or the last fragment. The sequence_number field is incremented for each fragment and the length field is set to indicate the size of the fragment. The DF field may be set to "1" to indicate that further fragmentation of the fragmented packet is not permitted or may be set to "0" to indicate that further fragmentation of the fragmented packet is permitted.

In at least some example embodiments, for fragmentation control packets, the MFH for the fragmentation control packet may be configured as follows. The fragment type field is set to "control" to indicate that the labeled packet is a fragmentation control packet. The DF field is set to "1" to indicate that fragmentation of the fragmentation control packet is not permitted.

In at least some example embodiments, the MFH encoded within the header of a labeled packet for a context that is encoded within the labeled packet, the payload of which may be subject to fragmentation, may be inserted within the header beneath the label stack of the context (i.e., between the payload of the labeled packet and the label stack of the context).

It will be appreciated that the MFH may be configured in various other ways, may be arranged within the header of the labeled packet in various other ways, or the like, as well as various combinations thereof.

In at least some example embodiments, a header of a labeled packet may include, for each context of the labeled packet, a label stack for the context and an MFH for the context. An example of a labeled packet that includes a header that includes a label stack including, for each of multiple contexts of the labeled packet, a respective label stack for the respective context and a respective MFH for the respective context, is presented in FIG. 11.

Figure 11:
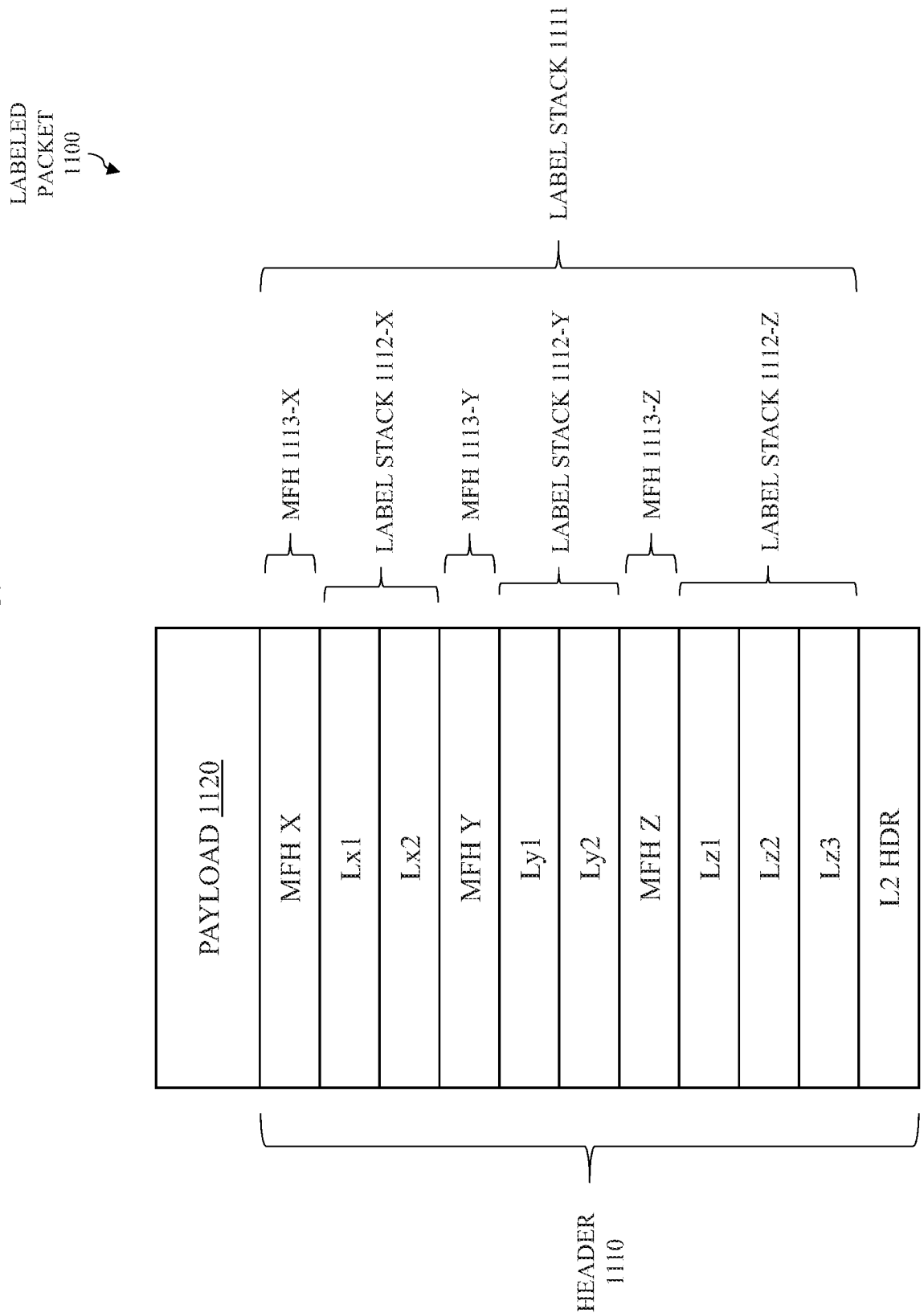
FIG. 11 depicts an example embodiment of a labeled packet that includes a label stack that includes multiple label stacks for multiple contexts and that also includes multiple MPLS Fragmentation Headers for the multiple contexts.

FIG. 11 depicts an example embodiment of a labeled packet that includes a label stack that includes multiple label stacks for multiple contexts and that also includes multiple MPLS Fragmentation Headers for the multiple contexts.

In FIG. 11, the labeled packet 1100 includes a header 1110 and a payload 1120, where the header 1110 includes a label stack 1111 that includes, for each of three contexts X, Y, and Z, a respective label stack for the context (illustratively, label stacks 1112-X, 1112-Y, and 1112-Z for contexts X, Y, and Z, respectively) and a respective MFH for the context (illustratively, MFHs 1113-X, 1113-Y, and 1113-Z for contexts X, Y, and Z, respectively). The label stack 1112-X for context X is {Lx2, Lx1} and the MFH 1113-X for context X is {MFH x}. The label stack 1112-Y for context Y is {Ly2, Ly1} and the MFH 1113-Y for context Y is {MFH y}. The label stack 1112-Z for context Z is {Lz3, Lz2, Lz1} and the MFH 1113-Z for context Z is {MFH z}. The MFHs 1113 are pushed before the label stacks 1112 of the associated contexts and, thus, are configured to support fragmentability at the respective associated contexts (namely, the MFH x provides fragmentability at context X, the MFH y provides fragmentability at context Y, and the MFH z provides fragmentability at context Z). In other words, the "payload" of a context can be fragmented if DF is set to "0" in the MFH for the context. Namely, if the ingress LER or a transit LSR of any context needs to fragment the packet then it would look for the first MFH starting from the outermost label of that context and perform fragmentation on the "payload" of that MFH, where the payload of the MFH may be referred to herein as a fragmentation payload (which may include a packet payload thereof and, optionally, one or more associated labels which may include context labels or MFHs). For example, a transit router of context X would fragment the payload of MFH x (i.e., {Payload} and autonomously forward each fragment with the label stack for context X (i.e., {Lz3, Lz2, Lz1, MFH z, Ly2, Ly1, MFH y, Lx2, Lx1, MFH x}. For example, a transit router of context Y would fragment the payload of MFH y (i.e., {Lx2, Lx1, MFH x, Payload} and autonomously forward each fragment with the label stack for context Y (i.e., {Lz3, Lz2, Lz1, MFH z, Ly2, Ly1, MFH y}. For example, a transit router of context Z would fragment the payload of MFH z (i.e., {Ly2, Ly1, MFH y, Lx2, Lx1, MFH x, Payload} and autonomously forward each fragment with the label stack for context Z (i.e., {Lz3, Lz2, Lz1, MFH z}).

It will be appreciated that fewer or more contexts may be encoded within a labeled packet, each of the label stacks for each of the contexts of a labeled packet may include fewer or more labels, or the like, as well as various combinations thereof.

Figure 12:
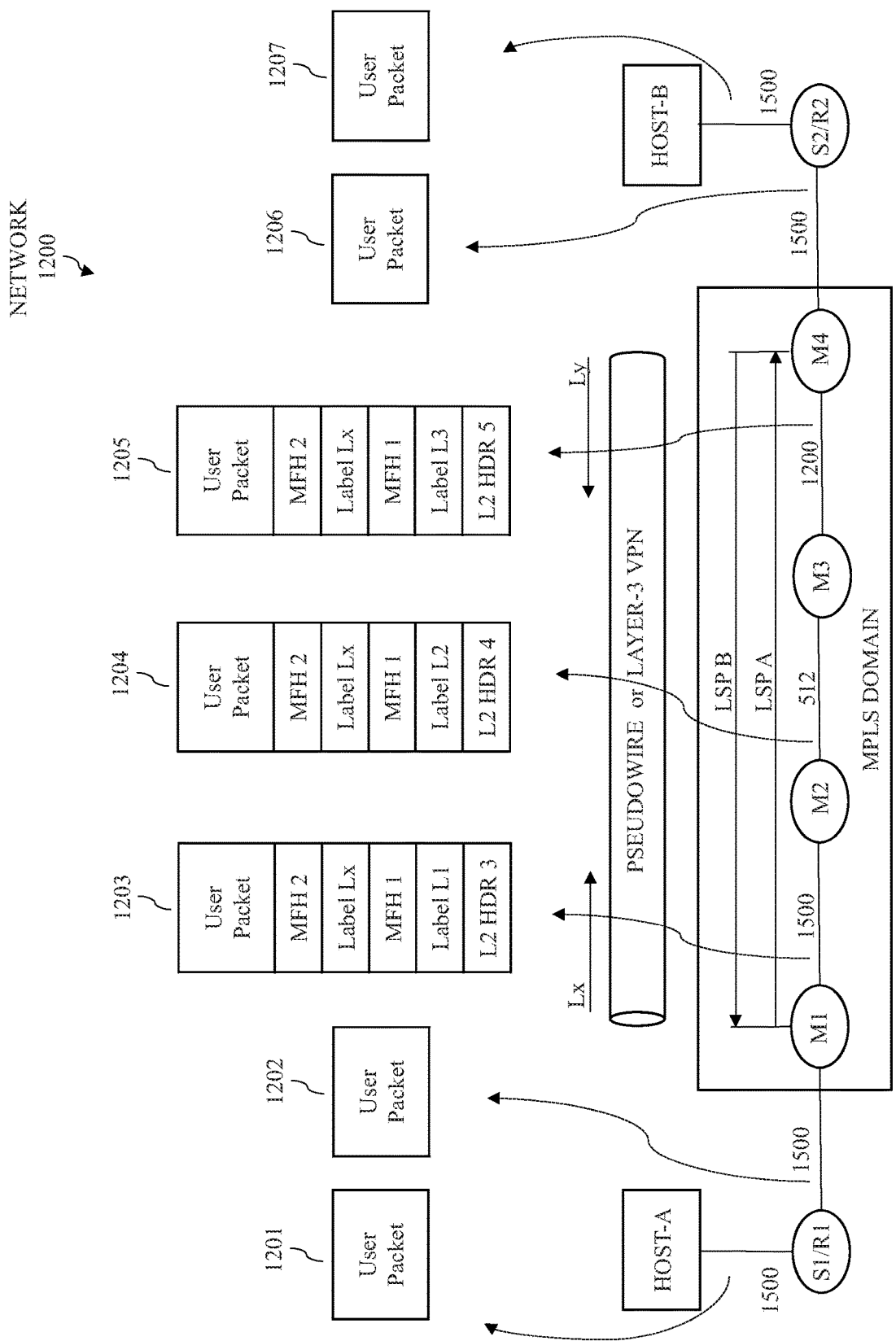
FIG. 12 depicts an example embodiment of a network for illustrating fragmentation support at the pseudowire level and the Layer 3-Virtual Private Network level.
Figure 13:
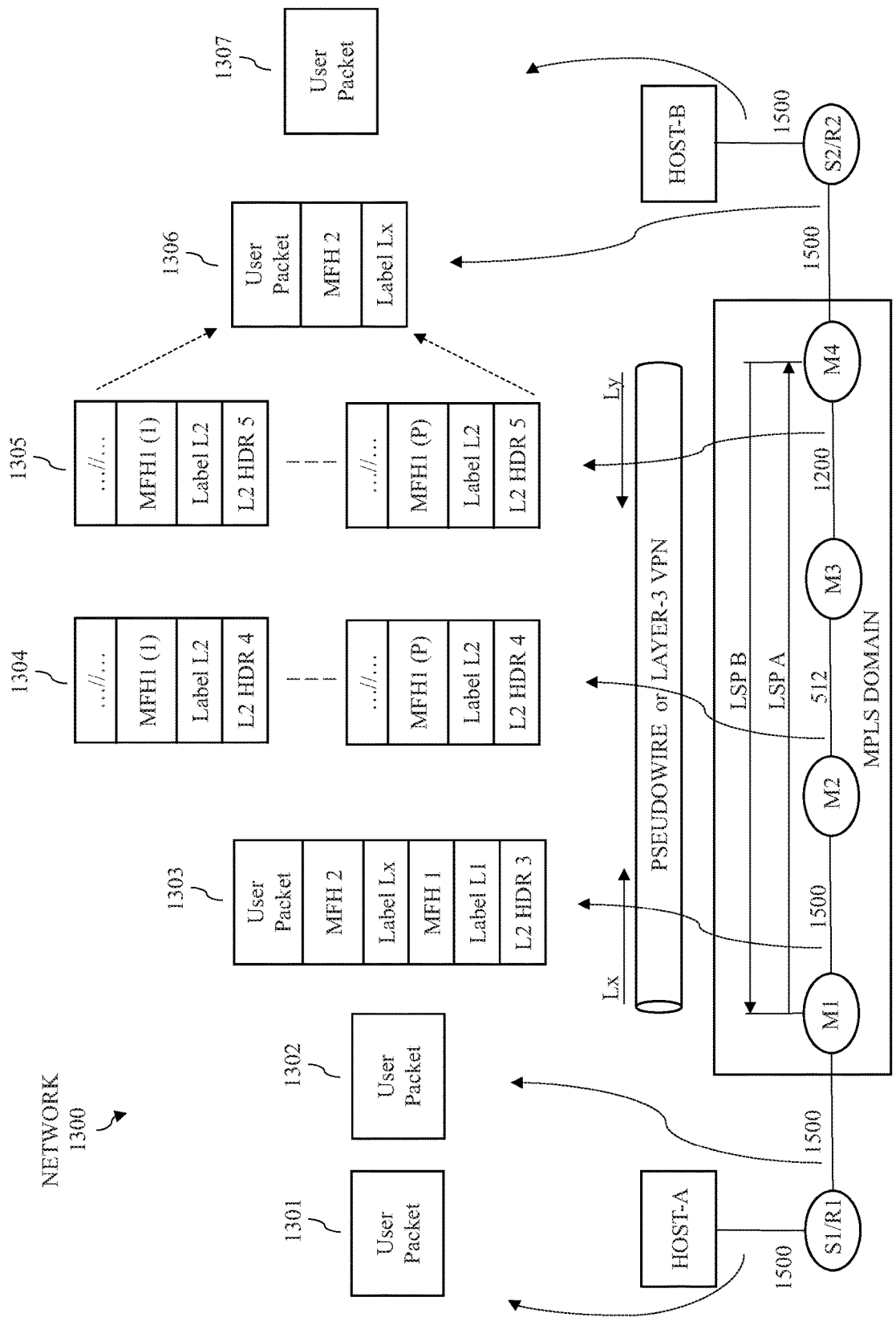
FIG. 13 depicts an example embodiment of a network for illustrating fragmentation support at the pseudowire or Layer 3-Virtual Private Network level and at the Label Switched Path level.

It will be appreciated that various embodiments may be further understood by way of reference to FIGS. 12 and 13. The network in FIGS. 12 and 13 is the same as in FIG. 3 (PW reference model) and FIG. 7 (L3-VPN reference model). In FIGS. 12 and 13, the MPLS overlay on LSP-A could be a PW or an L3-VPN, so the structure of the packet originated from Host-A is kept opaque and marked as User Packet.

FIG. 12 depicts an example embodiment of a network for illustrating fragmentation support at the pseudowire level and the Layer 3-Virtual Private Network level.

In FIG. 12, the network 1200 includes a pair of hosts (Host-A and Host-B), a pair of routers or switches depending on the level (denoted as S1/R1 and S2/R2) to which the hosts are connected (illustratively, Host-A connected to S1/R1 and Host-B connected to S2/R2), and an MPLS domain including four routers (denoted as M1-M4, with M1 being an LER connected to S1/R1, M2 and M3 being transit LSRs, and M4 being an LER connected to S2/R2). The links of network 1200 have MTU sizes associated therewith (illustratively, 1500 on the link between Host-A and S1/R1, 1500 on the link between S1/R1 and M1, and so forth).

In FIG. 12, a packet is transmitted from Host-A to Host-B. It is noted that the layer-2 header (L2 HDR) on the packet changes at each hop since it is routed by each hop. It is further noted that Host-A, router R1, router R2, and Host-B are located in the private network of the PW or L3-VPN. Host-A generates the User Packet 1201 to send to Host-B. Host-A generates the User Packet 1201. Host-A sends the User Packet 1201 to its gateway router R1. R1 receives the User Packet 1201 from Host-A and routes the User Packet 1201 to M1 (illustrated as User Packet 1202). M1 receives the User Packet 1202 from R1. In FIG. 12, both the PW or Layer-3 VPN and the LSP-A decide to provide fragmentation support of their payloads, respectively. As a result, M1 pushes an MFH (illustratively MFH 2) before pushing the PW/L3-VPN label Lx onto the User Packet 1201 and then pushes another MFH (illustratively, MFH 1) before pushing label L1 for the next-hop M2 of LSP A. This results in packet 1203, which M1 sends toward M2. M2 receives the packet 1203 from M1, swaps the label L1 with the label L2 to form the packet 1204 without incurring fragmentation, and sends the packet 1204 toward M3. M3 receives the packet 1204 from M2, swaps the label L2 with the label L3 to form the packet 1205 without incurring fragmentation, and sends the packet 1205 toward M4. When M4 receives the packet 1205 with label L3, M4 pops the label (since this is end of LSP-A), removes label L3 and its MFH 1 since it is egress LSR for LSP-A, removes Lx and its MFH 2 after finding that label Lx indicates that it is the egress PE router for the PW/L3-VPN. This results in User Packet 1206, which M4 sends to R2. R2 receives the User Packet 1206 and sends the User Packet 1206 to Host-B (denoted as User Packet 1207 when sent by R2 and received by Host-B). An example process for fragmentation in the PW or L3-VPN is presented with respect to FIG. 13, which is the same network as FIG. 12.

FIG. 13 depicts an example embodiment of a network for illustrating fragmentation support at the pseudowire or Layer 3-Virtual Private Network level and at the Label Switched Path level. The network 1300 of FIG. 13 is the same as the network 1200 of FIG. 12.

In FIG. 13, a packet is transmitted from Host-A to Host-B. It is noted that the layer-2 header (L2 HDR) on the packet and associated packet fragments changes at each hop since it is routed by each hop. It is further noted that Host-A, router R1, router R2, and Host-B are located in the private network of the PW or L3-VPN. Host-A generates the User Packet 1301 to send to Host-B. Host-A generates the User Packet 1301. Host-A sends the User Packet 1301 to its gateway router R1. R1 receives the User Packet 1301 from Host-A and routes the User Packet 1301 to M1 (illustrated as User Packet 1302). M1 receives the User Packet 1302 from R1. In FIG. 13, both the PW or Layer-3 VPN and the LSP-A decide to provide fragmentation support of their payloads, respectively. As a result, M1 pushes an MFH (illustratively MFH 2) before pushing the PW/L3-VPN label Lx onto the User Packet 1302 and then pushes another MFH (illustratively, MFH 1) before pushing label L1 for the next-hop M2 of LSP A. This results in packet 1303, which M1 sends toward M2. M2 receives the packet 1303 from M1. In FIG. 13, assume that the size of packet 1303 is larger than MTU of link M2->M3. In that case, M2 evaluates the label stack to look for an MFH. Fragmentation is performed on the first MFH at any position below the label that has been swapped. In this case, the first MFH below the swapped label L2 is MFH 1. The DF bit in the MFH 1 is 0, so M2 fragments the payload of MFH, i.e., {Label Lx, MFH 2, User Packet} into P number of fragments, such that each fragment is large enough to meet the MTU of link M2->M3. M2 then pushes {L2 HDR 4, Label L2, MFH 1} onto each fragment and updates the relevant fields (e.g., sequence number, length, and so forth) in MFH 1 on each of the fragments. This results in fragments 1304 which M2 sends to M3. M3 receives each fragment 1304 and forwards each fragment 1304 independently by swapping label L2 with label L3 to form fragments 1305 and forwarding the fragments 1305 to M4. M4 receives each fragment 1305 and finds MFH 1 in each of the fragments 1305, which indicates that the fragments 1305 are fragments of a packet to be reassembled. So, M4 keeps each of the fragments 1305 until receiving all of the fragments 1305, at which time M4 performs reassembly of the fragmented packet, from the payloads included within the fragments 1305, based on the information in MFH 1. After reassembly, the reassembled packet is as follows: {Label Lx, MFH 2, User Packet}. Thus, the reassembly takes place at the LSP A level. M4 then pops label Lx since M4 is egress PE router for Lx. M4 then also pops MFH 2. The result is User Packet 1306. M4 forwards the User Packet 1306 to R2 based on the forwarding state of the PW or L3-VPN. R2 receives the User Packet 1306 and sends the User Packet 1306 to Host-B (denoted as User Packet 1307 when sent by R2 and received by Host-B).

It will be appreciated that, although primarily presented herein with respect to example embodiments in which multiple contexts are overlaid on each other in a labeled packet in a hierarchical fashion for multiple layers of a hierarchy, in at least some example embodiments only a single context may be included within a labeled packet in the presence of multiple layers of a hierarchy. The layer that adds the context may be any layer of the hierarchy; however, it is noted that where a particular layer of the hierarchy adds the context then any layer in the hierarchy that is lower than that particular layer can fragment and reassemble based on the context included by that particular layer. As a result, if the top-most layer of the hierarchy adds the context to the labeled packet then the payload of the labeled packet may be fragmented and reassembled at any of the lower layers of the hierarchy.

In at least some example embodiments, a header of a labeled packet may include, for each context of the labeled packet, a label stack for the context and a single MFH that is associated with one of the context, but which may be used by any of the contexts to support fragmentation of the labeled packet. An example of a labeled packet that includes a header that includes a label stack including multiple labels stacks for multiple respective contexts of the labeled packet and a single MFH for one of the multiple contexts of the labeled packet is presented in FIG. 14.

Figure 14:
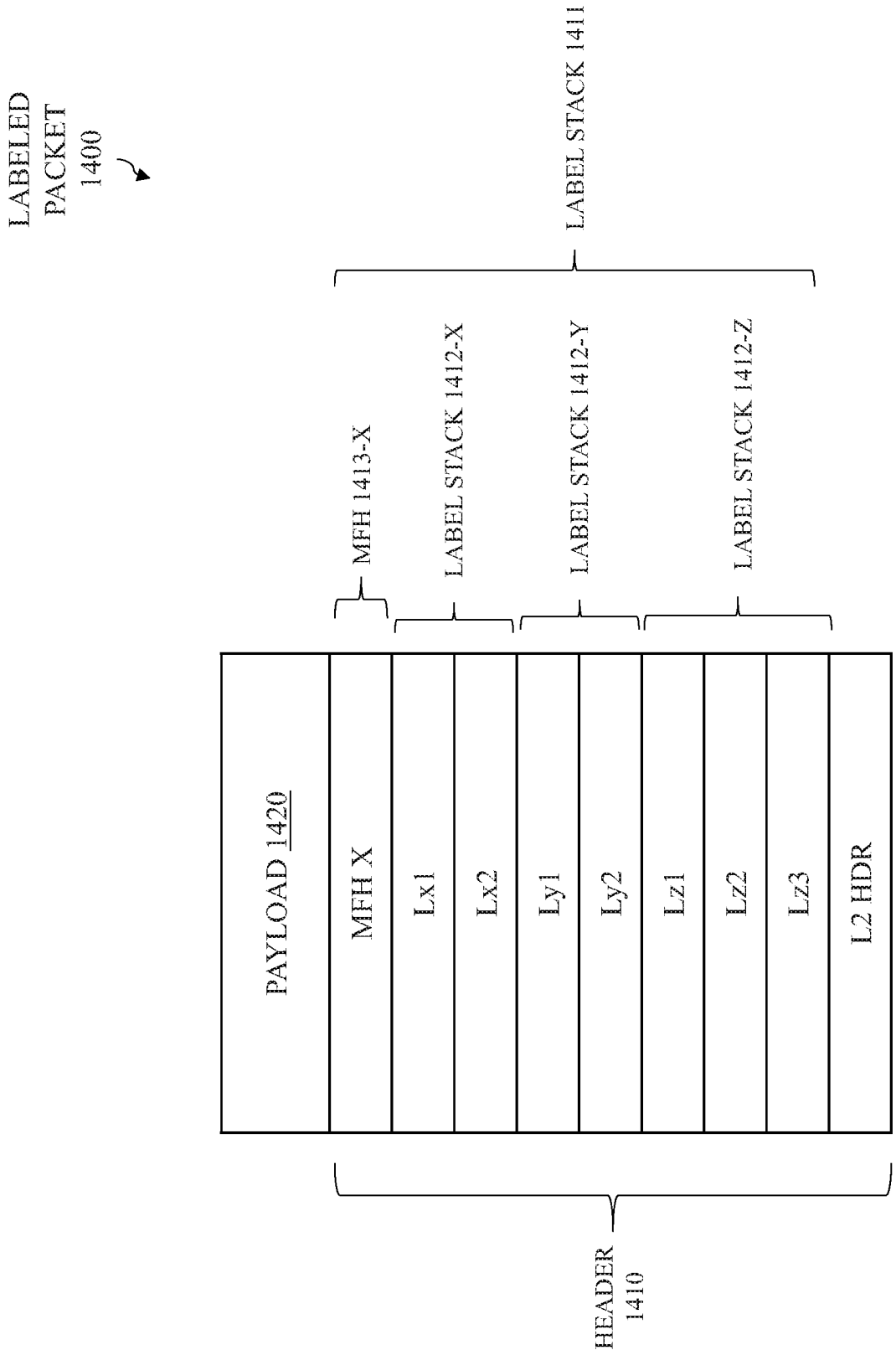
FIG. 14 depicts an example embodiment of a labeled packet that includes a label stack that includes multiple label stacks for multiple contexts and that also includes a single MPLS Fragmentation Header for the multiple contexts.

FIG. 14 depicts an example embodiment of a labeled packet that includes a label stack that includes multiple label stacks for multiple contexts and that also includes a single MPLS Fragmentation Header for the multiple contexts.

In FIG. 14, the labeled packet 1400 includes a header 1410 and a payload 1420, where the header 1410 includes a label stack 1411 that includes, for each of three contexts X, Y, and Z, a respective label stack for the context (illustratively, label stacks 1412-X, 1412-Y, and 1412-Z for contexts X, Y, and Z, respectively) and that also includes an MFH for context X (illustratively, MFH 1413-X for context X). The label stack 1412-X for context X is {Lx2, Lx1} and the MFH 1413-X for context X is {MFH x}. The label stack 1412-Y for context Y is {Ly2, Ly1}. The label stack 1412-Z for context Z is {Lz3, Lz2, Lz1}. In FIG. 14, as noted above, an MFH is added for context X (since each context would push label(s) independently), without an associated MFH being added below the label stack for context Y and above the label stack for context X and, similarly, without an associated MFH being added below the label stack for context Z and above the label stack for context Y. In other words, the MFH is pushed before the label stack of the associated context X only to support fragmentability at context X; however, since contexts Y and Z are underlays of context X, fragmentability at each of the associated contexts Y and Z is automatically supported by MFH x of context X. In this case, for context Z, (1) an ingress LER or transit LSR of context Z would fragment the payload of MFH x (i.e., {Payload}), as this is the first MFH in the order, and each fragment is then autonomously forwarded with the label stack {Lz3, Lz2, Lz1, Ly2, Ly1, Lx2, Lx1, MFH x} and (2) an egress LER of context X would reassemble the fragments. Similarly, in this case, for context Y, (1) an ingress LER or transit LSR of context Y would fragment the payload of MFH x (i.e., {Payload}), as this is the first MFH in the order, and each fragment is then autonomously forwarded with the label stack {Lz3, Lz2, Lz1, Ly2, Ly1, Lx2, Lx1, MFH x} and (2) an egress LER of context X would reassemble the fragments. Similarly, in this case, for context X, (1) an ingress LER or transit LSR of context X would fragment the payload of MFH x (i.e., {Payload}), as this is the first MFH in the order, and each fragment is then autonomously forwarded with the label stack {Lz3, Lz2, Lz1, Ly2, Ly1, Lx2, Lx1, MFH x} and (2) an egress LER of context X would reassemble the fragments. An example process for fragmentation in the PW or L3-VPN is presented with respect to FIG. 15, which is the same network as FIG. 12.

Figure 15:
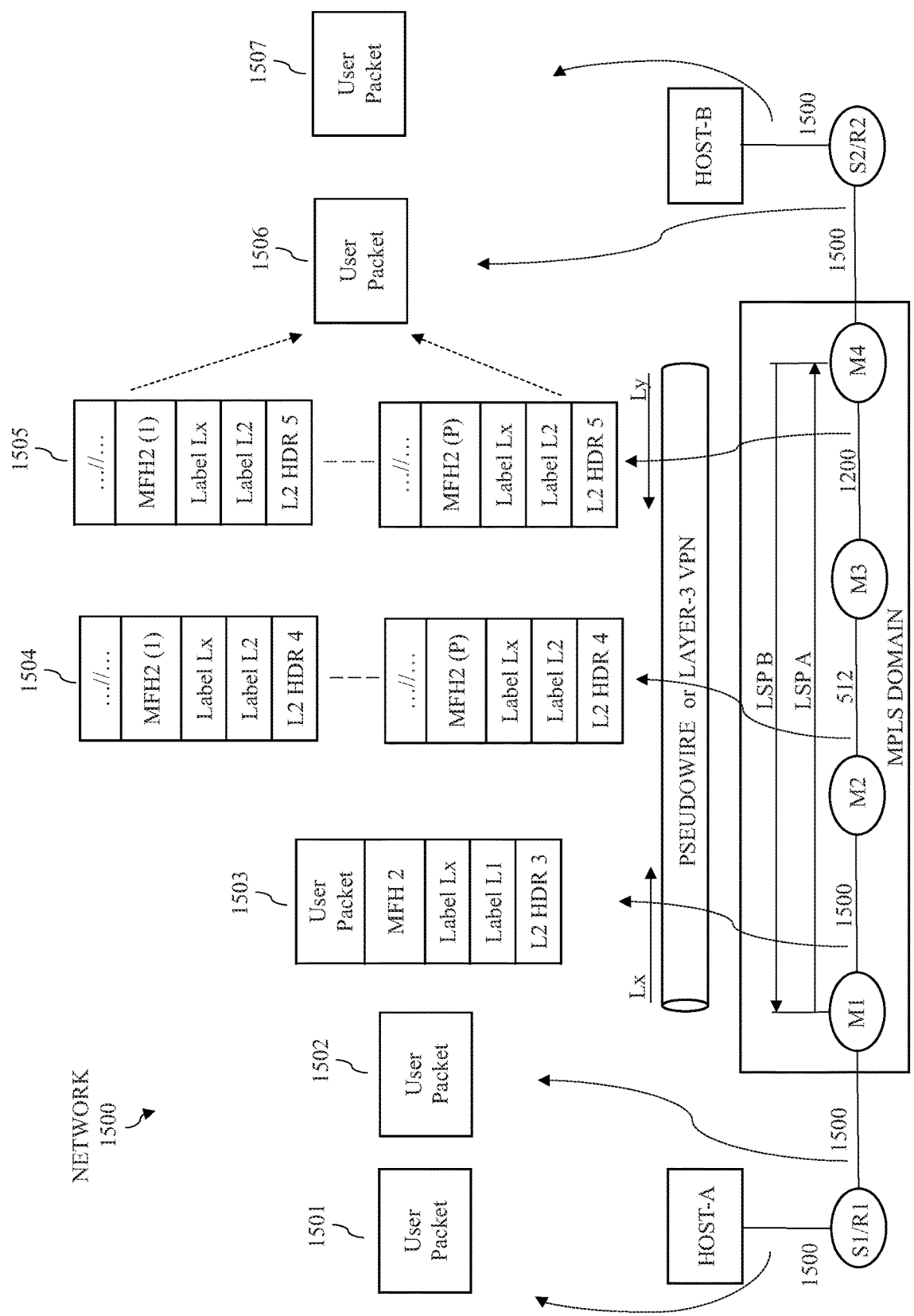
FIG. 15 depicts an example embodiment of a network for illustrating fragmentation support at the pseudowire level or the Layer 3-Virtual Private Network level when a single MPLS Fragmentation Header is provided for multiple contexts.

FIG. 15 depicts an example embodiment of a network for illustrating fragmentation support at the PW level or the L3-VPN level when a single MFH is provided for multiple contexts. The network 1500 of FIG. 15 is the same as the network 1200 of FIG. 12.

In FIG. 15, a packet is transmitted from Host-A to Host-B. It is noted that the layer-2 header (L2 HDR) on the packet changes at each hop since it is routed by each hop. It is further noted that Host-A, router R1, router R2, and Host-B are located in the private network of the PW or L3-VPN. Host-A generates the User Packet 1501 to send to Host-B. Host-A generates the User Packet 1501. Host-A sends the User Packet 1501 to its gateway router R1. R1 receives the User Packet 1501 from Host-A and routes the User Packet 1501 to M1 (illustrated as User Packet 1502). M1 receives the User Packet 1502 from R1. In FIG. 15, M1 includes the MFH only for the PW/L3-VPN (i.e., MFH 2). As a result, M1 pushes an MFH (illustratively MFH 2) before pushing the PW/L3-VPN label Lx onto the User Packet 1201 and then pushes label L1 for the next-hop M2 of LSP A. This results in packet 1503, which M1 sends toward M2. M2 receives the packet 1503 from M1. In FIG. 15, assume that the size of packet 1504 is larger than MTU of link M2->M3. In that case, M2 evaluates the label stack to look for an MFH. Fragmentation is performed on the first MFH at any position below the label that has been swapped. In this case, the first MFH below the swapped label L2 is MFH 2. The DF bit in the MFH 2 is 0, so M2 fragments the payload of MFH 2, i.e., {User Packet}, into P number of fragments, such that each fragment is large enough to meet the MTU of link M2->M3. M2 then pushes {{L2 HDR 4, Label L2, Label Lx, MFH 2} onto each fragment and updates the relevant fields (e.g., sequence number, length, and so forth) in MFH 2 on each of the fragments. This results in fragments 1504 which M2 sends to M3. It is noted that here, based on inclusion of MFH 2, the transit LSR M2 is able to fragment the payload of Label Lx even though the transit LSR M2 is agnostic of the context of Label Lx (i.e., inclusion of the MFH for a context at a particular layer, in the presence of multiple contexts at multiple layers, enables nodes which understand any context at or below the context of that particular layer to support fragmentation and reassembly of payloads of that context of that particular layer). M3 receives each fragment 1504 and forwards each fragment 1504 independently by swapping label L2 with label L3 to form fragments 1505 and forwarding the fragments 1505 to M4. M4 receives each fragment 1505 and pops label L3 from the fragment 1505 since M4 is the egress LSR for L3 and pops label Lx since M4 is egress PE router for the Lx. M4 finds MFH 2 in each of the fragments 1505, which indicates that the fragments 1505 are fragments of a packet to be reassembled. So, M4 keeps each of the fragments 1505 until receiving all of the fragments 1505, at which time M4 performs reassembly of the fragmented packet, from the payloads included within the fragments 1505, based on the information in MFH 2. After reassembly, the reassembled packet is as follows: {User Packet}. Thus, the reassembly takes place at the PW/L3-VPN level. M4 then forwards the User Packet 1506 to R2 based on the forwarding state of the PW or L3-VPN. R2 receives the User Packet 1506 and sends the User Packet 1506 to Host-B (denoted as User Packet 1507 when sent by R2 and received by Host-B).

It will be appreciated that, although primarily presented herein with respect to example embodiments in which a labeled packet is fragmented by a transit LSR when the transit LSR determines that fragmentation of the labeled packet is needed (e.g., where the labeled packet is larger than the MTU size of the outgoing link), there may be various reasons that a transit LSR does not fragment a labeled packet even when the transit LSR determines that fragmentation of the labeled packet is needed (e.g., the DF bit of the labeled packet is set to 1, the CF bit of the labeled packet is set to 1, or the like). In at least some such embodiments, as discussed further below, the transit LSR may drop the labeled packet with or without report the failure to fragment the labeled packet (e.g., depending on whether or not a reporting address is available to the transit LSR). It is noted that the reporting address may be the IP address of the destination node for the labeled packet, an IP address of a reporting server, or the like. It is further noted that a reporting address for reporting a failure to fragment a packet may be obtained by a transit LSR in various ways (e.g., from the MFH, from local storage of the transit LSR where the reporting address is programmed into the transit LSR for use in reporting fragmentation failures, or the like, as well as various combinations thereof).

In at least some example embodiments, a transit LSR, based on a determination by the transit LSR that a labeled packet that needs to be fragmented is not going to be fragmented, may drop the labeled packet without reporting the failure to fragment the labeled packet. This may be performed when a reporting address is not available to the transit router (e.g., a reporting address is not included in the MFH and the transit router is not configured with a reporting address which could be used).

In at least some example embodiments, a transit LSR, based on a determination by the transit LSR that a labeled packet that needs to be fragmented is not going to be fragmented, may drop the labeled packet while also generating a control packet (which also may be referred to herein as an MPLS Fragmentation Control (MFC) packet where MPLS fragmentation and reassembly are being used) to be sent for triggering reporting the failure to fragment the labeled packet. This control packet may be sent along the path of the original packet until it reaches the destination router of the MFH of the original packet or the destination of the original packet, may be directed to one or more other devices not part of the original path (e.g., one or more servers), or the like, as well as various combinations thereof. This control packet may trigger sending of a reporting message to report the failure to fragment the labeled packet (e.g., an ICMP message with "MTU exceeded" code or other type of messaging), which may result in reporting of the failure to fragment the labeled packet to the source of the labeled packet, the source of the context layer at which fragmentation failed, one or more servers, or the like, as well as various combinations thereof.

In at least some example embodiments, a transit LSR that generates a control packet configured to trigger reporting of a failure to fragment a labeled packet may generate the control packet as follows (where it is noted that the following description is for generation of an MFC packet as the reporting packet): (1) create a new packet by copying initial copy length (specified in the MFH) bytes from the original packet (it is noted that copy length typically may be set by the sender to a value such that it includes all headers from the original packet that are significant to the sender), (2) push the original MFH onto the new packet, (3) update the following fields in MFH as follows: (3a) type="control" to indicate the packet as an MFC packet, (3b) CF=1 to indicate the failure to fragment the packet, and (3c) DF=1 so that the packet is not fragmented further, (4) push the subsequent headers from the original packet pushed into the MFC packet so that the packet traverses the same path as the original packet, and (5) forward the resulting MFC packet to the next-hop of the path.

In at least some example embodiments, a destination router of the MFH that receives an MFC packet that is configured as discussed above may identify the MFC packet based on the type field in the MFH and may then initiate reporting of the failure to fragment the labeled packet based on the determination that the receives packet is an MFC packet. The destination router of the MFH may initiate reporting of the failure to fragment the labeled packet by generating a reporting packet based on the control packet and sending the reporting packet to the reporting address, which, as indicated above, may be obtained in various ways (e.g., from the MFH, from local storage of the destination router of the MFH, or the like), may be associated with various devices (e.g., the source of the labeled packet, the source of the context layer at which fragmentation failed, one or more servers, or the like), and so forth. For example, the destination router of the MFH may report the failure to fragment the labeled packet by removing the MFH, creating an ICMP message with an "MTU exceeded" code that also includes the payload of MFH, and sending the ICMP message to the reporting IP address specified in MFH. An example process for handling reporting of failure to fragment in the PW or L3-VPN is presented with respect to FIG. 16, which is the same network as FIG. 12.

Figure 16:
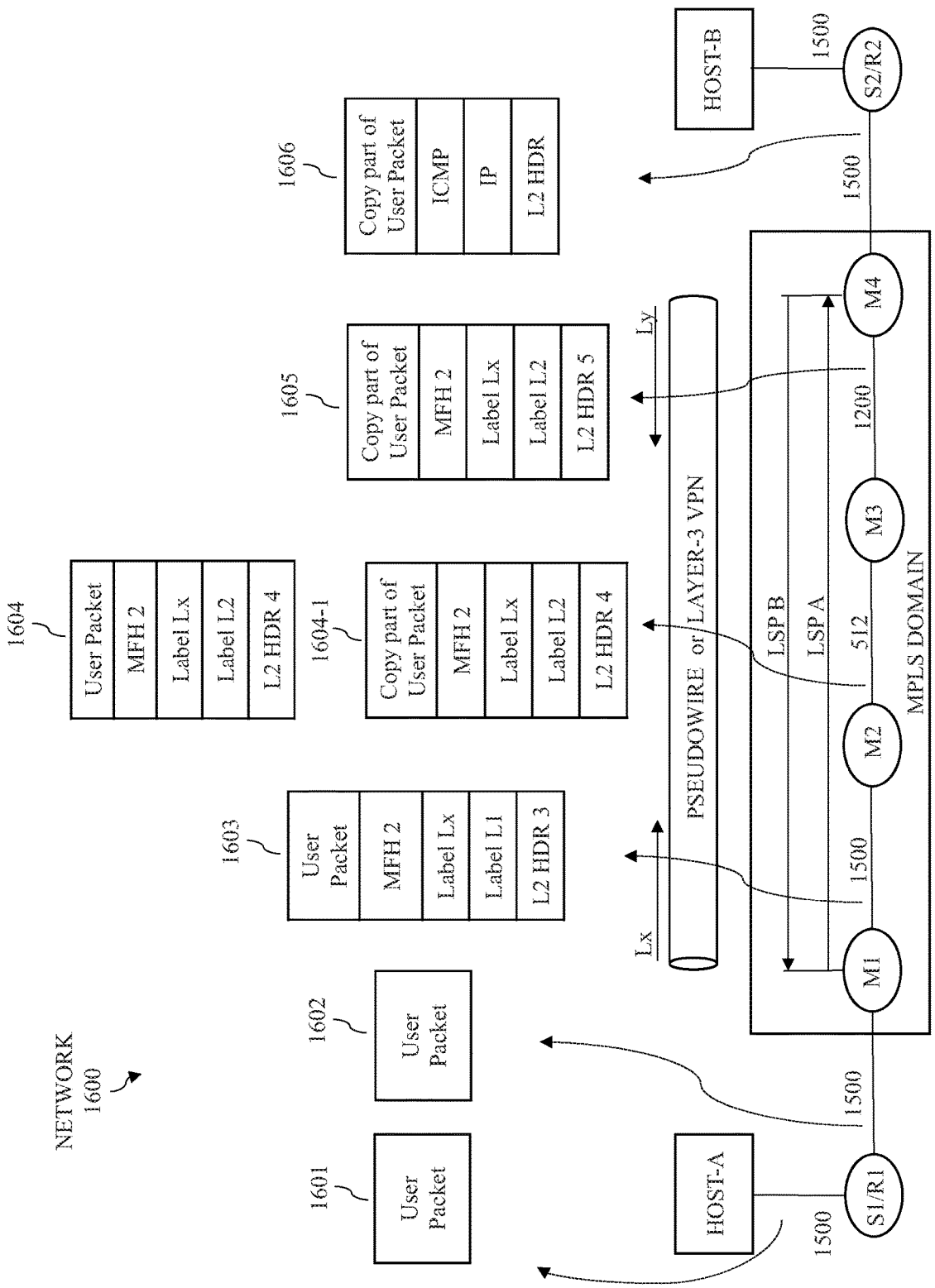
FIG. 16 depicts an example embodiment of a network for illustrating handling of reporting of failure to fragment an MPLS packet in conjunction with fragmentation support at the pseudowire level or the Layer 3-Virtual Private Network level when a single MPLS Fragmentation Header is provided for multiple contexts.

FIG. 16 depicts an example embodiment of a network for illustrating handling of reporting of failure to fragment an MPLS packet in conjunction with fragmentation support at the PW level or the L3-VPN level when a single MFH is provided for multiple contexts. The network 1600 of FIG. 16 is the same as the network 1200 of FIG. 12.

In FIG. 16, a packet is transmitted from Host-A to Host-B. It is noted that the layer-2 header (L2 HDR) on the packet changes at each hop since it is routed by each hop. It is further noted that Host-A, router R1, router R2, and Host-B are located in the private network of the PW or L3-VPN. Host-A generates the User Packet 1601 to send to Host-B. Host-A sends the User Packet 1601 to its gateway router R1. R1 receives the User Packet 1601 from Host-A and routes the User Packet 1601 to M1 (illustrated as User Packet 1602). M1 receives the User Packet 1602 from R1. In FIG. 16, M1 includes the MFH only for the PW/L3-VPN (i.e., MFH 2). As a result, M1 pushes an MFH (illustratively MFH 2) before pushing the PW/L3-VPN label Lx onto the User Packet 1601 and then pushes label L1 for the next-hop M2 of LSP A. This results in packet 1603, which M1 sends toward M2. M2 receives the packet 1603 from M1. In FIG. 16, assume that the size of packet 1604 is larger than MTU of link M2->M3. In that case, M2 evaluates the label stack to look for an MFH. In this example, assume that M2 evaluates the MFH 2 and determines that the DF in MFH 2 is set to 1 (i.e., do not fragment) and, thus, does not fragment the packet 1604. M2 generates an MFC packet 1604-1 by first copying copy length bytes from the packet 1604 and then pushing {L2 HDR 4, Label L2, Label Lx, MFH 2} onto the copied portion of packet 1604. MFH 2 is set with DF=1 (since this control packet is not to be fragmented) and CF=1 (to indicate that the packet is an MFC packet). M2 sends the MFC packet 1604-1 to M3 and drops the original packet 1604. The MFC packet 1604-1 eventually reaches M4 as MFC packet 1605. M4, after popping Labels L3 and Lx, determines that the MFC packet 1605 is an MFC packet based on the type field in MFH 2 being set as control. M4, based on a determination that the CF field in the MFH 2 is set to "1" (i.e., fragmentation failed), creates an ICMP MTU exceeded message by appending the payload of the MFC packet and setting the reporting address to the IP address of the head-end router of the context to form reporting packet 1606. M4 may determine the reporting address from the MFH 2 or, if the reporting address is not included in MFH 2, may determine the reporting address from the control plane information for Label Lx. M4 may then forward the reporting packet 1606.

The MFH that is used to support fragmentation and reassembly of MPLS packets at various contexts may be encoded in various ways. An example embodiment for encoding an MFH is presented with respect to FIG. 17.

Figure 17:
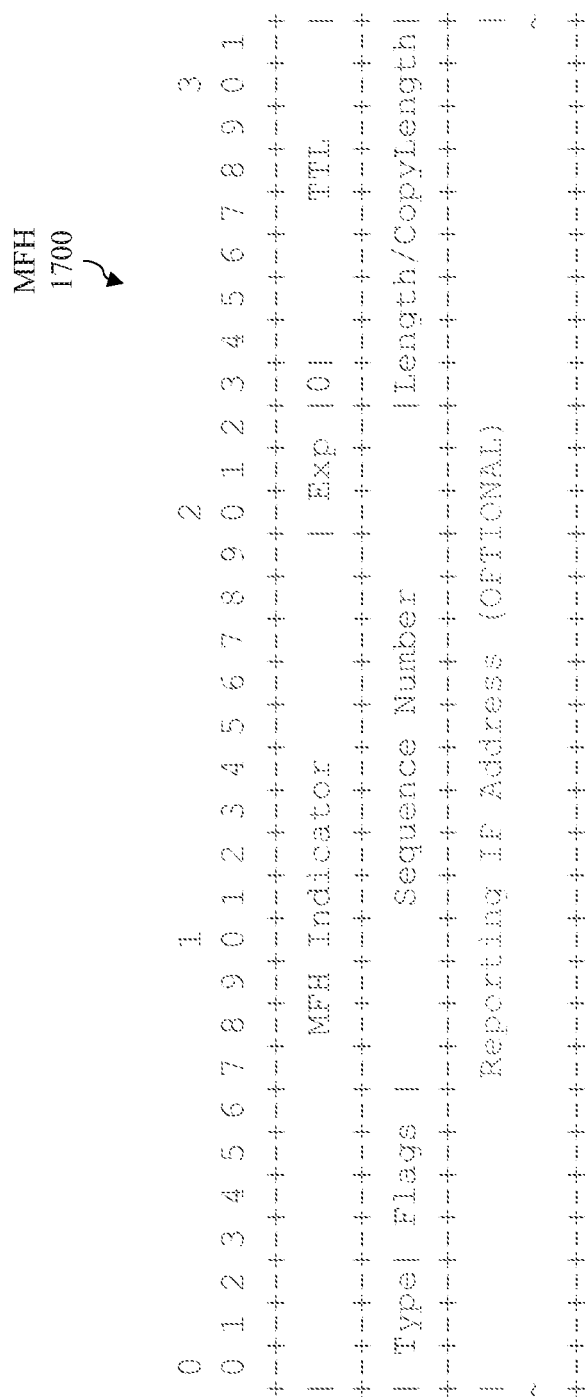
FIG. 17 depicts an example embodiment of an MPLS Fragmentation Header configured to support fragmentation and reassembly of MPLS packets.

As depicted in FIG. 17, MFH 1700 may include a 20-bit MFH Indicator field, a 3-bit Exp field, a 1-bit S field, a 4-bit TTL field, a 3-bit Type field, a 4-bit Flags field, a 16-bit Sequence Number field, a 9-bit Length/Copy Length field, and an optional Reporting IP address field. It will be appreciated that the minimum size of MFH 1700 is 8 octets (based on the mandatory fields) and that it could be longer if the OPTIONAL reporting IP address is included (namely, 12 octets in the case of an IPv4 reporting address or 24 octets in the case of an IPv6 reporting address).

The MFHI field may include any value suitable for enabling a receiving router to unambiguously distinguish MFH 1700 within the label stack. It will be appreciated that the MFHI value of the MFHI can be reserved at IANA registry on special-purpose labels (https://www.iana.org/assignments/mpls-label-values/mpls-label-values.xhtml).

The EXP field may be set to the same value as in the fragmentable label of the labeled packet.

The S bit field may be set in a manner indicative as to whether additional labels follow the MFH (e.g., set to "0" is additional labels follow the MFH or set to "1" if no additional labels follow the MFH).

The TTL field may be set to the same value as in the fragmentable label of the labeled packet.

The Type field may be set to a value that indicates the type of the payload of the MFH. The following types may be defined: 0=unfragmented packet, 1=control packet, 2=first fragment, 3=intermediate fragment, 4=last fragment. It will be appreciated that these payload types may be indicated in other ways, that other payload types may be defined, and so forth.

The Flags field may include the following bits: (1) Bit 0 may be a Don't Fragment bit (e.g., set to "1" means that the payload of the MFH cannot be fragmented and set to "0" means that the payload of the MFH can be fragmented), (2) Bit 1 may be a Can't Fragment bit which may only be meaningful when the Type of the MFH is set to "control packet" (e.g., set to "1" means that the router needed to fragment the packet but failed to do so), (3) Bit 2 may be an R bit which is configured to indicate whether a reporting address is included in the MFH (e.g., set to "1" means that a reporting address is included in the MFH and set to "0" means that a reporting address is not included in the MFH), and (4) Bit 3 may be an A bit which may be configured to indicate an IP address type (IPv4 or IPv6) of a reporting address included in the MFH and, thus, which may only be meaningful when the R bit is set in a manner indicating the MFH includes a reporting address (e.g., set to "1" means that the reporting address in the MFH is an IPv6 address and set to "0" means that the reporting address included in the MFH is an IPv4 address). It will be appreciated that the bits may be placed in different locations within the Flags field, may be defined in other ways, or so forth.

The Sequence Number field indicates the global sequence number of a fragment. This field is valid if the Type field indicates the payload as fragment (i.e., the Type value is 2 or 3 or 4). Value 0 is invalid for a fragment. Thus, the sequence number wraps around after 65535 fragments.

The Length field, which uses the same bits as the Copy Length field, indicates the length of a fragment in units of 8 byte blocks. This field is valid if the Type field indicates the payload as fragment (i.e., Type value is 2 or 3 or 4). Thus, the maximum size of a fragment can be 4096 bytes.

The Copy Length field, which uses the same bits as the Length field, is valid when the Type field indicates an unfragmented packet. The field indicates the number of initial bytes in units of 8 byte blocks that are to be copied from the payload while generating a MFC packet.

It will be appreciated that the MFH may be configured in various other ways (e.g., using fewer or more fields, different fields, or the like, as well as various combinations thereof).

It will be appreciated that an MPLS packet may be originated in various ways. If an LSR is an ingress LER for an MPLS context and the ingress LER allows fragmentation of payload for that context then, while originating a packet for the context, the LER pushes an MFH into the packet before pushing the label stack of that context. It is noted that, if the LER has already pushed an MFH for a higher level context, the LER may avoid pushing an additional MFH for a lower level context or may push an additional MFH for a lower level context. It is noted that, in at least some cases, it is expect to be at least sufficient, and potentially optimal, for the LER to include an MFH only for one context since that single MFH will support fragmentability of the packet at the switching node of any context.

It will be appreciated that an MPLS packet may be dispatched to a next hop in various ways. Example embodiments for supporting dispatching of an MPLS packet by an LSR (e.g., an ingress LER or a transit LSR) for any of the contexts in a labelled packet are presented with respect to FIG. 18 (which includes an example embodiment of pseudocode) and FIG. 19 (which includes an example method configured to support the process of the pseudocode of FIG. 18).

FIG. 18 depicts an example embodiment of pseudocode configured to support dispatching of an MPLS packet. The procedure provided by the pseudocode 1800 is referred to herein as MPLS_Send_Whole_Packet_Or_Fragment (Packet, NextHop). In pseudocode 1800, the following are the inputs to MPLS_Send_Whole_Packet_Or_Fragment (Packet, NextHop): (1) Packet is the final MPLS packet to be sent to its next-hop, and the label stack in the Packet is referred to by the array Packet->Label[ ] where Packet->Label[0] is the outermost label, (2) Packet->End is the pointer to end of the packet, and (3) NextHop is the next-hop of the MPLS packet. The pseudocode 1800 is configured to support sending of MPLS packets. It is noted that an example embodiment of a method configured to support dispatching of an MPLS packet in accordance with the example pseudocode 1800 of FIG. 18 is presented with respect to FIG. 19.

Figure 19:
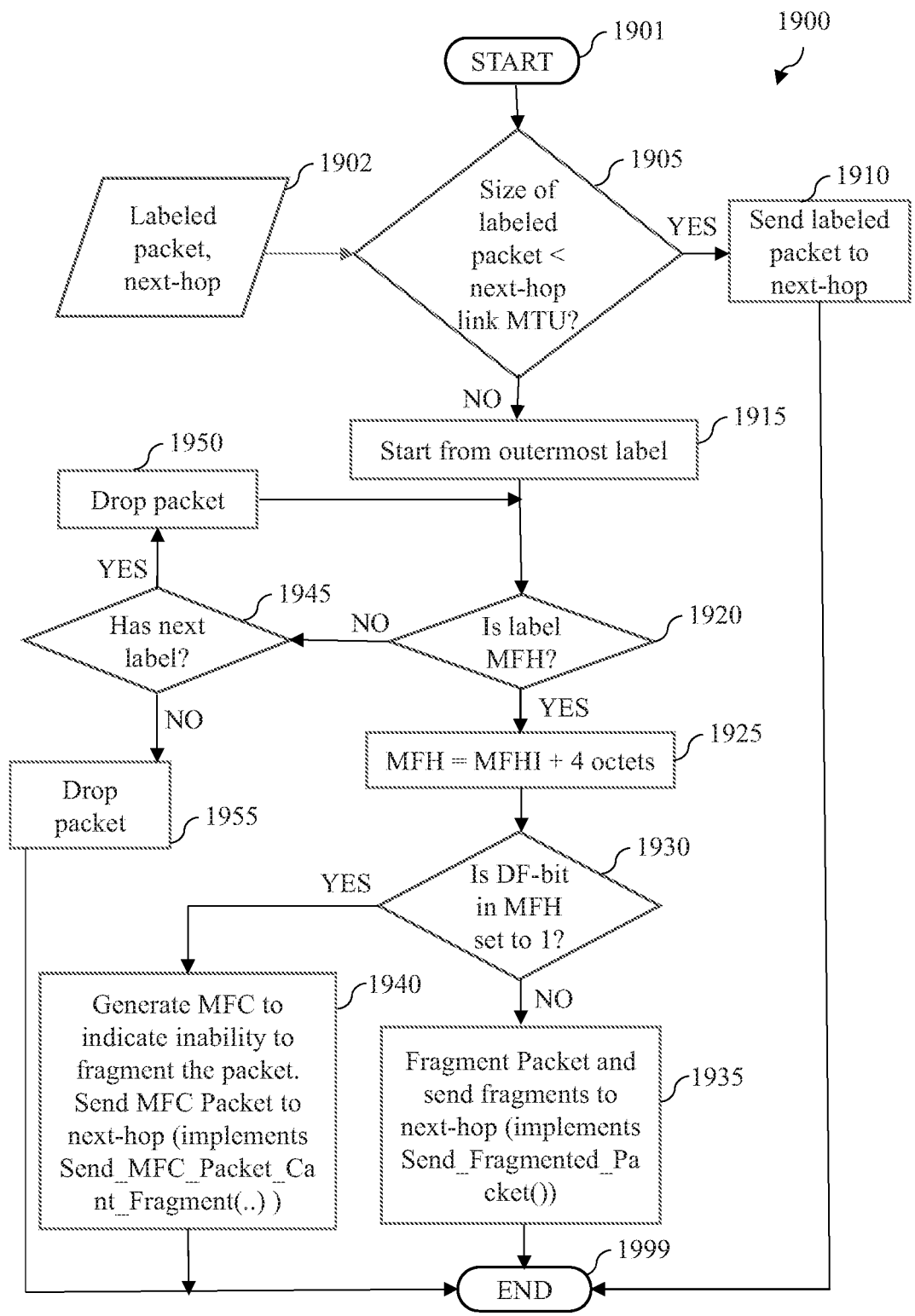
FIG. 19 depicts an example embodiment of a method configured to support dispatching of an MPLS packet in accordance with the example pseudocode of FIG. 17.

FIG. 19 depicts an example embodiment of a method configured to support dispatching of an MPLS packet in accordance with the example pseudocode of FIG. 18. It will be appreciated that, although primarily presented as being performed serially, at least a portion of the functions of method 1900 of FIG. 19 may be performed contemporaneously or in a different order than as presented with respect to FIG. 19. At block 1901, method 1900 begins. The method 1900 is performed based on an input block 1902, which includes a labeled packet to be processed and an indication of a next-hop for the labeled packet. At block 1905, a determination is made, based on input block 1902, as to whether a size of the labeled packet is less than the MTU of the next-hop link of the next-hop for the labeled packet. If the size of the labeled packet is less than the MTU of the next-hop link of the next-hop for the labeled packet, method 1900 proceeds to block 1910. At block 1910, since the size of the labeled packet satisfies the MTU of the next-hop link of the next-hop for the labeled packet, the labeled packet is sent to the next-hop for the labeled packet. From block 1910, method 1900 proceeds to block 1999, where method 1900 ends. If the size of the labeled packet is not less than the MTU of the next-hop link of the next-hop for the labeled packet, method 1900 proceeds to block 1915 since fragmentation of the labeled packet is needed. At block 1915, the outermost label of the labeled packet is selected. At block 1920, a determination is made as to whether the selected label (i.e., the outermost label in a first pass through the fragmentation process or a next label in a subsequent pass through the fragmentation process) is an MFHI. If, at block 1920, the selected label is not an MFHI, method 1900 proceeds to block 1945. If, at block 1920, the selected label is an MFHI, method 1900 proceeds to block 1925. At block 1925, the MFH is determined as the MFHI plus the next 4 octets of the labeled packet. At block 1930, a determination is made as to whether the DF bit in the MFH is set to "1" (i.e., whether or not the payload of the MFH can be fragmented). If, at block 1930, the DF bit in the MFH is not set to "1" (i.e., the payload of the MFH is permitted to be fragmented), method 1900 proceeds to block 1935. At block 1935, the labeled packet is fragmented and the fragments are sent to the next-hop. The fragmentation of the labeled packet and sending of the resulting fragments to the next-hop may be performed based on the procedure Send Fragmented Packet (which is presented with respect to FIG. 20 and FIGS. 21A and 21B). If, at block 1930, the DF bit in the MFH is set to "1" (i.e., the payload of the MFH is not permitted to be fragmented), method 1900 proceeds to block 1940. At block 1940, an MFC packet is generated to indicate the inability to fragment the labeled packet and the MFC packet is sent to the next-hop. The generation of the MFC packet and sending of the MFC packet to the next-hop may be performed based on the procedure Send_MFC_Packet_Cant_Fragment (which is presented with respect to FIGS. 22A and 22B and FIG. 23). From blocks 1935 and 1940, method 1900 proceeds to block 1999, where method 1900 ends. At block 1945, a determination is made as to whether the labeled packet as a next label. If, at block 1945, the labeled packet has a next label, method 1900 proceeds to block 1950. At block 1950, the next label of the labeled packet is selected. From block 1950, method 1900 returns to block 1920 to determine processing of the next label of the labeled packet that was selected. If, at block 1945, the labeled packet does not have a next label, method 1900 proceeds to block 1955. At block 1955, the labeled packet is dropped (since it cannot be fragmented and cannot be sent over the next-hop link to the next-hop due to the MTU of the next-hop link of the next-hop). From block 1955, method 1900 proceeds to block 1999, where method 1900 ends. At block 1999, as indicated above, method 1900 ends.

FIGS. 20A and 20B depict an example embodiment of pseudocode configured to support fragmentation of an MPLS packet. The procedure provided by the pseudocode 2000 is referred to herein as Send_Fragmented_Packet (Packet, MFH In Packet, NextHop, MTU). In pseudocode 2000, the following are the inputs to Send_Fragmented_Packet (Packet, MFH In Packet, NextHop, MTU): (1) Packet is the MPLS packet to be fragmented before being sent to its next-hop, (2) MFH_In_Packet is the pointer to the MFH in the MPLS packet, (3) NextHop is the next-hop of the MPLS packet, and (4) MTU is the MTU size of the next-hop link of the next-hop of the MPLS packet. The pseudocode 2000 is configured to support fragmentation of an MPLS packet based on a specified MTU and to send each of the resulting fragmented to the next-hop. It is noted that pseudocode 2000 may be used to provide block 1935 of method 1900 of FIG. 19. It is noted that an example embodiment of a method configured to support fragmentation of an MPLS packet in accordance with the example pseudocode 2000 of FIGS. 20A and 20B is presented with respect to FIGS. 21A and 21B.

Figure 21A:
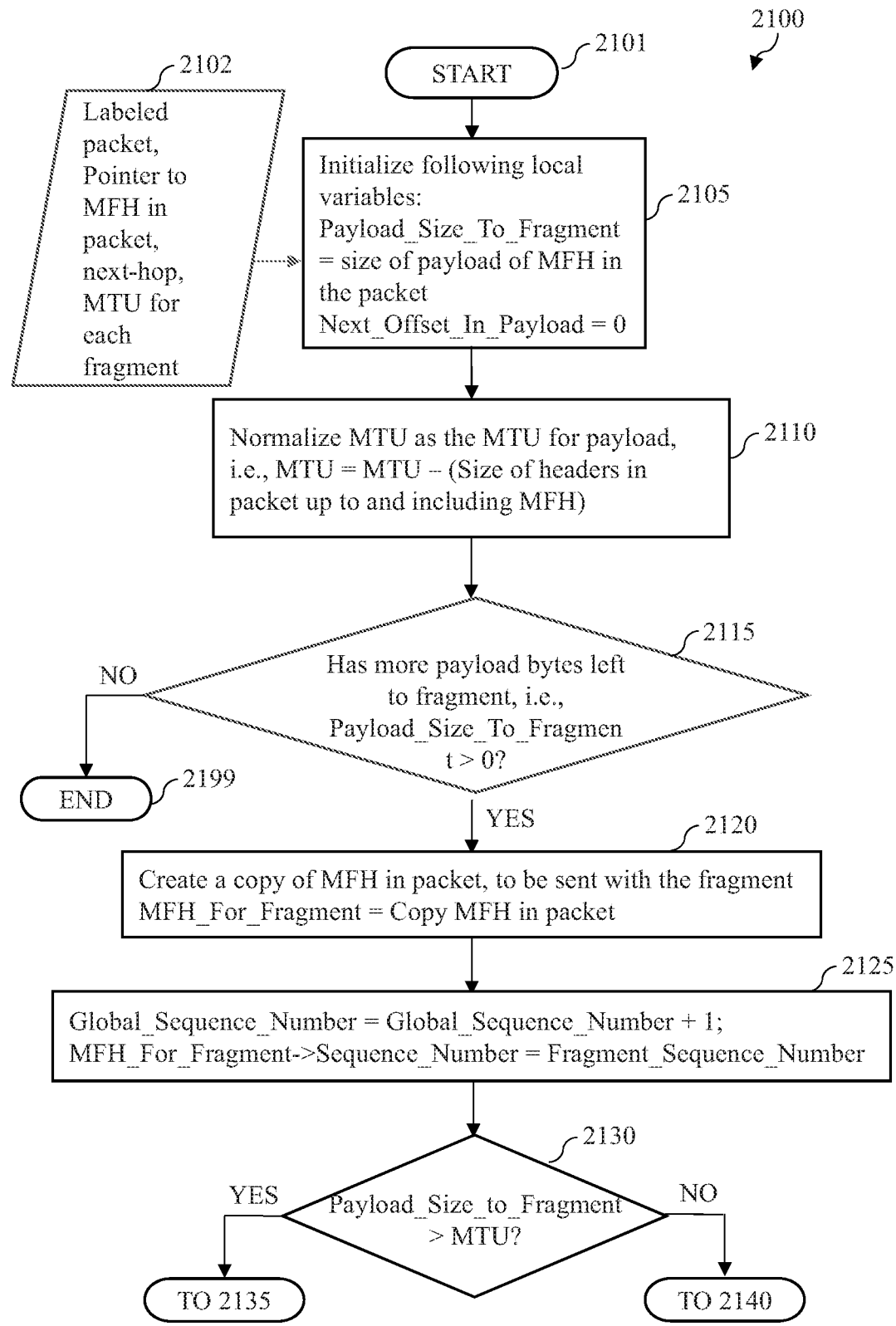
FIGS. 21A and 21B depict an example embodiment of a method configured to support fragmentation of an MPLS packet in accordance with the example pseudocode of FIGS. 20A and 20B.
Figure 21B:
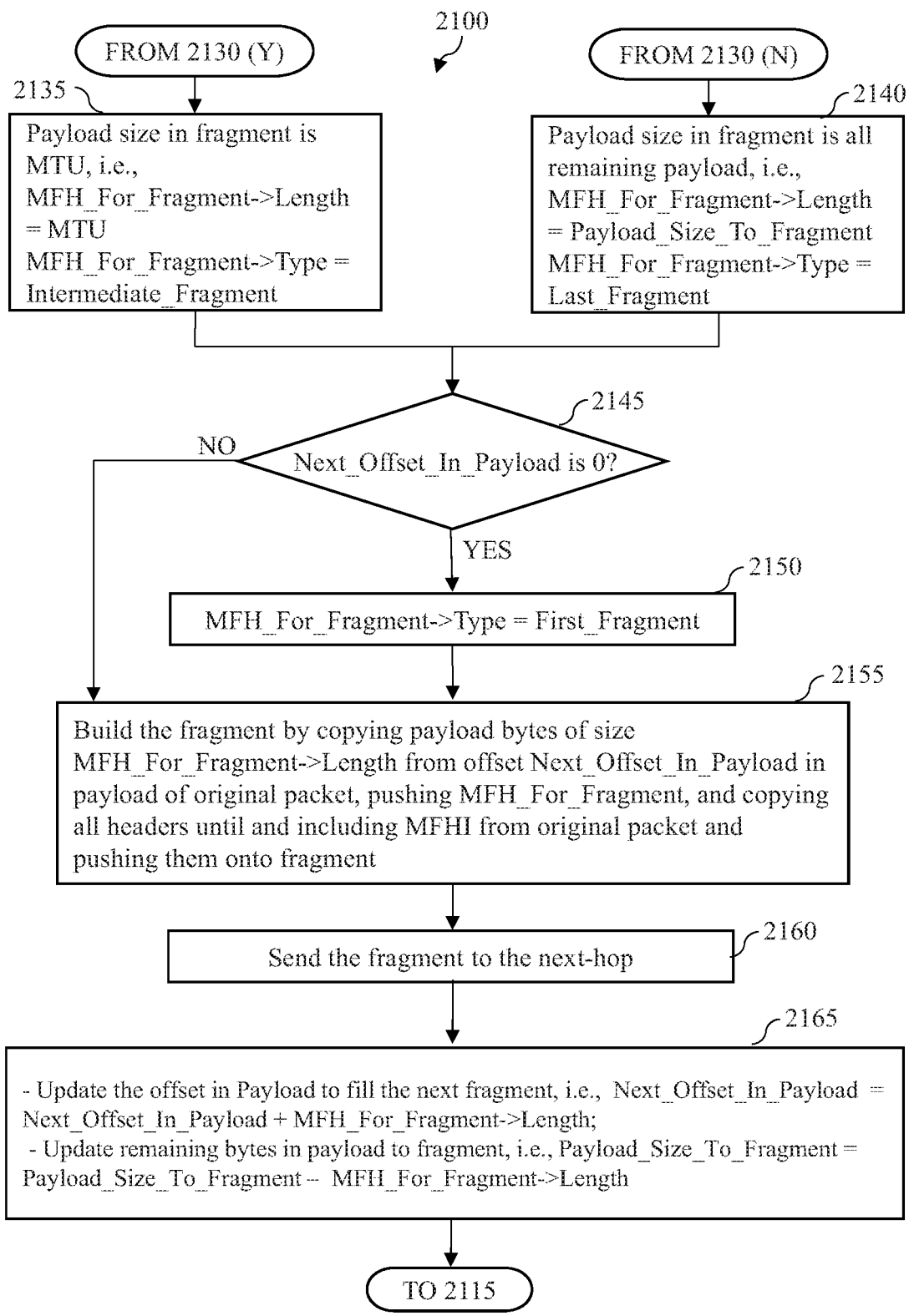

FIGS. 21A and 21B depict an example embodiment of a method configured to support fragmentation of an MPLS packet in accordance with the example pseudocode of FIGS. 20A and 20B. It will be appreciated that method 2100 may be used to provide block 1935 of method 1900 of FIG. 19. It will be appreciated that, although primarily presented as being performed serially, at least a portion of the functions of method 2100 of FIGS. 21A and 21B may be performed contemporaneously or in a different order than as presented with respect to FIGS. 21A and 21B. At block 2101, method 2100 begins. The method 2100 is performed based on an input block 2102, which includes a labeled packet to be fragmented, a pointer to the MFH in the labeled packet, an indication of a next-hop for the labeled packet, and an MTU of the next-hop link of the next-hop. At block 2105, the following local variables are initialized: (1) Payload_Size_To_Fragment=size of payload of MFH in the labeled packet and (2) Next_Offset_In_Payload=0. At block 2110, the MTU is normalized as the MTU for the payload, i.e., the maximum size of a fragment of the payload that can be included in the fragmented packet. The MTU may be normalized as MTU=MTU−(size of headers in packet up to and including MFH). At block 2115, a determination is made as to whether the payload has more bytes left to fragment. (e.g., Payload_Size_To_Fragment>0). If the payload does not have more bytes left to fragment, method 2100 proceeds to block 2199, where method 2100 ends. If the payload does have more bytes left to fragment, method 2100 proceeds to block 2120. At block 2120, a copy of the MFH in the packet is created to be sent with the fragment. This may be denoted as MFH_For_Fragment=copy of MFH in packet. At block 2125, sequence numbers associated with the fragment are set. The global sequence number is incremented (denoted as Global_Sequence_Number=Global_Sequence_Number+1). The Sequence Number field in the MFH is set equal to the fragment sequence number for the fragment (denoted as MFH_For_Fragment->Sequence_Number=Fragment_Sequence_Number). At block 2130, a determination is made as to whether the size of the payload of the MFH in the labeled packet is greater than the MTU size of the next-hop link of the next-hop (which may be denoted as Payload_Size_To_Fragment>MTU). If, at block 2130, the size of the payload of the MFH in the labeled packet is greater than the MTU size of the next-hop link of the next-hop, method 2100 proceeds to block 2135. At block 2135, the payload size in the fragment is equal to the MTU size (since there is still more than MTU size worth of bytes in the labeled packet to be fragmented) and, thus, the Length field in the MFH of the fragment is set equal to the MTU size (denoted as MFH_For_Fragment->Length=MTU) and the Type field in the MFH of the fragment is set to a value indicative that the fragment is an intermediate fragment (denoted as MFH_For_Fragment->Length=Intermediate Fragment). If, at block 2130, the size of the payload of the MFH in the labeled packet is not greater than the MTU size of the next-hop link of the next-hop, method 2100 proceeds to block 2140. At block 2140, the payload size in the fragment is less than the MTU size (there is less than MTU size worth of bytes in the labeled packet to be fragmented and the payload size in the fragment is all of the remaining payload) and, thus, the Length field in the MFH of the fragment is set equal to the remaining payload to be fragmented (denoted as MFH_For_Fragment->Length=Payload_Size_To_Fragment) and the Type field in the MFH of the fragment is set to a value indicative that the fragment is the last fragment (denoted as MFH_For_Fragment->Length=Last Fragment). From blocks 2135 and 2140, method 2100 proceeds to block 2145. At block 2145, a determination is made as to whether the fragment sequence number for the fragment is "1". If, at block 2145, Next_Offset_In_Payload is "0", method 2100 proceeds to block 2150. At block 2150, the Type field in the MFH of the fragment is set to a value indicative that the fragment is the first fragment (denoted as MFH_For_Fragment->Length=First_Fragment). From block 2150, method 2100 proceeds to block 2155. If, at block 2145, the Next_Offset_In_Payload is not "0", method 2100 proceeds to block 2155. At bock 2155, the fragment is built. The fragment is built by copying the payload bytes from the payload of the labeled packet (which may be denoted as copying payload bytes of size MFH_For_Fragment->Length from offset Next_Offset_In_Payload in payload of original packet), pushing the MFH for the fragment onto the payload for the fragment (which may be denoted as pushing MFH_For_Fragment), and copying the headers up to and including the MFHI from the original packet and pushing the headers onto the fragment. At block 2160, the fragment is sent to the next-hop. At block 2165, Update the offset in Payload to fill the next fragment (i.e., Next_Offset_In_Payload=Next_Offset_In_Payload+MFH_For_Fragment->Length) and update remaining bytes in payload to fragment (i.e., Payload_Size_To_Fragment=Payload_Size_To_Fragment−MFH_For_Fragment->Length). From block 2165, method 2100 returns to block 2115. At block 2199, method 2100 ends.

FIGS. 22A and 22B depict an example embodiment of pseudocode configured to support sending of a control packet when an MPLS packet cannot be fragmented. The procedure provided by the pseudocode 2200 is referred to herein as Send_MFC_Packet_Cant_Fragment (Packet, MFH_In_Packet, NextHop). In pseudocode 2200, the following are the inputs to Send_MFC_Packet_Cant_Fragment (Packet, MFH_In_Packet, NextHop): (1) Packet is the MPLS packet that cannot be fragmented, (2) MFH_In_Packet is the pointer to the MFH in the MPLS packet, and (3) NextHop is the next-hop of the MPLS packet. The pseudocode 2200 is configured to support generation and sending of an MFC control packet to indicate that the MPLS packet cannot be fragmented. It is noted that pseudocode 2200 may be used to provide block 1940 of method 1900 of FIG. 19. It is noted that an example embodiment of a method configured to support generation and sending of an MFC control packet to indicate that the MPLS packet cannot be fragmented in accordance with the example pseudocode 2200 of FIGS. 22A and 22B is presented with respect to FIG. 23.

Figure 23:
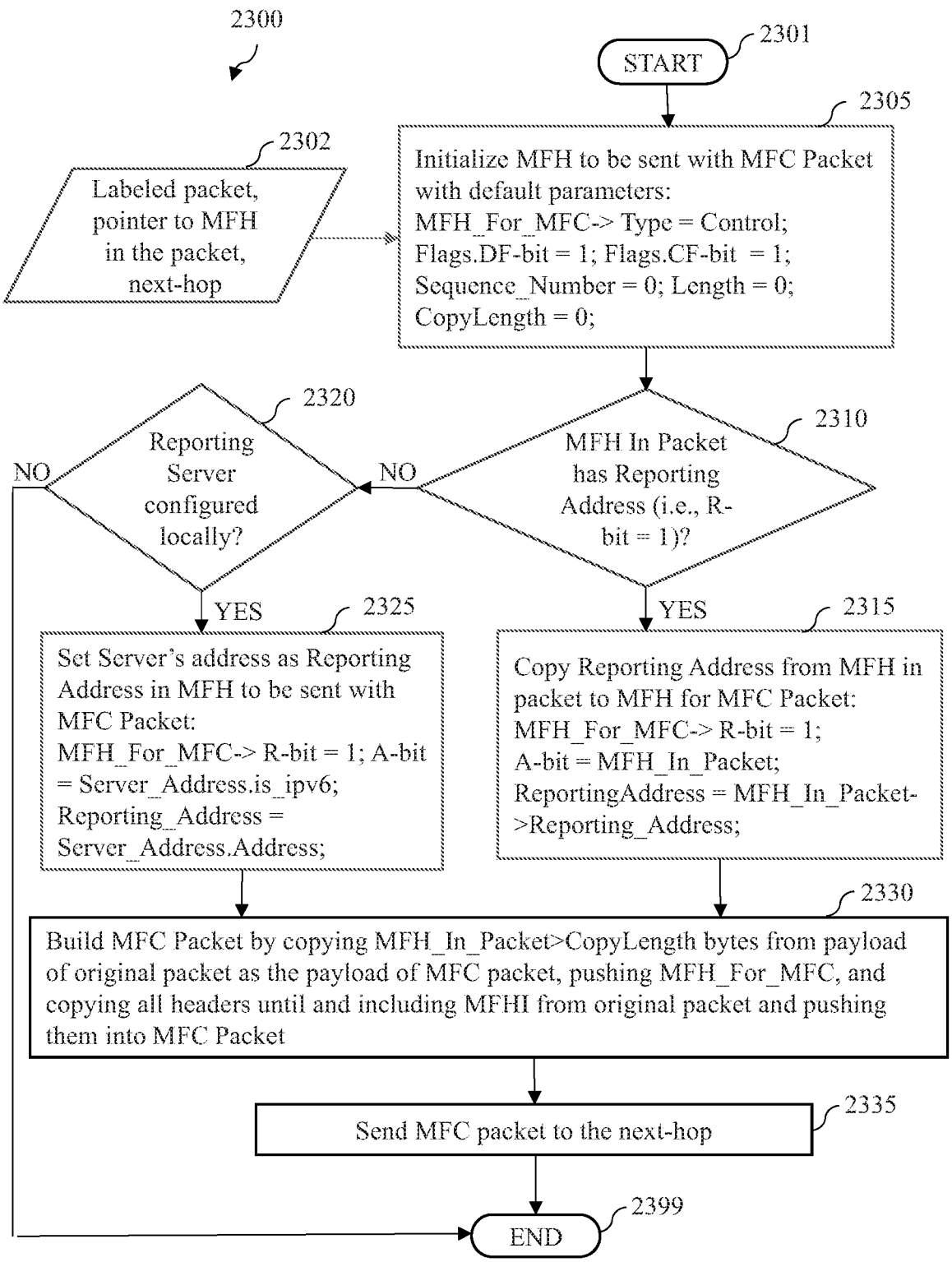
FIG. 23 depicts an example embodiment of a method configured to support sending of a control packet when an MPLS packet cannot be fragmented in accordance with the example pseudocode of FIG. 17.

FIG. 23 depicts an example embodiment of a method configured to support sending of a control packet when an MPLS packet cannot be fragmented in accordance with the example pseudocode of FIGS. 22A and 22B. It will be appreciated that method 2300 may be used to provide block 1940 of method 1900 of FIG. 19. It will be appreciated that, although primarily presented as being performed serially, at least a portion of the functions of method 2300 of FIG. 23 may be performed contemporaneously or in a different order than as presented with respect to FIG. 23. At block 2301, method 2300 begins. The method 2300 is performed based on an input block 2302, which includes a labeled packet which cannot be fragmented, a pointer to the MFH in the labeled packet, an indication of a next-hop for the labeled packet. At block 2305, the MFH to be sent with the MFC packet is initialized with default parameters. For example, the Type field of the MFH for the MFC packet may be set to a value indicative that the packet is an MFC packet (denoted as MFH_For_MFC->Type=Control), the DF-bit in the Flags field of the MFH for the MFC packet may be set to a value indicative that the MFC packet is not to be fragmented (denoted as MFH_For_MFC->Flags.DF-bit=1), the CF-bit in the Flags field of the MFH for the MFC packet may be set to a value indicative that the packet cannot be fragmented (denoted as MFH_For_MFC->Flags.CF-bit=1), the Sequence_Number field of the MFH for the MFC packet is set to "0" (denoted as MFH_For_MFC->Sequence_Number=0), the Length field of the MFH for the MFC packet is set to "0" (denoted as MFH_For_MFC->Length=0), and the Copy Length field of the MFH for the MFC packet is set to "0" (denoted as MFH_For_MFC->CopyLength=0). At block 2310, a determination is made as to whether the MFH in the labeled packet has a reporting address (e.g., a determination as to whether the R-bit in the MFH of the labeled packet is set to "1"). If, at block 2310, the MFH in the labeled packet has a reporting address, method 2300 proceeds to block 2315. At block 2315, the reporting address from the MFH of the labeled packet is copied to the MFH to be sent with the MFC packet. For example, the R-bit field of the MFH for the MFC packet may be set to a value indicative that the MFC packet includes a reporting address (denoted as MFH_For_MFC->R-bit=1), the A-bit field of the MFH for the MFC packet may be set to a value indicative of the address type (e.g., IPv4 or IPv6) of the reporting address of the MFH of the labeled packet (denoted as MFH_For_MFC->A-bit=MFH_In_Packet->A-bit), and the Reporting Address field of the MFH for the MFC packet may be set to include the reporting address from the MFH of the labeled packet (denoted as MFH_For_MFC->ReportingAddress=MFH_In_Packet->ReportingAddress). From block 2315, method 2300 proceeds to block 2330. If, at block 2310, the MFH in the labeled packet does not have a reporting address, method 2300 proceeds to block 2320. At block 2320, a determination is made as to whether a reporting server address is configured locally. If a reporting server address is not configured locally (and, thus, there is no reporting address available for reporting the failure to fragment the labeled packet), method 2300 proceeds to block 2399, where method 2300 ends. If a reporting server address is configured locally, method 2300 proceeds to block 2325. At block 2325, the reporting server address is set as the reporting address in the MFH to be sent with the MFC packet. For example, the R-bit field of the MFH for the MFC packet may be set to a value indicative that the MFC packet includes a reporting address (denoted as MFH_For_MFC->R-bit=1), the A-bit field of the MFH for the MFC packet may be set to a value indicative of the address type (e.g., IPv4 or IPv6) of the reporting server address (denoted as MFH_For_MFC->A-bit=MFH_In_Packet), and the Reporting Address field of the MFH for the MFC packet may be set to include the reporting server address (denoted as MFH_For_MFC->ReportingAddress=Server_Address.is_ipv6). From block 2325, method 2300 proceeds to block 2330. At block 2330, the MFC packet is built. The MFC packet is built by copying a portion of the payload bytes from the payload of the labeled packet as the payload of the MFC packet (which may be denoted as copying MFH_In_Packet->CopyLength from the payload of original packet as payload of MFC packet), pushing the MFH for the MFC packet onto the payload for the MFC packet (which may be denoted as pushing MFH_For_MFC), and copying the headers up to and including the MFHI from the original packet and pushing the headers onto the MFC packet. At block 2335, the MFC packet is sent to the next-hop. At block 2399, method 2300 ends.

FIG. 24 depicts an example embodiment of pseudocode configured to support processing of an MPLS packet. The procedure provided by the pseudocode 2400 is referred to herein as Process_MPLS_Packet (Packet). In pseudocode 2400, the following is the input to Process_MPLS_Packet (Packet): Packet is the MPLS packet that has been received and that is going to be processed. The pseudocode 2400 is configured to support processing of an MPLS packet. It is noted that an example embodiment of a method configured to support processing of an MPLS packet in accordance with the example pseudocode 2400 of FIG. 24 is presented with respect to FIG. 25.

Figure 25:
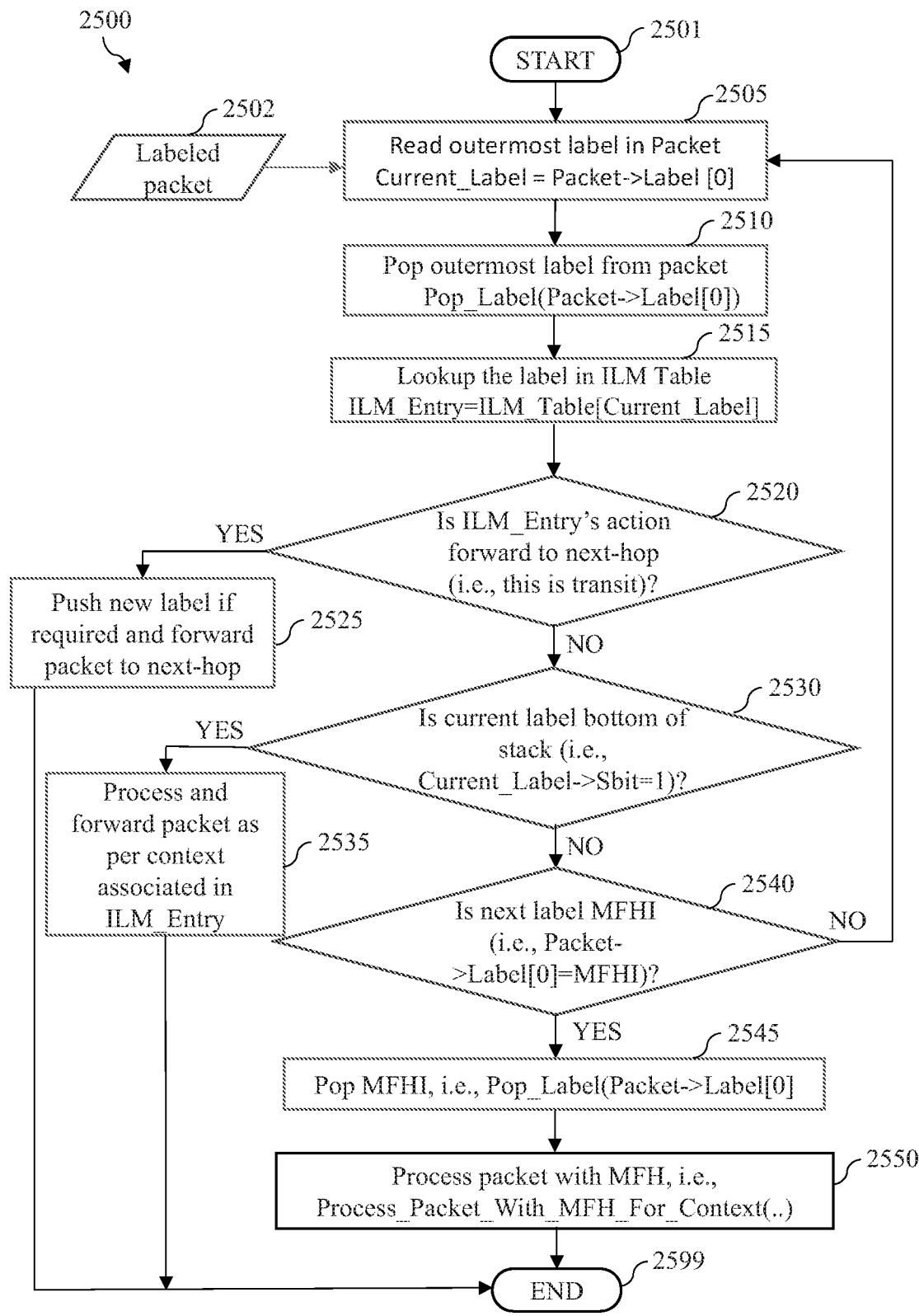
FIG. 25 depicts an example embodiment of a method configured to support processing of an MPLS packet in accordance with the example pseudocode of FIG. 24.

FIG. 25 depicts an example embodiment of a method configured to support processing of an MPLS packet in accordance with the example pseudocode of FIG. 24. It will be appreciated that, although primarily presented as being performed serially, at least a portion of the functions of method 2500 of FIG. 25 may be performed contemporaneously or in a different order than as presented with respect to FIG. 25. At block 2501, method 2500 begins. The method 2500 is performed based on an input block 2502, which includes a labeled packet to be processed. At block 2505, an outermost label of the labeled packet is read (which is denoted as Current_Label=Packet->Label[0]). At block 2510, the outermost label is popped from the labeled packet (which is denoted as Pop_Label(Packet->Label[0])). At block 2515, a lookup of the outermost label is performed. The lookup may be performed in the ILM table (which is denoted as ILM_Entry=ILM_Table[Current_Label]). At block 2520, a determination is made as to whether the lookup of the outermost label results in a determination that an action to be performed is to forward the labeled packet to a next-hop (e.g., that the action specified in the ILM_Table entry (ILM_Entry) is to forward to a next-hop). If, at block 2520, a determination is made that the lookup of the outermost label results in a determination that an action to be performed is to forward the labeled packet to a next-hop, method 2500 proceeds to block 2525. At block 2525, the labeled packet is forwarded to the next-hop. It is noted that this also may include pushing of any new labels, if needed and fragment the MPLS packet if needed (e.g., as presented with respect to FIGS. 21A and 21B and FIG. 23). From block 2525, method 2500 proceeds to block 2599, where method 2500 ends. If, at block 2520, a determination is made that the lookup of the outermost label results in a determination that an action to be performed is not to forward the labeled packet to a next-hop, method 2500 proceeds to block 2530. At block 2530, a determination is made as to whether the current label is the bottom of the label stack (which may be performed using a determination as to whether Curent Label->S-bit=1). If, at block 2530, a determination is made that the current label is the bottom of the label stack, method 2500 proceeds to block 2535. At block 2535, the labeled packet is processed and forwarded as per the context associated with the label (e.g., as per the ILM_Entry). From block 2535, method 2500 proceeds to block 2599, where method 2500 ends. If, at block 2530, a determination is made that the current label is not the bottom of the label stack, method 2500 proceeds to block 2540. At block 2540, a determination is made as to whether the next label in the labeled packet is an MFHI (which is denoted as a determination as to whether Packet->Label[0] MFHI). If the next label in the labeled packet is not an MFHI, method 2500 returns to block 2505, at which point the next outermost label in the labeled packet is read. If the next label in the labeled packet is a MFHI, method 2500 proceeds to block 2545. At block 2545, the MFHI is popped from the labeled packet (which may be denoted as Pop_Label (Packet->Label[0])). At block 2550, the labeled packet is processed based on the MFH for the context. The processing of the labeled packet based on the MFH for the context may be performed based on the procedure Process_Packet_With_MFH_For_Context (which is presented with respect to FIGS. 26 and 27). From block 2550, method 2500 proceeds to block 2599, where method 2500 ends.

FIG. 26 depicts an example embodiment of pseudocode configured to support processing of an MPLS packet based on context. The procedure provided by the pseudocode 2600 is referred to herein as Process_Packet_With_MFH_For_Context (Packet, Context, Has More Labels). In pseudocode 2600, the following is the input to Process_Packet_With_MFH_For_Context (Packet, Context, Has More Labels): (1) Packet is the MPLS packet that has been received and that is going to be processed, (2) Context is the context for which the MFH is received (e.g., PW, L3-VPN, or the like), and (3) Has More Labels is a parameter configured to track whether the packet has more labels after the MFH (e.g., set to true means the packet has more labels after the MFH). The pseudocode 2600 is configured to support processing, by an egress LER, of a packet received with MFH. It is noted that an example embodiment of a method configured to support processing of an MPLS packet based on context in accordance with the example pseudocode 2600 of FIG. 26 is presented with respect to FIG. 27.

Figure 27:
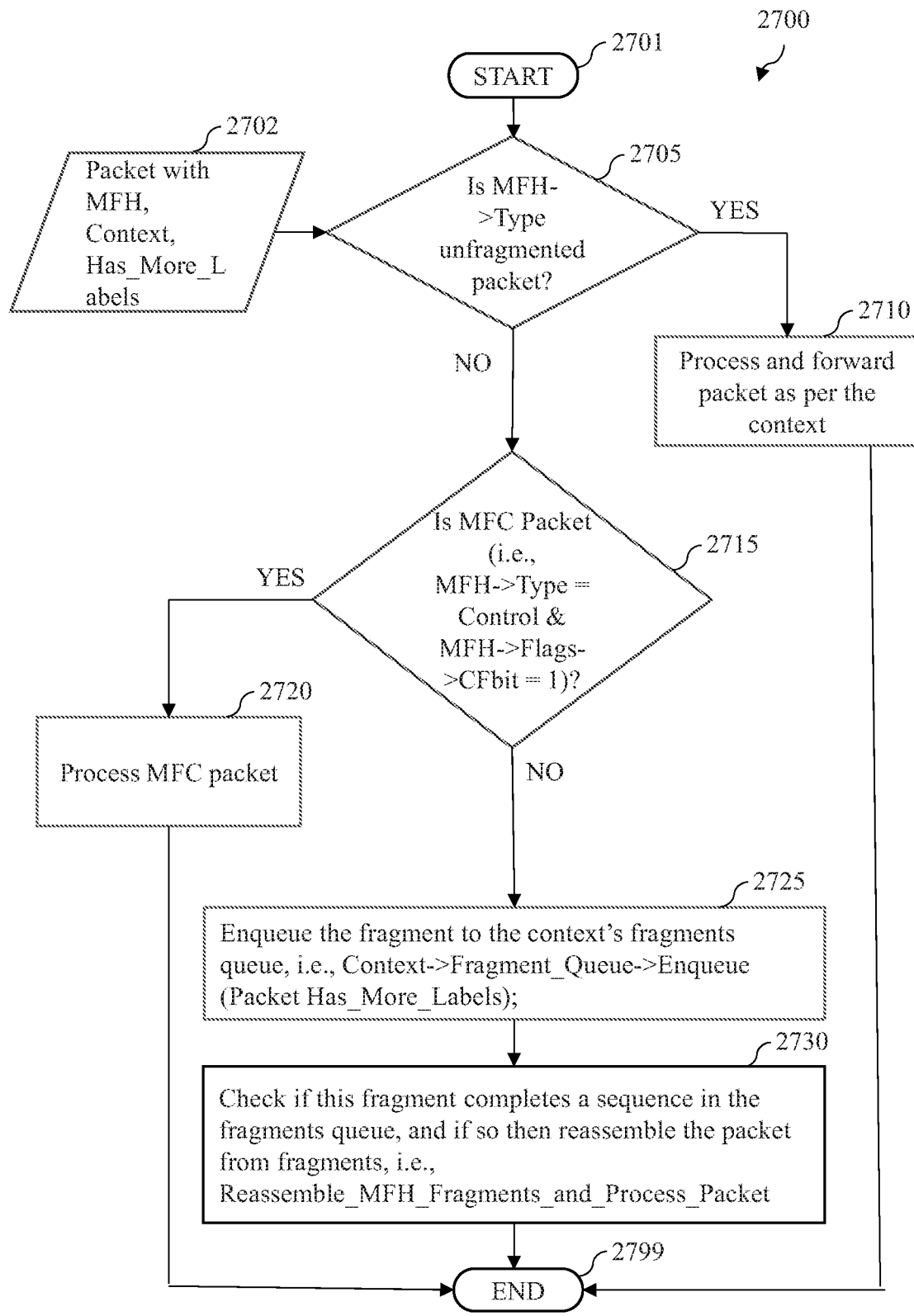
FIG. 27 depicts an example embodiment of a method configured to support processing of an MPLS packet based on context in accordance with the example pseudocode of FIG. 26.

FIG. 27 depicts an example embodiment of a method configured to support processing of an MPLS packet based on context in accordance with the example pseudocode of FIG. 26. It will be appreciated that method 2700 may be used to provide block 2550 of method 2500 of FIG. 25. It will be appreciated that, although primarily presented as being performed serially, at least a portion of the functions of method 2700 of FIG. 27 may be performed contemporaneously or in a different order than as presented with respect to FIG. 27. At block 2701, method 2700 begins. The method 2700 is performed based on an input block 2702, which includes a packet with an MFH (Packet With MFH), context information associated indicative of the context for the MFH (Context), and an indication as to whether packet has more labels after the MFH (Has_More_Labels). At block 2705, a determination is made as to whether the packet is an unfragmented packet. For example, this may be a performed as a determination as to whether the Type field in the MFH of the packet is set to a value indicative that the packet is an unfragmented packet. If, at step 2705, the packet is an unfragmented packet, method 2700 proceeds to block 2710. At block 2710, the packet is processed and forwarded as per the context. From block 2710, method 2700 proceeds to block 2799, where method 2700 ends. If, at step 2705, the packet is not an unfragmented packet, method 2700 proceeds to block 2715. At block 2715, a determination is made as to whether the packet is an MFC packet. For example, this may be performed as a determination as to whether the Type field of the MFH is set to a value indicative that the packet is an MFC packet and a determination as to whether the CF-bit in the Flags field of the MFH is set to a value indicative that the packet is an MFC packet. If, at block 2715, a determination is made that the packet is an MFC packet, method 2700 proceeds to block 2720. At block 2720, the MFC packet is processed. The processing of the MFC packet may be performed based on the procedure Process_MFC_Packet (which is presented with respect to FIGS. 32 and 33). From block 2720, method 2700 proceeds to block 2799, where method 2700 ends. If, at block 2715, a determination is made that the packet is not an MFC packet (that means this is a fragmented packet), method 2700 proceeds to block 2725. At block 2725, the fragment is enqueued to the fragments queue of the context (which may be indicated by Context->Fragment_Queue->Enqueue (Packet, Has_More_Labels). At block 2730, a determination is made as to whether the fragment completes a sequence in the fragments queue and, if so, the packet is reassembled from the fragments. The reassembly of the packet from the fragments may be performed based on the procedure Reassemble_MFH_Fragments_and_Process_Packet (which is presented with respect to FIGS. 28 and 29). From block 2730, method 2700 proceeds to block 2799, where method 2700 ends.

FIG. 28 depicts an example embodiment of pseudocode configured to support reassembly of an MPLS packet from fragments. The procedure provided by the pseudocode 2800 is referred to herein as Reassemble_MFH_Fragments_and_ Process_Packet (Context). In pseudocode 2800, the following is the input to Reassemble_MFH_Fragments_and_Process_Packet (Context)): Context is the context for which the MFH is received (e.g., PW, L3-VPN, or the like). The pseudocode 2800 is configured to support reassembly, by an egress LER, of an MPLS packet from fragments formed based on fragmentation of the MPLS packet by an upstream router. It is noted that an example embodiment of a method configured to support reassembly of an MPLS packet from fragments in accordance with the example pseudocode 2800 of FIG. 28 is presented with respect to FIG. 29.

Figure 29:
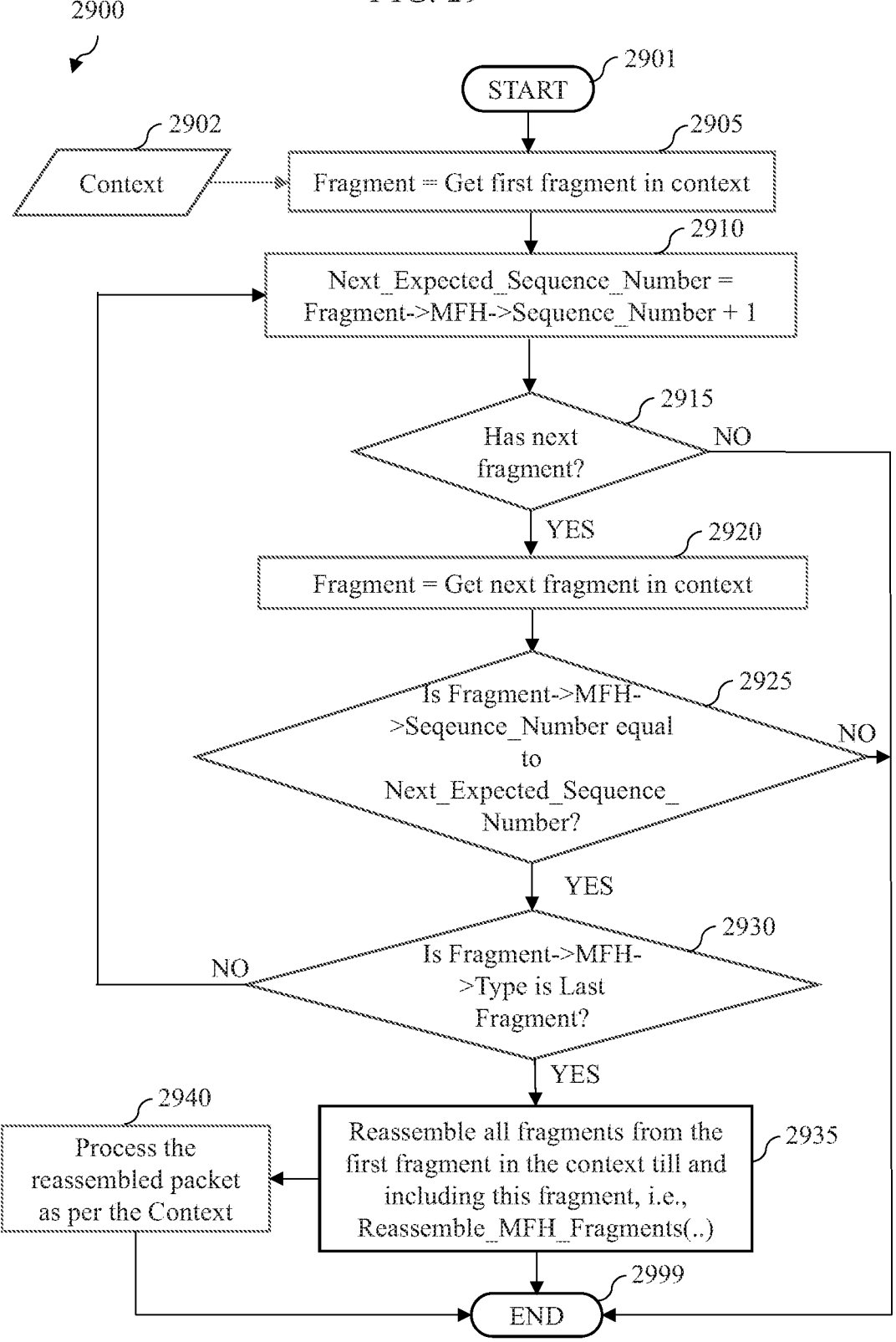
FIG. 29 depicts an example embodiment of a method configured to support reassembly of an MPLS packet from fragments in accordance with the example pseudocode of FIG. 28.

FIG. 29 depicts an example embodiment of a method configured to support reassembly of an MPLS packet from fragments in accordance with the example pseudocode of FIG. 28. It will be appreciated that method 2900 may be used to provide block 2730 of method 2700 of FIG. 27. It will be appreciated that, although primarily presented as being performed serially, at least a portion of the functions of method 2900 of FIG. 29 may be performed contemporaneously or in a different order than as presented with respect to FIG. 29. At block 2901, method 2900 begins. The method 2900 is performed based on an input block 2902, which includes context information associated indicative of the context for the reassembly of the fragments. At block 2905, the first fragment in the context is obtained. At block 2910, the next expected sequence number is computed by incrementing the sequence number in the MFH of the fragment (which is denoted as Next_Expected_Sequence_ Number=Fragment->MFH->Sequence_Number+1). At block 2915, a determination is made as to whether there is a next fragment. If, at block 2915, there is not a next fragment, method 2900 proceeds to block 2999, where method 2900 ends. If, at block 2915, there is a next fragment, method 2900 proceeds to block 2920. At block 2920, the next fragment in the context is obtained. At block 2925, a determination is made as to whether the sequence number in the MFH of the next fragment matches the expected sequence number (which may be denoted as a determination as to whether Fragment->MFH->Sequence_Number is equal to Next_Expected_Sequence_Number). If, at block 2925, a determination is made that the sequence number in the MFH of the next fragment and the expected sequence number do not match, method 2900 proceeds to block 2999, where method 2900 ends. If, at block 2925, a determination is made that the sequence number in the MFH of the next fragment and the expected sequence number match, method 2900 proceeds to block 2930. At block 2930, a determination is made as to whether the fragment is the last fragment. For example, this may be performed as a determination as to whether the Type field in the MFH of the fragment is set to a value indicative that the fragment is the last fragment of the packet to be reassembled. If, at block 2930, a determination is made that the fragment is not the last fragment of the packet to be reassembled, method 2900 returns to block 2910. If, at block 2930, a determination is made that the fragment is the last fragment of the packet to be reassembled, method 2900 proceeds to block 2935. At block 2935, the packet is reassembled from all of the fragments (i.e., from the first fragment in the context to the last fragment in the context). The reassembly of the packet from the fragments may be performed based on the procedure Reassemble_MFH_Fragments (which is presented with respect to FIGS. 30 and 31). At block 2940, the reassembled packet is processed as per the context. At block 2999, method 2900 ends.

FIG. 30 depicts an example embodiment of pseudocode configured to support reassembly of an MPLS packet from fragments of the MPLS packet. The procedure provided by the pseudocode 3000 is referred to herein as Reassemble_MFH_Fragments (Context, Till_Sequence_Number). In pseudocode 3000, the following is the input to Reassemble_MFH_Fragments (Context, Till_Sequence_Number): (1) Context is the context for which the MFH is received (e.g., PW, L3-VPN, or the like) and (2) Till_Sequence_Number is a parameter used to identify the final fragment of the context for which reassembly is being performed. The pseudocode 3000 is configured to support reassembly, by an egress LER, of the fragments in a fragment queue of a context, from the first fragment of the context until the final fragment of the context (which is identified based on the specified sequence number). It is noted that an example embodiment of a method configured to support reassembly of an MPLS packet from fragments of the MPLS packet in accordance with the example pseudocode 3000 of FIG. 30 is presented with respect to FIG. 31.

Figure 31:
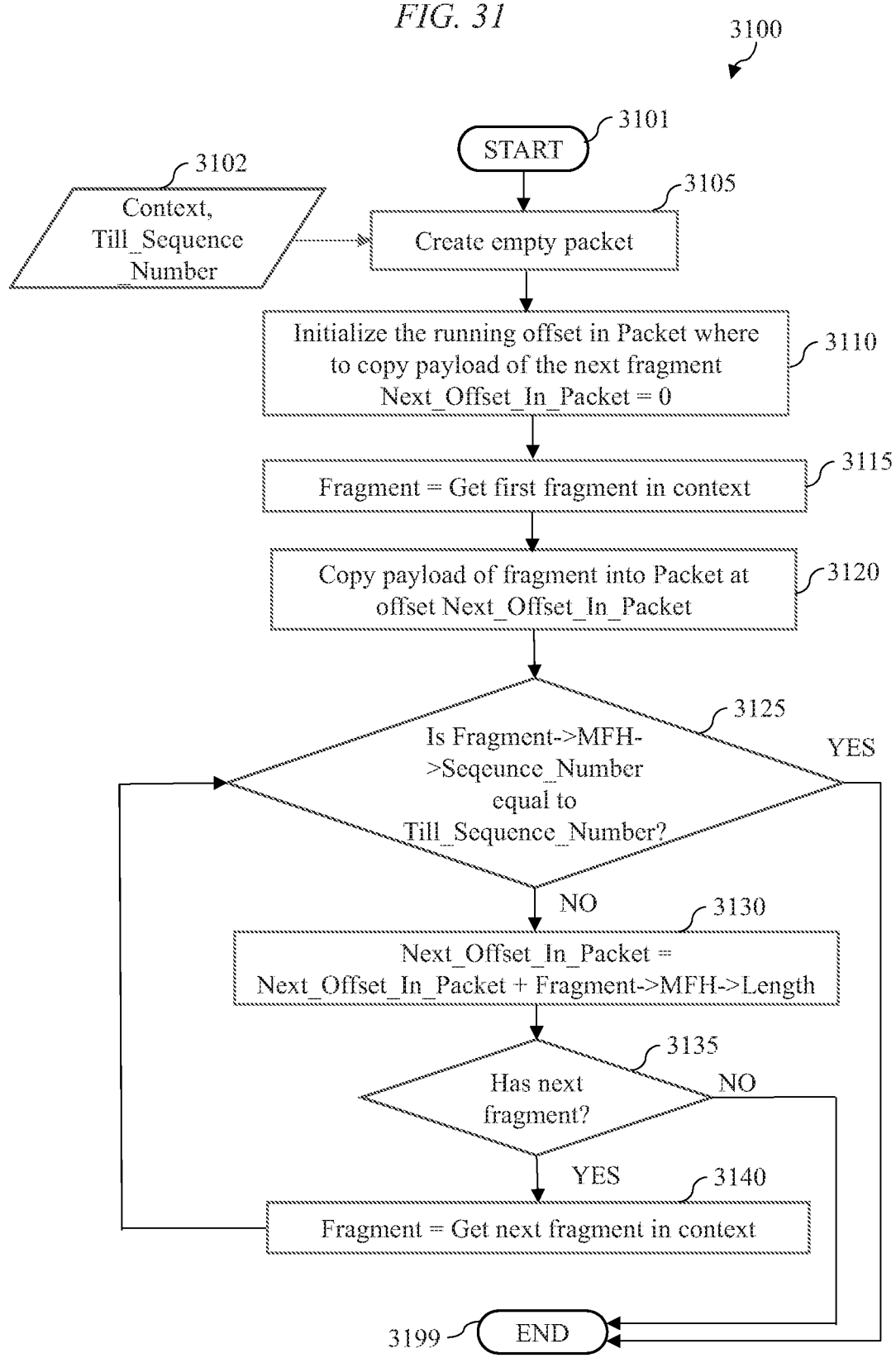
FIG. 31 depicts an example embodiment of a method configured to support reassembly of an MPLS packet from fragments of the MPLS packet in accordance with the example pseudocode of FIG. 30.

FIG. 31 depicts an example embodiment of a method configured to support reassembly of an MPLS packet from fragments of the MPLS packet in accordance with the example pseudocode of FIG. 30. It will be appreciated that method 3100 may be used to provide block 2935 of method 2900 of FIG. 29. It will be appreciated that, although primarily presented as being performed serially, at least a portion of the functions of method 3100 of FIG. 31 may be performed contemporaneously or in a different order than as presented with respect to FIG. 31. At block 3101, method 3100 begins. The method 3100 is performed based on an input block 3102, which includes context information associated indicative of the context for the reassembly of the fragments (Context) and parameter used to identify the final fragment of the first packet in the context for which reassembly is being performed (Till_Sequence_Number). At block 3105, an empty packet, which will become the reassembled packet after reassembly, is created. This packet is denoted as Packet. At block 3110, a running offset in Packet (i.e., the reassembled packet), indicative as to where to copy the payload of the next fragment, is initialized. This parameter may be initialized to zero (which may be denoted as Next_Offset_In_Packet=0). At block 3115, the first fragment in the context is obtained. At block 3120, the payload of the obtained fragment is copied into Packet based on the location of the offset (i.e., at Next_Offset_In_Packet). At block 3125, a determination is made as to whether the sequence number in the MFH of the fragment matches the sequence number of the final fragment of the context for which reassembly is being performed (which may be denoted as a determination as to whether Fragment->MFH Sequence_Number==Till_Sequence_Number). If, at block 3125, a determination is made that the sequence number in the MFH of the fragment and the sequence number of the final fragment of the context for which reassembly is being performed match, method 3100 proceeds to block 3199, where method 3100 ends. If, at block 3125, a determination is made that the sequence number in the MFH of the fragment and the sequence number of the final fragment of the context for which reassembly is being performed do not match, method 3100 proceeds to block 3130. At block 3130, the running offset in the Packet is updated based on the length of the payload of the fragment copied into the Packet (which may be denoted as Next_Offset_In_Packet= Next_Offset_In_Packet+Fragment->MFH->Length). At block 3135, a determination is made as to whether there is a next fragment. If, at block 3135, there is not a next fragment, method 3100 proceeds to block 3199, where method 3100 ends. If, at block 3135, there is a next fragment, method 3100 proceeds to block 3140. At block 3140, the next fragment in the context is obtained. From block 3140, method 3100 returns to block 3120. At block 3199, method 3100 ends.

FIG. 32 depicts an example embodiment of pseudocode configured to support processing of an MFC packet. The procedure provided by the pseudocode 3200 is referred to herein as Process_MFC_Packet (Packet). In pseudocode 3200, the following is the input to Process_MFC_Packet (Packet): the MFC packet to be processed. The pseudocode 3200 is configured to support processing of an MFC packet. It is noted that an example embodiment of a method configured to support processing of an MFC packet in accordance with the example pseudocode 3200 of FIG. 32 is presented with respect to FIG. 33.

Figure 33:
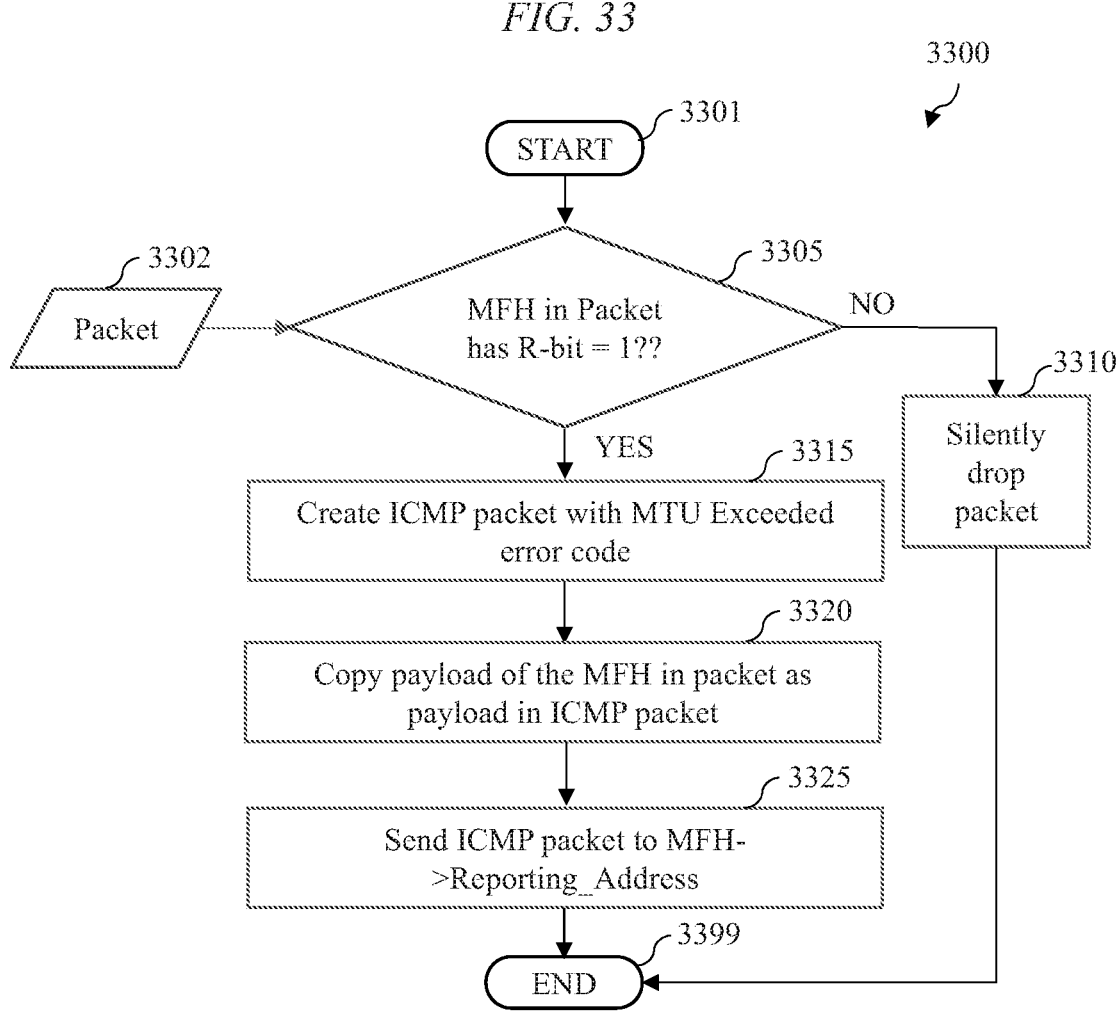
FIG. 33 depicts an example embodiment of a method configured to support processing of an MPLS fragmentation control packet in accordance with the example pseudocode of FIG. 32.

FIG. 33 depicts an example embodiment of a method configured to support processing of an MFC packet in accordance with the example pseudocode of FIG. 32. It will be appreciated that method 3300 may be used to provide block 2720 of method 2700 of FIG. 27. It will be appreciated that, although primarily presented as being performed serially, at least a portion of the functions of method 3300 of FIG. 33 may be performed contemporaneously or in a different order than as presented with respect to FIG. 33. At block 3301, method 3300 begins. The method 3300 is performed based on an input block 3302, the MFC packet to be processed (Packet). At block 3305, a determination is made as to whether the MFH of the MFC packet includes a reporting address. For example, this may be a determination as to whether the R-bit of the Flags field of the MFH of the MFC packet is set to a value indicative that the MFH of the MFC packet includes a reporting address (e.g., Packet-> MFH-Flags.R-bit=1). If, at block 3305, a determination is made that the MFH of the MFC packet does not includes a reporting address, method 3300 proceeds to block 3310. At block 3310, the MFC packet is silently dropped. From block 3310, method 3300 proceeds to block 3399, where method 3300 ends. If, at block 3305, a determination is made that the MFH of the MFC packet does include a reporting address, method 3300 proceeds to block 3315. At block 3315, an ICMP packet indicative of fragmentation of an MPLS packet (e.g., including an MTU exceeded error code or other suitable indicator) is created. At block 3320, the payload of the MFH in the MFC packet is copied as payload into the ICMP packet. At block 3325, the ICMP packet is sent to the reporting address (which may be denoted as MFH->Reporting Address). At block 3399, method 3300 ends.

It will be appreciated that various example embodiments for supporting fragmentation and reassembly of labeled packets, such as MPLS packets, may be supported using various control plane functions.

In at least some example embodiments, whether an MPLS context allows fragmentation and reassembly of its payload using MFH may be negotiated by egress LER of the context. The negotiation as to whether an MPLS context allows fragmentation and reassembly of its payload using MFH may be performed using a control plane protocol (e.g., at the time of set-up the context by the control plane protocol). For example, such control plane protocols may include Label Distribution Protocol (LDP), Border Gateway Protocol (BGP), Resource ReServation Protocol-Traffic Engineering (RSVP-TE), or the like. In at least some example embodiments, the egress LER may signal to any ingress router(s), via the transit LSRs, information indicative of its ability and intent to reassemble MFH fragments (henceforth called "MFH Capability" or MFHC) on a given context. If the egress LER does not signal MFH Capability while setting up the context, then an ingress LER does not include MFH in its data packets. For an ingress LER or a transit LSR, the MFH Capability means the ability to fragment packet based on MFH. It is noted that the MFH Capability may be symmetric (e.g., if LERs A and B are at opposite ends of a context, both A and B may be able to reassemble fragments) or may be asymmetric (e.g., if LERs A and B are at opposite ends of a context, B may be able to reassemble fragments, whereas A may not). It is noted that various signaling extensions discussed below may be configured to support symmetry as well as asymmetry. If a transit LSR along the signaled path of the context receives MFH Capability from a downstream LSR of that context, but the receiving LSR does not support fragmentation based on MFH, then the receiving LSR does not propagate the MFH Capability to upstream LSR(s) of the context. As a result, unless all LSRs of a context support fragmentation based on MFH, the ingress LER does not include MFH in its data packets. It is noted that a transit router of a specific context may have multiple downstream LSR(s) (e.g., such as in Point to Multi-Point (P2MP) LSP) and it is also possible to have multiple downstream LSRs in a point-to-point LSP (which provides ECMP) and, that, in such cases, unless all downstream LSRs sent MFH Capability to a receiving LSR, the MFH capability is not further propagated by the receiving LSR to any upstream LSR(s).

In at least some example embodiments, LDP signaling may be configured to support signaling of MFH Capability.

In at least some example embodiments, a new LDP TLV [RFC5036] may be defined to signal the ability of an egress LER to reassemble fragments. This new LDP TLV may be referred to as the MFHC TLV and may appear as an Optional Parameter of the Label Mapping Message TLV. The presence of the MFHC TLV in a Label Mapping Message indicates to ingress LER(s) that the egress LER can reassemble fragments associated with the context.

The MFHC TLV may be formatted and defined in various ways. The MFHC TLV may have a Type of 0x0207 (which may be reserved in the LDP Parameters Registry in IANA) and a Length of 0 (although it will be appreciated that other values may be used). An example embodiment of an MFHC TLV is presented in FIG. 34. As depicted in FIG. 34, the MFHC TLV 3400 includes an Unknown (U) bit, a Forward (F) bit, a Type field, and a Length Field. The Unknown bit is set to 1 and, if the MFHC TLV is not understood by the receiver, then it is ignored. The Forward bit is set to 0 and, since the MFHC TLV is not going to be propagated if not supported locally, it is not forwarded. The Type field is configured to include a value indicative that the egress LER can reassemble fragments associated with the context (e.g., a value of 0x0207 is indicated; however, it will be appreciated that other values may be used). The Length field specifies the total length, in octets, of the MFHC TLV and may be defined to be 0.

The MFHC TLV may be processed in various ways. An LSR that receives a Label Mapping with the MFHC TLV, but does not understand it, does not propagate it to its neighbors and, rather, silently ignores the MFHC TLV (following the meaning of the U- and F-bits). An LSR X may receive multiple Label Mappings for a given FEC F (the context) from its neighbors and, in turn, X may advertise a Label Mapping for F to its neighbors. If X understands the MFHC TLV, and if any of the advertisements it received for FEC F does not include the MFHC TLV, X does include the MFHC TLV in its own advertisements of F. If X understands the MFHC TLV, and if all of the advertised Mappings for F include the MFHC TLV, then X will advertise its Mapping for F with the MFHC TLV. If any of the neighbors of X resends its Mapping, sends a new Mapping, or sends a Label Withdraw for a previously advertised Mapping for F, X will reevaluate the status of MFHC for FEC F, and, if there is a change, X will re-advertise its Mapping for F with the updated status of MFHC.

It will be appreciated that LDP signaling may be configured to support various other functions for supporting signaling of MFH Capability.

In at least some example embodiments, BGP signaling may be configured to support signaling of MFH Capability.

In at least some example embodiments, when BGP [RFC 4271] is used for distributing Network Layer Reachability Information (NLRI) as described in, for example, [RFC 3107], the BGP UPDATE message may include the MFHC attribute as part of the Path Attributes. This is an optional, transitive BGP attribute of value 28. The inclusion of this attribute with an NLRI indicates that the advertising BGP router can reassemble fragments as an egress LER for the routes in that NLRI. A BGP speaker S that originates an UPDATE may include the MFHC attribute only if both of the following are true: (1) S sets the BGP NEXT HOP attribute to itself and (2) S can reassemble MFH fragments. A BGP speaker T that receives an UPDATE U with the MFHC attribute has two choices as follows: (1) T can simply re-advertise U with the MFHC attribute if the following is true: T does not change the NEXT HOP attribute (an example of this is Route Reflectors) or (2) if T changes the NEXT HOP attribute for U and in the data plane pops the entire label stack to process the payload, T may include an MFHC attribute for UPDATE U' if both of the following are true: (a) T sets the NEXT_HOP attribute of U' to itself and (b) T can fragment based on MFHC. Otherwise, T removes the MFHC attribute.

It will be appreciated that BGP signaling may be configured to support various other functions for supporting signaling of MFH Capability.

In at least some example embodiments, RSVP-TE signaling may be configured to support signaling of MFH Capability.

In at least some example embodiments, MFH Capability is signaled in RSVP-TE [RFC 3209] using an MFH Capability flag (MFHC flag) in the Attribute Flags TLV of the LSP_ATTRIBUTES object [RFC 5420]. The presence of the MFHC flag in a Path message indicates that the ingress LER can reassemble MFH fragments in the upstream direction (it is noted that this only makes sense for a bidirectional LSP and is ignored otherwise). The presence of the MFHC flag in a Resv message indicates that the egress LER can reassemble MFH fragments in the downstream direction. If a transit LSR does not support fragmentation based on MFH, then it does not include the MFHC flag while sending the Path or Resv message to its neighbor. The bit number for the MFHC flag may be 9 or any other suitable value.

It will be appreciated that RSVP-TE signaling may be configured to support various other functions for supporting signaling of MFH Capability.

In at least some example embodiments, various segment routing related signaling protocols (e.g., Intermediate-System-to-Intermediate-System (IS-IS), Open Shortest Path First (OSPF), BGP-Link State (BGP-LS), or the like) may be configured to support signaling of MFH Capability. In Segment Routing, the label mappings for various segments are distributed in Link State Advertisements (LSAs) by IS-IS, OSPF, BGP-LS, or the like. MFH Capability may be encoded along with label mapping in a LSA. An ingress LER of a SR LSP will include MFH in data packets if every segment of the LSP is MFH capable.

It will be appreciated that various segment routing related signaling protocols may be configured to support various other functions for supporting signaling of MFH Capability.

It will be appreciated that various example embodiments for supporting fragmentation and reassembly of labeled packets, such as MPLS packets, may be supported using various other control plane functions.

Figure 35:
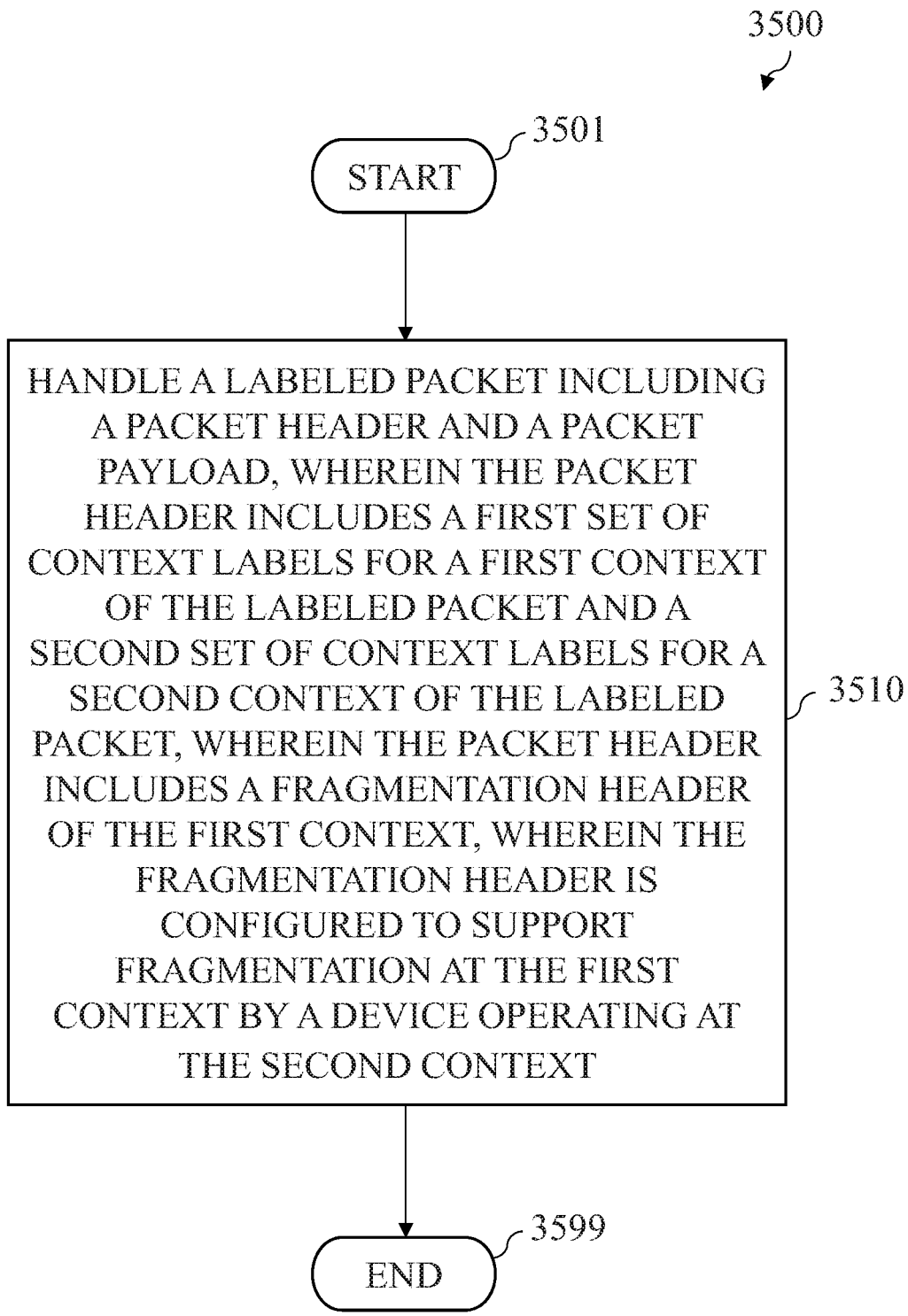
FIG. 35 depicts an example embodiment of a method for supporting fragmentation and reassembly of a labeled packet.

FIG. 35 depicts an example embodiment of a method for supporting fragmentation and reassembly of a labeled packet. It will be appreciated that, although primarily presented as being performed serially, at least a portion of the functions of method 3500 may be performed contemporaneously or in a different order than as presented with respect to FIG. 35. At block 3501, method 3500 begins. At block 3510, handle a labeled packet including a packet header and a packet payload, wherein the packet header includes a first set of context labels for a first context of the labeled packet and a second set of context labels for a second context of the labeled packet, wherein the packet header includes a fragmentation header of the first context, wherein the fragmentation header is configured to support fragmentation at the first context by a device operating at the second context. At block 3599, method 3500 ends. It will be appreciated that various features presented herein with respect to FIGS. 1-34 may be incorporated within the context of method 3500 of FIG. 35.

Various example embodiments for supporting fragmentation and reassembly of labeled packets may provide various advantages or potential advantages. For example, various example embodiments for supporting fragmentation and reassembly of labeled packets, for a labeled packet having a set of one or more contexts indicated within the labeled packet, may be configured to support fragmentation a given context of the labeled packet by a device operating at any of the one or more contexts of the labeled packet and may be configured to support reassembly at the given context of the labeled packet by a device operating at the given context of the labeled packet irrespective of the one or more contexts at which the device that fragmented the labeled packet was operating. For example, various example embodiments for supporting fragmentation and reassembly of labeled packets may be configured to support fragmentation and reassembly of labeled packets, at the payloads of various contexts of the labeled packets, based on use of a fragmentation header configured to support various aspects of fragmentation and reassembly of labeled packets (e.g., supporting providing of indications of fragmentability of labeled packets, supporting fragmentation and reassembly of labeled packets including indications providing fragmentation information indicative as to the manner in which fragmentation was performed and the manner in which reassembly may be performed, supporting reporting functions related to fragmentation and reassembly of labeled packets such as reporting failure to fragment labeled packets, or the like, as well as various combinations thereof). For example, various example embodiments for supporting fragmentation and reassembly of labeled packets may be configured to support fragmentation and reassembly of labeled packets, at the payloads of various contexts of the labeled packets, based on use of a generic fragmentation header that is configured to support fragmentation of a labeled packet by a device operating at any context of the labeled packet and not just at the context for which the fragmentation header is provided (e.g., where a labeled packet includes a packet header that includes a first set of context labels for a first context of the labeled packet and a second set of context labels for a second context of the labeled packet, a fragmentation header of the first context in the labeled packet may be configured to support fragmentation at the first context by a device operating at the second context). Various example embodiments for supporting fragmentation and reassembly of labeled packets may provide various other advantages or potential advantages.

Figure 36:
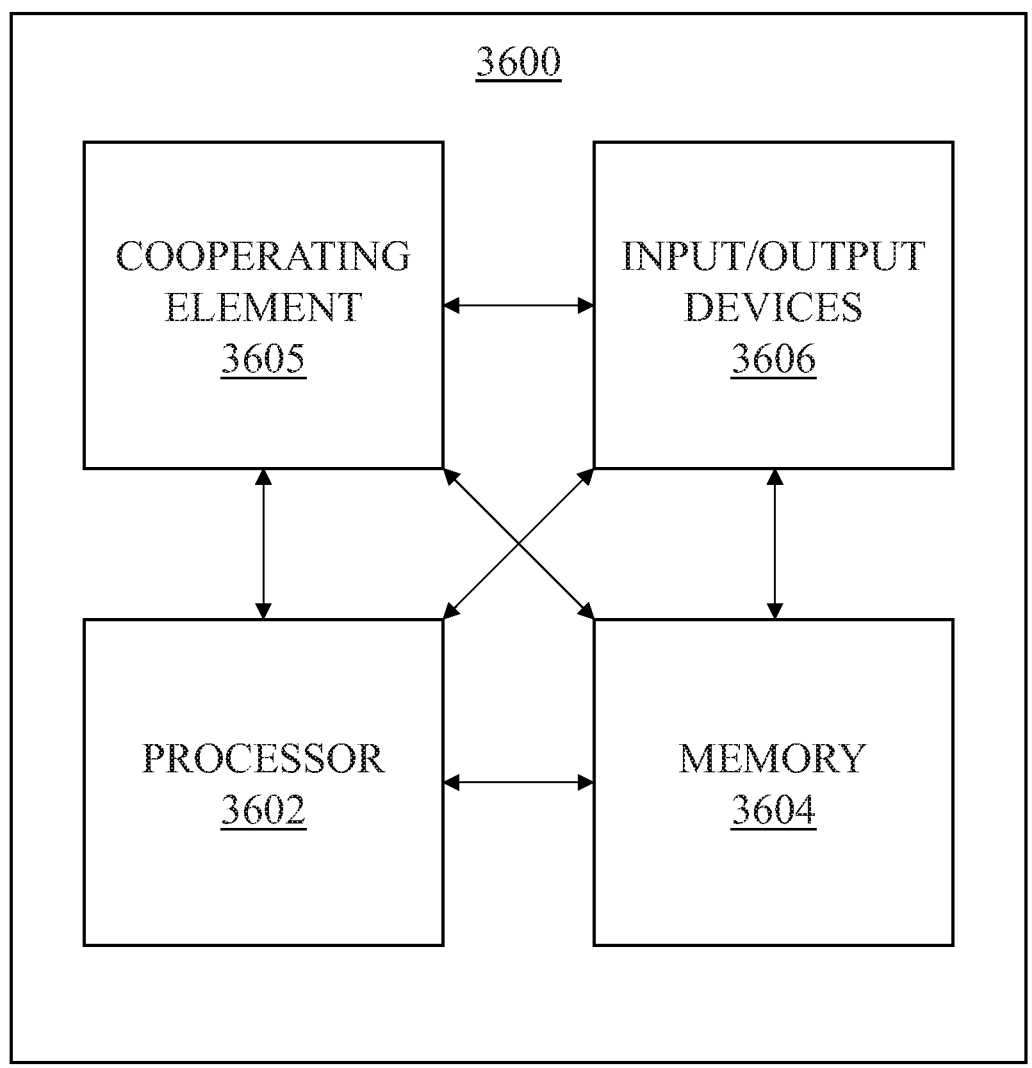
FIG. 36 depicts an example embodiment of a computer suitable for use in performing various functions presented herein.

FIG. 36 depicts an example embodiment of a computer suitable for use in performing various functions presented herein.

The computer 3600 includes a processor 3602 (e.g., a central processing unit, a processor, a processor having a set of processor cores, a processor core of a processor, or the like) and a memory 3604 (e.g., a random access memory, a read only memory, or the like). The processor 3602 and the memory 3604 may be communicatively connected. In at least some example embodiments, the computer 3600 may include at least one processor and at least one memory including computer program code, wherein the at least one memory and the computer program code are configured to, with the at least one processor, cause the computer to perform various functions presented herein.

The computer 3600 also may include a cooperating element 3605. The cooperating element 3605 may be a hardware device. The cooperating element 3605 may be a process that can be loaded into the memory 3604 and executed by the processor 3602 to implement various functions presented herein (in which case, for example, the cooperating element 3605 (including associated data structures) can be stored on a non-transitory computer-readable storage medium, such as a storage device or other suitable type of storage element (e.g., a magnetic drive, an optical drive, or the like)).

The computer 3600 also may include one or more input/output devices 3606. The input/output devices 3606 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 3600 may represent a general architecture and functionality suitable for implementing functional elements described herein, portions of functional elements described herein, or the like, as well as various combinations thereof. For example, computer 3600 may provide a general architecture and functionality that is suitable for implementing one or more elements presented herein, such as a router 111 or a portion thereof, an F/R element 112 or a portion thereof, a controller 120 or a portion thereof, an F/R element 121 or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
    at least one processor; and
    at least one memory including program code;
    wherein the at least one memory and the program code are configured to, with the at least one processor, cause the apparatus to at least:
        obtain, by a node operating at a first context, a labeled packet including a packet header and a packet payload, wherein the packet header includes a fragmentation header of a second context, a set of context labels for the second context, and a set of context labels for the first context;
        perform, by the node based on the fragmentation header, fragmentation of the labeled packet at the second context to form a set of packet fragments; and
        forward, by the node toward a next-hop node based on the first context, the set of packet fragments.

2. The apparatus of claim 1, wherein the node operating at the first context is an ingress label edge router and the labeled packet is obtained at the node by generating the labeled packet at the node.

3. The apparatus of claim 1, wherein the node operating at the first context is a transit label switched router and the labeled packet is obtained at the node by receiving the labeled packet at the node.

4. The apparatus of claim 1, wherein the fragmentation header includes fragmentability information indicative as to whether the labeled packet can be fragmented.

5. The apparatus of claim 1, wherein the labeled packet is a fragment of an original packet, wherein the fragmentation header includes fragmentation information indicative of fragmentation of the original packet to form the labeled packet.

6. The apparatus of claim 1, wherein the fragmentation header is disposed above the payload, the set of context labels for the second context is disposed above the fragmentation header, and the set of context labels for the first context is disposed above the set of context labels for the second context.

7. The apparatus of claim 1, wherein the fragmentation header is configured to support fragmentation of a fragmentation payload that includes the packet payload.

8. The apparatus of claim 1, wherein the fragmentation header includes a sequence number field, a length field, a field indicative as to whether fragmentation of the labeled packet is permitted, a field indicative as to whether fragmentation of the labeled packet is possible, a type field indicative as to a packet type of the labeled packet, a copy length field, and a reporting address field.

9. The apparatus of claim 1, wherein, for each packet fragment in the set of packet fragments, the respective packet fragment includes the packet payload of the labeled packet and a respective updated fragmentation header based on the fragmentation header.

10. The apparatus of claim 1, wherein, to perform fragmentation of the labeled packet at the second context to form the set of packet fragments, the at least one memory and the program code are configured to, with the at least one processor, cause the apparatus to at least:
    determine, based on a determination that fragmentation of the labeled packet is needed and based on the fragmentation header, whether to fragment the labeled packet; and
    fragment, based on a determination to fragment the labeled packet, the labeled packet to form the set of packet fragments.

11. A method, comprising:
    obtaining, by a node operating at a first context, a labeled packet including a packet header and a packet payload, wherein the packet header includes a fragmentation header of a second context, a set of context labels for the second context, and a set of context labels for the first context;
    performing, by the node based on the fragmentation header, fragmentation of the labeled packet at the second context to form a set of packet fragments; and
    forwarding, by the node toward a next-hop node based on the first context, the set of packet fragments.

12. The apparatus of claim 1, wherein the first context is based on a label switched path (LSP) and the second context is based on a payload of the label switched path.

13. The apparatus of claim 12, wherein the payload of the label switched path is an Internet Protocol (IP) flow, a pseudowire (PW), or a Layer 3 Virtual Private Network (VPN).

14. An apparatus, comprising:
    at least one processor; and
    at least one memory including computer program code;
    wherein the at least one memory and the computer program code are configured to, with the at least one processor, cause the apparatus to at least:
        receive, by a node configured to operate as an egress node for a first context and a second context, a labeled packet including a packet payload and a packet header, wherein the packet header includes a fragmentation header for the second context, a set of context labels for the second context, and a set of context labels for the first context;
        determine, by the node based on the fragmentation header, that the labeled packet is a packet fragment of a fragmented packet that was fragmented at the second context; and
        perform, by the node based on the fragmentation header, reassembly of the labeled packet at the second context to recover the fragmented packet.

* * * * *